(12) United States Patent
Sato et al.

(10) Patent No.: US 10,208,216 B2
(45) Date of Patent: Feb. 19, 2019

(54) WATER DISPERSION OF GEL PARTICLES, PRODUCING METHOD THEREOF, AND IMAGE FORMING METHOD

(71) Applicant: FUJIFILM CORPORATION, Minato-ku, Tokyo (JP)

(72) Inventors: Noriaki Sato, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/686,164

(22) Filed: Aug. 25, 2017

(65) Prior Publication Data

US 2017/0349771 A1    Dec. 7, 2017

Related U.S. Application Data

(63) Continuation of application No. PCT/JP2016/052963, filed on Feb. 1, 2016.

(30) Foreign Application Priority Data

Mar. 24, 2015  (JP) .................. 2015-061721

(51) Int. Cl.
| | |
|---|---|
| C09D 11/101 | (2014.01) |
| B41M 5/00 | (2006.01) |
| B41J 2/01 | (2006.01) |
| C08F 2/50 | (2006.01) |
| C09D 11/38 | (2014.01) |
| C08G 18/00 | (2006.01) |
| C08F 283/00 | (2006.01) |
| C09D 11/033 | (2014.01) |
| C09D 11/107 | (2014.01) |
| C09D 11/102 | (2014.01) |

(52) U.S. Cl.
CPC ............... *C09D 11/101* (2013.01); *B41J 2/01* (2013.01); *B41M 5/00* (2013.01); *B41M 5/0088* (2013.01); *C08F 2/50* (2013.01); *C08F 283/006* (2013.01); *C08G 18/00* (2013.01); *C09D 11/033* (2013.01); *C09D 11/102* (2013.01); *C09D 11/107* (2013.01); *C09D 11/38* (2013.01)

(58) Field of Classification Search
CPC ............... C09D 11/01; B41M 5/0088
See application file for complete search history.

(56) References Cited

U.S. PATENT DOCUMENTS 5,210,111 A    5/1993    Goldenberg et al.

FOREIGN PATENT DOCUMENTS

| CN | 101838457 A | 9/2010 |
| EP | 0530140 A1 | 3/1993 |
| JP | H05-224404 A | 9/1993 |
| JP | H05-239152 A | 9/1993 |
| JP | 08259888 A | * 10/1996 |
| JP | H08-259888 A | 10/1996 |
| JP | H10-158410 A | 6/1998 |
| JP | H10-191973 A | 7/1998 |
| JP | 2000-136211 A | 5/2000 |
| JP | 2000-336128 A | 12/2000 |
| JP | 2002-000265 A | 1/2002 |
| JP | 2007-023178 A | 2/2007 |

(Continued)

OTHER PUBLICATIONS

English language translation of the following: Office action dated Dec. 5, 2017 from the JPO in a Japanese patent application No. 2017-507554 corresponding to the instant patent application.
International Search Report issued in International Application No. PCT/JP2015/052963 dated Apr. 19, 2016.
Written Opinion of the ISA issued in International Application No. PCT/JP2015/052963 dated Apr. 19, 2016.
Extended European Search Report dated Jan. 4, 2018, issued in corresponding EP Patent Application No. 16768157.6.

(Continued)

*Primary Examiner* — Jason S Uhlenhake

(74) *Attorney, Agent, or Firm* — SOLARIS Intellectual Property Group, PLLC

(57) ABSTRACT

A water dispersion of gel particles, in which the gel particles having a three-dimensional crosslinked structure including at least one of Polymer Structure (1) or Polymer Structure (2), having a hydrophilic group and a polymerizable group, and including photopolymerization initiators are dispersed in water, a method of producing the water dispersion, and an image forming method using the water dispersion are provided. $P^1$ and $P^2$ represent a polymer chain consisting of polyester and the like and having a number-average molecular weight of 500 or greater, $Z^{11}$ represents a $(n_1+1)$-valent group, $Z^{12}$ represents a $(m_1+1)$-valent group, $m_1$, $n_1$ and $n_2$ each represent an integer of 1 or greater, $X^1$ represents a single bond, a —CH$_2$— group, or a —NH— group, $Z^{21}$ represents a $(n_2+1)$-valent group, $R^1$ represents a hydrocarbon group that may include a hetero atom.

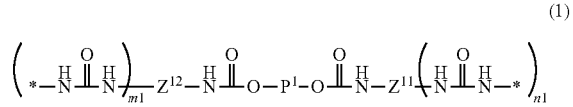

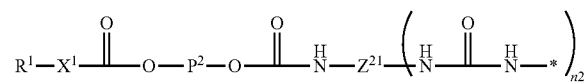

17 Claims, No Drawings

(56) References Cited

FOREIGN PATENT DOCUMENTS

| JP | 2009-542833 A | 12/2009 |
| JP | 2011-213114 A | 10/2011 |
| JP | 2013-199602 A | 10/2013 |

OTHER PUBLICATIONS

English language translation of the following: Office action dated Jul. 24, 2018 from the SIPO in a Chinese patent application No. 201680017251.8 corresponding to the instant patent application.

* cited by examiner

WATER DISPERSION OF GEL PARTICLES, PRODUCING METHOD THEREOF, AND IMAGE FORMING METHOD

CROSS-REFERENCE TO RELATED APPLICATIONS

This application is a continuation application of International Application No. PCT/JP2016/052963, filed Feb. 1, 2016, the disclosure of which is incorporated herein by reference in its entirety. Further, this application claims priority from Japanese Patent Application No. 2015-061721, filed Mar. 24, 2015, the disclosure of which is incorporated herein by reference in its entirety.

BACKGROUND OF THE INVENTION

1. Field of the Invention

The present invention relates to a water dispersion of gel particles, a producing method thereof, and an image forming method.

2. Description of the Related Art

Examples of the image forming method of forming an image on a recording medium include an electrophotographic method, a sublimation-type thermal transfer method, a fusion-type thermal transfer method, and an ink jet method.

For example, since the ink jet method of forming an image can be performed with a cheap device, and the ink can be effectively used, the ink jet method has an advantage in that running cost is not expensive.

Examples of the ink jet method include an image forming method obtained by using ink for ink jet that can be cured by irradiation with active energy rays such as ultraviolet rays.

Hereinafter, ink jet ink that can be cured by irradiation with active energy rays is referred to as "photocurable ink". In addition to ink jet ink, a composition that can be cured by irradiation with active energy rays is referred to as "photocurable composition".

In the related art, in view of reduction of environmental burden and improvement of workability, an aqueous composition (for example, aqueous ink) including water as a solvent or a dispersion medium is used instead of a solvent-based composition (for example, solvent-based ink) including an organic solvent as a solvent or a dispersion medium.

As the aqueous photocurable composition, for example, the following compositions are known.

For example, as an ink composition for ink jet maintaining curing properties due to irradiation with ultraviolet rays in the existence of water or a solvent and having excellent jetting stability, an ink composition for ink jet including water, a colorant, a resin emulsion consisting of a compound having a radical polymerizable group, an inorganic particle dispersion, and a photoradical initiator is known (for example, see JP2013-199602A).

As an aqueous emulsion that can be thermally cured or photocured and that can be suitably used for a coating agent and the like, an aqueous emulsion containing a vinyl polymer having a specific acrylic functional group at at least one terminal is known (for example, see JP2000-136211A).

As the photocurable composition that is not limited to an aqueous composition, for example, the following compositions are known.

For example, as the colored photosensitive composition that has satisfactory color stability after exposure due to infrared laser exposure and that can obtain high color development even in a case where the exposure is performed after elapse of time, a colored photosensitive composition containing a microgel including a polymer of which a glass transition temperature is 50° C. or higher, a photoinitiator, and an infrared absorbing dye and a binder polymer is known (for example, see JP2011-213114A).

As ink for ink jet printing cured by irradiation, ink for ink jet that includes at least one irradiation curable monomer, at least one inert thermoplastic resin, at least one radical photoinitiator, and at least one colorant and that has viscosity of less than 100 mPas at 25° C., in which at least one inert resin exists by 2 to 15 weight % with respect to the total weight and has a molecular weight of 1,500 to 70,000 is known (for example, see JP2009-542833A).

SUMMARY OF THE INVENTION

Recently, it is required to form a cured film having excellent adhesiveness to the various base materials including a nonabsorbable base material (for example, a plastic base material and a metal base material).

For example, also in an ink jet-type image forming field, it is required to form an image (cured film) having excellent adhesiveness not only to paper which is an absorbable recording medium but also to a nonabsorbable recording medium.

In view of the above, in an ink composition for ink jet disclosed in JP2013-199602A, an aqueous emulsion disclosed in JP2000-136211A, and a colored photosensitive composition disclosed in JP2011-213114A, sensitivity to light tends to be insufficient, and adhesiveness to all formed cured films (images) tends to be insufficient.

In paragraph 0009 of JP2009-542833A, it is disclosed that "ink jet ink according to the present invention is mainly cured, that is, dried by polymerization of monomers existing as described above, and thus is a curable-type ink. Therefore, ink does not require the existence of water or a volatile organic solvent for drying, but these components may exist. However, it is preferable that the ink jet ink according to the present invention does not substantially include water or a volatile organic solvent."

It is considered that respective components of the ink for ink jet disclosed in JP2009-542833A are components that are hardly dissolved or dispersed in water. Therefore, it is considered that it is difficult to prepare the ink for ink jet disclosed in JP2009-542833A as an aqueous ink composition.

An embodiment of the present invention is conceived in view of the above circumstances, and a purpose thereof is to achieve the following objects.

That is, the object of the embodiment of the present invention is to provide a water dispersion of gel particles that can form a film having excellent adhesiveness to a base material and a producing method thereof.

Another object of the embodiment of the present invention is to provide an image forming method that can form an image having excellent adhesiveness to a recording medium.

Specific means for solving the problems include the followings.

<1> A water dispersion of gel particles, in which the gel particles having a three-dimensional crosslinked structure including at least one of a polymer structure represented by Formula (1) or a polymer structure represented by Formula (2), having a hydrophilic group and a polymerizable group, and including photopolymerization initiators are dispersed in water,

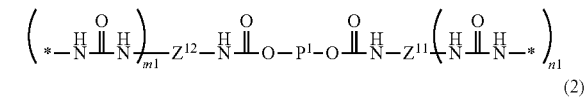

(1)

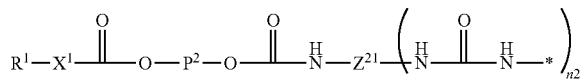

(2)

in Formula (1), $P^1$ represents a polymer chain consisting of polyester, polycarbonate, polycaprolactone, polybutadiene, polyisoprene, or polyolefin and having a number-average molecular weight of 500 or greater, in Formula (1), $Z^{11}$ represents a $(n_1+1)$-valent organic group, $Z^{12}$ represents a $(m_1+1)$-valent organic group, and $n_1$ and $m_1$ each independently represent an integer of 1 or greater, in Formula (2), $P^2$ represents a polymer chain consisting of polyurethane, polyester, polycarbonate, polycaprolactone, polybutadiene, polyisoprene, or polyolefin and having a number-average molecular weight of 500 or greater, in Formula (2), $X^1$ represents a single bond, a —$CH_2$— group, or a —NH— group, $R^1$ represents a hydrocarbon group that may include a hetero atom, $Z^{21}$ represents a $(n_2+1)$-valent organic group, and $n_2$ represents an integer of 1 or greater, and in Formulae (1) and (2), * represents a bonding position.

<2> The water dispersion of the gel particles according to <1>, in which a number-average molecular weight of the polymer chain represented by $P^1$ is 1,000 to 40,000, and a number-average molecular weight of the polymer chain represented by $P^2$ is 1,000 to 40,000.

<3> The water dispersion of the gel particles according to <1> or <2>, in which $R^1$ in Formula (2) is a group represented by Formula (2R),

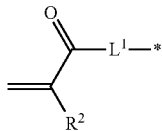

(2R)

in Formula (2R), $L^1$ represents a divalent organic group, $R^2$ represents a hydrogen atom or an alkyl group, and * represents a bonding position.

<4> The water dispersion of gel particles according to any one of <1> to <3>, in which the gel particles include a polymerizable monomer.

<5> The water dispersion of gel particles according to <4>, in which the polymerizable monomer is a (meth) acrylate monomer.

<6> The water dispersion of gel particles according to <4> or <5>, in which the polymerizable monomer is a trifunctional or higher functional acrylate monomer.

<7> The water dispersion of gel particles according to any one of <1> to <6>, in which solubility of the photopolymerization initiator to water is 1.0 mass % or less at 25° C.

<8> The water dispersion of gel particles according to any one of <1> to <7>, in which the photopolymerization initiator is an acylphosphine oxide compound.

<9> The water dispersion of gel particles according to any one of <1> to <8>, in which the gel particles include a sensitizer.

<10> The water dispersion of gel particles according to any one of <1> to <9>, in which the hydrophilic group is at least one selected from the group consisting of a carboxyl group, a salt of the carboxyl group, a sulfo group, a salt of the sulfo group, a sulfate group, a salt of the sulfate group, a phosphonic acid group, a salt of the phosphonic acid group, a phosphoric acid group, a salt of the phosphoric acid group, an ammonium salt group, a betaine group, and an alkyleneoxy group.

<11> The water dispersion of gel particles according to any one of <1> to <10>, used in ink jet recording.

<12> The water dispersion of gel particles according to any one of <1> to <11>, in which a total solid content of the gel particles is 50 mass % or greater with respect to a total solid content of the water dispersion.

<13> The water dispersion of the gel particles according to any one of <1> to <12>, in which a polymer structure represented by Formula (1) is a structure derived from an isocyanate group-containing polymer represented by Formula (1P), the polymer structure represented by Formula (2) is a structure derived from an isocyanate group-containing polymer represented by Formula (2P),

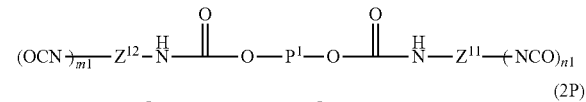

(1P)

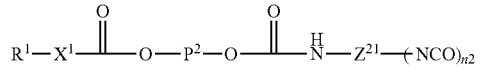

(2P)

in Formula (1P), $P^1$ represents a polymer chain consisting of polyester, polycarbonate, polycaprolactone, polybutadiene, polyisoprene, or polyolefin and having a number-average molecular weight of 500 or greater, in Formula (1P), $Z^{11}$ represents a $(n_1+1)$-valent organic group, $Z^{12}$ represents a $(m_1+1)$-valent organic group, and $n_1$ and $m_1$ each independently represent an integer of 1 or greater, in Formula (2P), $P^2$ represents a polymer chain consisting of polyurethane, polyester, polycarbonate, polycaprolactone, polybutadiene, polyisoprene, or polyolefin and having a number-average molecular weight of 500 or greater, and in Formula (2P), $X^1$ represents a single bond, a —$CH_2$— group, or a —NH— group, $R^1$ represents a hydrocarbon group that may include a hetero atom, $Z^{21}$ represents a $(n_2+1)$-valent organic group, and $n_2$ represents an integer of 1 or greater.

<14> A method of producing the water dispersion of gel particles according to <13>, comprising:

a preparation step of preparing at least one of the isocyanate group-containing polymer represented by Formula (1P) or the isocyanate group-containing polymer represented by Formula (2P);

an emulsification step of obtaining an emulsion by mixing and emulsifying an oil phase component including at least one of the isocyanate group-containing polymer represented by Formula (1P) or the isocyanate group-containing polymer represented by Formula (2P), the photopolymerization initiator, and an organic solvent and a water phase component including water; and a gelation step of obtaining the water dispersion of gel particles by heating the emulsion and at least causing at least one of the isocyanate group-containing polymer represented by Formula (1P) or the isocyanate group-containing polymer represented by Formula (2P) and water to react with each other.

<15> The method of producing the water dispersion of gel particles according to <14>, in which a preparation step of preparing at least one of the isocyanate group-containing polymer represented by Formula (1P) or the isocyanate group-containing polymer represented by Formula (2P) includes at least one of:

a stage of obtaining the isocyanate group-containing polymer represented by Formula (1P) by causing polymer diol represented by Formula (1PD) and a polyfunctional isocyanate compound represented by Formula (ZC) to react with each other, or a stage of obtaining the isocyanate group-containing polymer represented by Formula (2P) by causing polymer diol represented by Formula (2PD) and a terminal sealing agent represented by Formula (M1) or a terminal sealing agent represented by Formula (M2) or an anhydride thereof to react with each other, obtaining a one-terminal sealing polymer represented by Formula (2PO), and causing the one-terminal sealing polymer and a polyfunctional isocyanate compound represented by Formula (ZC) to react with each other,

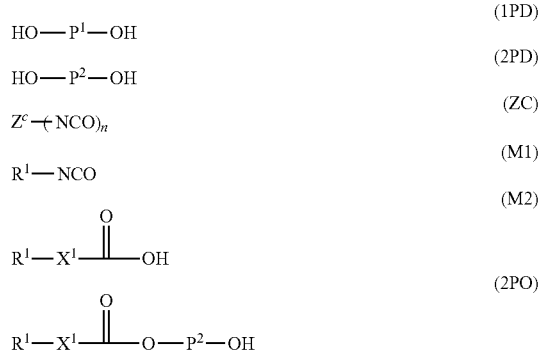

in Formula (1PD), $P^1$ represents a polymer chain consisting of polyester, polycarbonate, polycaprolactone, polybutadiene, polyisoprene, or polyolefin and having a having a number-average molecular weight of 500 or greater, in Formulae (2PD) and (2PO), $P^2$ represents a polymer chain consisting of polyurethane, polyester, polycarbonate, polycaprolactone, polybutadiene, polyisoprene, or polyolefin and having a number-average molecular weight of 500 or greater, in Formula (ZC), $Z^C$ represents a $n_c$-valent organic group, and $n_c$ represents an integer of 2 or greater, in Formulae (M2) and (2PO), $X^1$ represents a single bond, a —$CH_2$— group, or a —NH— group, and in Formulae (M1), (M2), and (2PO), $R^1$ represents a hydrocarbon group that may include a hetero atom.

<16> An image forming method comprising: an application step of applying the water dispersion of gel particles according to any one of <1> to <13> on a recording medium; and an irradiation step of irradiating the water dispersion of gel particles applied to the recording medium with active energy rays.

An embodiment of the present invention provides a water dispersion of gel particles that can form a film having excellent adhesiveness to a base material and a producing method thereof.

An embodiment of the present invention provides an image forming method that can form an image having excellent adhesiveness to a recording medium.

DESCRIPTION OF THE PREFERRED EMBODIMENTS

Specific embodiments of the present invention are described in detail, but the present invention is not limited to the following embodiments.

In the present specification, a numerical range described by using "to" represents a range including numerical values described before and after "to" as a minimum value and a maximum value, respectively.

In the present specification, unless described otherwise, in a case where there are a plurality of substances corresponding to the respective components in a composition, an amount of each of the components in the composition means a total amount of a plurality of corresponding substances existing in the composition.

In the present specification, the term "step" does not only mean an independent step, even in a case where a step cannot be clearly differentiated from other steps, in a case where the step accomplishes a predetermined purpose, the step is included in this term.

In the present specification, "light" is a concept including active energy rays such as γ rays, β rays, electron beams, ultraviolet rays, visible rays, and infrared rays.

In the present specification, ultraviolet rays may be referred to as "ultra violet (UV) light".

In the present specification, light generated from a light emitting diode (LED) light source may be referred to as an "LED light".

In the present specification, "(meth)acrylic acid" is a concept including both acrylic acid and methacrylic acid, "(meth)acrylate" is a concept including both acrylate and methacrylate, a "(meth)acryloyl group" is a concept including both an acryloyl group and a methacryloyl group.

In the present specification, "*" in a chemical formula indicates a bonding position.

[Water Dispersion of Gel Particles]

The water dispersion (hereinafter, referred to as "the water dispersion of the present disclosure" or simply as "water dispersion") of gel particles of the present disclosure is a water dispersion in which the gel particles having a three-dimensional crosslinked structure including at least one of the polymer structure represented by Formula (1) (hereinafter, referred to as "Polymer Structure (1)") or the polymer structure represented by Formula (2) (hereinafter, referred to as "Polymer Structure (2)"), having a hydrophilic group and polymerizable group, and including a photopolymerization initiator are dispersed in water.

(1)

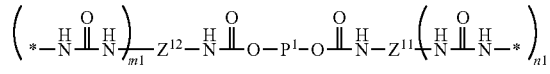

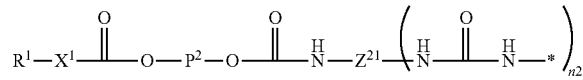
(2)

In Formula (1), $P^1$ represents a polymer chain consisting of polyester, polycarbonate, polycaprolactone, polybutadiene, polyisoprene, or polyolefin and having a number-average molecular weight of 500 or greater.

In Formula (1), $Z^{11}$ represents a $(n_1+1)$-valent organic group, $Z^{12}$ represents a $(m_1+1)$-valent organic group, $n_1$ and $m_1$ each independently represent an integer of 1 or greater.

In Formula (2), $P^2$ represents a polymer chain consisting of polyurethane, polyester, polycarbonate, polycaprolactone, polybutadiene, polyisoprene, or polyolefin and having a number-average molecular weight of 500 or greater.

In Formula (2), $X^1$ represents a single bond, a —$CH_2$— group, or a —NH— group, $R^1$ represents a hydrocarbon group that may include a hetero atom, $Z^{21}$ represents a $(n_2+1)$-valent organic group, and $n_2$ represents an integer of 1 or greater.

In Formulae (1) and (2), * represents a bonding position.

In the water dispersion of the present disclosure, it is possible to form a film having excellent adhesiveness to a base material.

Specifically, in the water dispersion of the present disclosure, since the gel particles have a polymerizable group and include a photopolymerization initiator, a distance between a polymerizable group and a photopolymerization initiator becomes closer to each other, compared with a photocurable composition (for example, photocurable ink) in the related art, and thus curing sensitivity (hereinafter, simply referred to as "sensitivity") to the irradiation with active energy rays is enhanced. Since the photopolymerization initiator is dispersed in a state of being included in the gel particles, sedimentation of the photopolymerization initiator is suppressed compared with the case where a photopolymerization initiator not included in the gel particles is dispersed, and thus excellent sensitivity is maintained. For these reasons, adhesiveness of the formed film is enhanced.

The gel particles have a three-dimensional crosslinked structure including at least one of Polymer Structure (1) or Polymer Structure (2). This three-dimensional crosslinked structure is a firmer structure than a three-dimensional crosslinked structure not having neither of Polymer Structure (1) and Polymer Structure (2). Since the gel particles have a corresponding firm three-dimensional crosslinked structure, curing shrinkage of a film is suppressed in a case of photocuring. Accordingly, the decrease of adhesiveness accompanied by curing shrinkage was suppressed. In a case where the curing shrinkage of the film in a case of photocuring is remarkable, adhesiveness between a film and a base material tends to decrease.

In the water dispersion of the present disclosure, the gel particles have a hydrophilic group, and dispersibility of the gel particles to water.

With respect to the water dispersion of the present disclosure, a resin emulsion in an ink composition for ink jet disclosed in JP2013-199602A and an aqueous emulsion disclosed in JP2000-136211A both do not have a three-dimensional crosslinked structure and are not gel particles.

This microgel in the colored photosensitive composition disclosed in JP2011-213114A does not have a polymerizable group. This microgel does not have neither of Polymer Structure (1) and Polymer Structure (2).

Accordingly, it is considered that a cured film formed by techniques of any documents also have deteriorated adhesiveness to a base material compared with the cured film formed by using the water dispersion of the present disclosure.

Particularly, in a case where a film is formed on a base material including a plastic material such as polyvinyl chloride (PVC), polystyrene (PS), polycarbonate (PC), polyethylene terephthalate (PET), glycol-modified PET, polypropylene (PP), and an acrylic resin, the water dispersion of the present disclosure has an advantage in that adhesiveness to a base material can be enhanced by selecting a material of a polymer chain represented by $P^1$ or $P^2$ according to a material of the base material. That is, the water dispersion of the present disclosure has an advantage in that the base material can be selected in a wider range.

In view of the adhesiveness between a base material and a film, examples of the preferable combinations of a material of a base material and a material of a polymer chain represented by $P^1$ or $P^2$ include the following combination.

Examples of the preferable combination include a combination of PS as a material of a base material and polycaprolactone, polybutadiene, polyisoprene, or polyolefin as a material of a polymer chain represented by $P^1$ or $P^2$.

Examples of the preferable combination include a combination of PET as a material of a base material and polyester, polycarbonate, or polycaprolactone as a material of a polymer chain represented by $P^1$ or $P^2$.

Examples of the preferable combination include a combination of glycol-modified PET as a material of a base material and polyester as a material of a polymer chain represented by $P^1$ or $P^2$.

Examples of the preferable combination include a combination of polypropylene as a material of a base material and polyester, polycarbonate, or polycaprolactone as a material of a polymer chain represented by $P^1$ or $P^2$.

Examples of the preferable combination include a combination of an acrylic resin as a material of a base material and polyester, polycarbonate, or polycaprolactone (more preferably polyester or polycarbonate) as a material of a polymer chain represented by $P^1$ or $P^2$.

All kinds of materials as a material of a polymer chain represented by $P^1$ or $P^2$ have excellent adhesiveness to a base material including PVC or PC.

According to the water dispersion of the present disclosure, it is possible to form a film having excellent hardness (for example, pencil hardness).

It is considered that the reason is because, in the water dispersion of the present disclosure, as described above, the gel particles have a polymerizable group and include a photopolymerization initiator, the curing sensitivity is enhanced.

The fact that the three-dimensional crosslinked structure is a firm structure including at least one of Polymer Structure (1) or Polymer Structure (2) contributes to hardness (for example, pencil hardness) of a film.

Since the water dispersion of the present disclosure is excellent in curing sensitivity, it is possible to form a film having excellent fixing properties to a base material and also having excellent water resistance and excellent solvent resistance with the water dispersion of the present disclosure.

Here, the "fixing properties of the film" are properties evaluated by an exposure amount until the film becomes sticky in a case where a film formed in a base material is exposed.

However, redispersibility is required to the water dispersion of the particles.

Here, the expression "redispersibility" refers to properties in which an aqueous liquid (for example, water, an aqueous liquid, or a water dispersion) is supplied to a solidified matter formed by evaporating water in a water dispersion, and particles in the solidified matter are dispersed again in the aqueous liquid. Examples of the solidified matter include a solidified matter of a water dispersion formed on a coating head or an ink jet head.

The water dispersion of the present disclosure has excellent redispersibility as described above. It is considered that this is because, the particles have a three-dimensional crosslinked structure (that is, the particles are gel particles), structures of the respective particles become firm, and as a result, aggregation or coalescence of particles with each other are suppressed.

Therefore, even in a case where water in the water dispersion evaporated so as to form a solidified matter, water-based liquid (for example, water, a water dispersion, aqueous liquid) is supplied to a solidified matter such that particles in the solidified matter are easily redispersed in a water-based liquid.

A hydrophilic group included in gel particles obviously contributes to the dispersibility and redispersibility of the gel particles.

In the water dispersion of the present disclosure, as described above, aggregation between particles with each other (gel particles with each other) is suppressed, and thus the water dispersion of the present disclosure is excellent in preservation stability.

The fact that the gel particles include a photopolymerization initiator has an advantage in that a photopolymerization initiator (for example, a photopolymerization initiator of which solubility to water is 1.0 mass % or less at 25° C.) having low solubility to water can be easily used as a photopolymerization initiator.

In a case where gel particles include a photopolymerization initiator, there is an advantage in that a photopolymerization initiator to be used can be selected in a wider range.

Examples of the photopolymerization initiator having low solubility to water include an acylphosphine oxide compound (for example, a monoacylphosphine oxide compound and a bisacylphosphine oxide compound, a bisacylphosphine oxide compound is preferable. The same is applied below).

The acylphosphine oxide compound is a photopolymerization initiator having particularly excellent curing sensitivity to irradiation with active energy rays. However, since an acylphosphine oxide compound has low solubility to water, there was a problem in that an acylphosphine oxide compound is hardly contained in an aqueous composition (for example, even in a case where an acylphosphine oxide compound is contained, a large amount thereof cannot be contained) in the related art.

In the water dispersion of the present disclosure, in a case where the gel particles include a photopolymerization initiator, an acylphosphine oxide compound of which sensitivity to light is excellent but solubility to water is low and a photopolymerization initiator such as a carbonyl compound and an acylphosphine oxide compound can be selected.

In a case where the photopolymerization initiator is an acylphosphine oxide compound, sensitivity to light, particularly, sensitivity to LED light is enhanced.

The wavelength of the LED light is preferably 355 nm, 365 nm, 385 nm, 395 nm, or 405 nm.

The gel particles can include a component other than the photopolymerization initiator (such as a polymerizable monomer and a sensitizer).

In the water dispersion of the present disclosure, a substance having low solubility to water is caused to be included in the gel particles such that the substance can be caused to be contained in the water dispersion liquid which is an aqueous composition. This is one of advantages of the water dispersion of the present disclosure.

<Inclusion>

In the present specification, the expression "a photopolymerization initiator is included in gel particles" means that a photopolymerization initiator is included inside the gel particles. Here, the expression "inside the gel particles" means cavities in a three-dimensional crosslinked structure.

In the water dispersion liquid of the present disclosure, in view of curing sensitivity of the film, an inclusion ratio (mass %) of the photopolymerization initiator is preferably 10 mass % or greater, more preferably 50 mass % or greater, even more preferably 70 mass % or greater, even more preferably 80 mass % or greater, even more preferably 90 mass % or greater, even more preferably 95 mass % or greater, even more preferably 97 mass % or greater, and particularly preferably 99 mass % or greater, in view of curing sensitivity of the film.

In a case where two or more photopolymerization initiators are contained in the water dispersion liquid, an inclusion ratio of at least one photopolymerization initiator is preferably in the above range.

Here, the inclusion ratio (mass %) of the photopolymerization initiator means an amount of the photopolymerization initiator included in the gel particles with respect to the total amount of the photopolymerization initiator in the water dispersion and refers to a value obtained as follows.

—Method of Measuring Inclusion Ratio (Mass %) of Photopolymerization Initiator—

The following operations are performed in the condition of the liquid temperature of 25° C.

In a case where a water dispersion is not contained in a pigment, the following operations are performed using this water dispersion without change. In a case where a water dispersion contains a pigment, a pigment is removed from the water dispersion by centrifugation, and the following operations are performed on the water dispersion from which the pigment is removed.

First, two samples (hereinafter, referred to as "Sample 1" and "Sample 2") in the same mass are collected from the water dispersion which was a measurement target of an inclusion ratio (mass %) of the photopolymerization initiator.

With respect to Sample 1, 100 times by mass of tetrahydrofuran (THF) is mixed with a total solid content of Sample 1 so as to prepare a diluent. Centrifugation is performed in the condition of 40 minutes on the obtained diluent, at 80,000 rpm (round per minute; The same is applied to the followings). A supernatant (hereinafter, referred to as "Supernatant 1") generated by centrifugation is collected. It is considered that all of the photopolymerization initiator included in Sample 1 is extracted to Supernatant 1 according to this operation. The mass of the photopolymerization initiator included in Supernatant 1 collected is measured by liquid chromatography (for example, a liquid chromatography device manufactured by Waters Corporation). The mass of the obtained photopolymerization initiator is referred to as a "total amount of a photopolymerization initiator".

Centrifugation in the same condition of the centrifugation performed by the diluent was performed on Sample 2. A supernatant (hereinafter, referred to as "Supernatant 2") generated by centrifugation is collected. According to this operation, it is considered that a photopolymerization initiator that is not included in (that is, that is free from) the gel particles is extracted to Supernatant 2 in Sample 2. The mass of the photopolymerization initiator included in Supernatant 2 collected is measured by liquid chromatography (for example, a liquid chromatography device manufactured by Shimadzu Corporation). A mass of the obtained photopolymerization initiator is a "free amount of the photopolymerization initiator".

An inclusion ratio (mass %) of the photopolymerization initiator is obtained by the following equation based on the total amount of the photopolymerization initiator and the free amount of the photopolymerization initiator.

Inclusion ratio (mass %) of photopolymerization initiator=((total amount of photopolymerization initiator−free amount of photopolymerization initiator)/total amount of photopolymerization initiator)×100

In a case where the water dispersion includes two or more photopolymerization initiators, an entire inclusion ratio of two or more of the photopolymerization initiators may be obtained by using a total amount of the two or more photopolymerization initiators is set as a "total amount of the photopolymerization initiator" and using a sum of free amounts of the two or more photopolymerization initiators as a "free amount of the photopolymerization initiator", and an inclusion ratio of any one of the photopolymerization initiators may be obtained by using an amount of any one photopolymerization initiator as a "total amount of the photopolymerization initiator" and using a free amount of one of the photopolymerization initiators as a "free amount of the photopolymerization initiator".

In the water dispersion, whether components other than the photopolymerization initiator are included in the gel particles can be confirmed in the same manner as the method of examining whether the photopolymerization initiator is included.

However, with respect to the compound having a molecular weight of 1,000 or greater, masses of the compounds included in Supernatants 1 and 2 are measured by gel permeation chromatography (GPC), so as to obtain inclusion ratios (mass %) of the compound as a "total amount of the compound" and a "free amount of the compound".

<Three-Dimensional Crosslinked Structure>

In the present disclosure, the "three-dimensional crosslinked structure" refers to a three-dimensional mesh structure formed by crosslinking. In the water dispersion according to the present disclosure, the gel particles are formed by forming a three-dimensional crosslinked structure in the particles.

That is, in the present specification, the expression "the particles have a three-dimensional crosslinked structure" has the same meaning as the expression "the particles are the gel particles".

The content of the three-dimensional crosslinked structure in the gel particles is preferably 20 mass % to 98 mass %, more preferably 20 mass % to 95 mass %, even more preferably 30 mass % to 90 mass %, and even more preferably 35 mass % to 85 mass % with respect to a total solid content of the gel particles.

Whether the water dispersion of the present disclosure includes gel particles having a three-dimensional crosslinked structure is checked as follows. The following operations are performed in the liquid temperature condition of 25° C. In a case where the water dispersion is not contained in the pigment, the following operations are performed by using this water dispersion without change, and in a case where the water dispersion is contained in the pigment, a pigment was removed from the water dispersion by centrifugation and the following operations are performed on the water dispersion from which the pigment is removed.

Samples are gathered from the water dispersion. With respect to the gathered samples, 100 times by mass of tetrahydrofuran (THF) is added and mixed with respect to the total solid content of the sample so as to prepare a diluent. With respect to the obtained diluent, centrifugation is performed under the conditions of 80,000 rpm and 40 minutes. After the centrifugation, whether there are residues is visually checked. In a case where there are residues, the residues are re-dispersed with water, a redispersion liquid is prepared, and a particle size distribution of the redispersion liquid is measured by a light scattering method by using a wet-type particle size distribution determination device (LA-910, manufactured by Horiba Ltd.).

A case where particle size distribution can be checked by the operation described above is determined that the water dispersion includes gel particles having a three-dimensional crosslinked structure.

The three-dimensional crosslinked structure is not particularly limited, as long as the three-dimensional crosslinked structure includes Polymer Structure (1) and Polymer Structure (2). However, it is preferable to include a structure derived from at least one of the following isocyanate group-containing polymer represented by Formula (1P) or the following isocyanate group-containing polymer represented by Formula (2P).

It is preferable that Polymer Structure (1) is a structure derived from the following isocyanate group-containing polymer represented by Formula (1P).

It is preferable that Polymer Structure (2) is a structure derived from the following isocyanate group-containing polymer represented by Formula (2P).

These isocyanate group-containing polymers are provided below.

In the present disclosure, gel particles having a polymerizable group mean gel particles having at least one of a polymerizable group included in a three-dimensional crosslinked structure or a polymerizable group that is not included in a three-dimensional crosslinked structure.

That is, in the gel particles, the polymerizable group may exist as a portion of a three-dimensional crosslinked structure and may exist as a portion other than a three-dimensional crosslinked structure.

Here, the expression "a polymerizable group exists as a portion other than a three-dimensional crosslinked structure" means that a monomer (hereinafter, also referred to as a "polymerizable monomer") having a polymerizable group is included in gel particles, independently from a three-dimensional crosslinked structure.

In any cases, it is preferable that the polymerizable group exists in surface portions (contact portion with water) of the gel particles.

The fact that "gel particles have a polymerizable group" can be checked, for example, by Fourier transform infrared spectroscopy (FT-IR) analysis.

Specific examples of the polymerizable monomer are provided below.

The polymerizable group is preferably a group including an ethylenic double bond and more preferably a group including at least one of a vinyl group or a 1-methylvinyl group.

In view of adhesiveness to a film, hardness, flexibility of a film, and fixing properties (that is, reactivity in a case of photocuring), the polymerizable group is particularly preferably a (meth)acryloyl group.

According to the present disclosure, the gel particles having a hydrophilic group mean gel particles having at least one of a hydrophilic group included in a three-dimensional crosslinked structure or a hydrophilic group not included in a three-dimensional crosslinked structure.

That is, in the gel particles, a hydrophilic group may exist as a portion of a three-dimensional crosslinked structure and may exist as a portion other than the three-dimensional crosslinked structure.

Here, the expression "a hydrophilic group exists as a portion other than the three-dimensional crosslinked structure" means that a compound having a hydrophilic group is included in the gel particles, independently from a three-dimensional crosslinked structure.

In any cases, a hydrophilic group preferably exists on surface portions (contact portions with water) to gel particles.

It is possible to check whether the gel particles have a hydrophilic group, for example, by Fourier transform infrared spectroscopy (FT-IR) analysis.

In view of dispersibility of the gel particles and preservation stability of the water dispersion, the hydrophilic group included in the gel particles is preferably a carboxyl group, a salt of the carboxyl group, a sulfo group, a salt of the sulfo group, a sulfate group, a salt of the sulfate group, a phosphonic acid group, a salt of the phosphonic acid group, a phosphoric acid group, a salt of the phosphoric acid group, an ammonium salt group, a betaine group, or an alkyleneoxy group.

The gel particles may have only one kind of hydrophilic groups or may have two or more kinds thereof.

The above salt of the carboxyl group, the above salt of the sulfo group, the above salt of the sulfate group, the above salt of the phosphonic acid group, and the above salt of the phosphoric acid group may be salts formed by neutralization in the course of the producing of the gel particles.

Each of the above salt of the carboxyl group, the above salt of the sulfo group, the above salt of the sulfate group, the above salt of the phosphonic acid group, and the above salt of the phosphoric acid group is preferably alkali metal salts (for example, sodium salt and potassium salt).

In view of dispersibility of gel particles and preservation stability of a water dispersion, the hydrophilic group included in the gel particles is particularly preferably at least one group selected from the group consisting of a salt of a carboxyl group, a salt of a sulfo group, a salt of a sulfate group, and an alkyleneoxy group.

In the water dispersion of the present disclosure, the volume-average particle diameter of the gel particles is preferably 0.05 µm to 0.60 µm.

In a case where the volume-average particle diameter of the gel particles is 0.05 µm or greater, the gel particles can be easily produced, preservation stability of the water dispersion is enhanced.

The volume-average particle diameter of the gel particles is more preferably 0.10 µm or greater.

Meanwhile, in a case where the volume-average particle diameter of the gel particles is 0.60 µm or less, redispersibility of the water dispersion, jettability, and preservation stability are enhanced.

Since redispersibility of the water dispersion is enhanced, the volume-average particle diameter of the gel particles is more preferably 0.50 µm or less, even more preferably 0.40 µm or less, and particularly preferably 0.30 µm or less.

In the present specification, the volume-average particle diameter of the gel particles refers to a value measured by a light scattering method.

The measuring of the volume-average particle diameter of gel particles by a light scattering method is performed by using, for example, LA-910 (manufactured by Horiba Ltd.).

The water dispersion of the present disclosure can be suitably used as a liquid for forming a film (for example, an image) on a base material (for example, a recording medium).

Examples of the liquid include an ink composition (for example, an ink composition for ink jet recording) for forming an image on a base material as a recording medium and a coating solution for forming a coated film on a base material.

Particularly, the water dispersion of the present disclosure is preferably a water dispersion (that is, the water dispersion of the present disclosure is an ink composition for ink jet recording) used in ink jet recording. Accordingly, an image which is excellent in adhesiveness to a recording medium and hardness is formed.

The ink composition (preferably ink composition for ink jet recording) which is one of uses of the water dispersion of the present disclosure may be an ink composition containing a colorant or a transparent ink composition (also referred to as "clear ink" and the like) not containing a colorant.

The same is applied to a coating liquid which is another use of the water dispersion of the present disclosure.

The base material for forming a film is not particularly limited, and well-known base materials can be used.

Examples of the base material include paper, paper obtained by laminating plastic (for example, polyethylene, polypropylene, or polystyrene), a metal plate (for example, a plate of metal such as aluminum, zinc, or copper), a plastic film (for example, a film of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, and an acrylic resin), paper obtained by laminating or vapor-depositing the above metal, and a plastic film obtained by laminating or vapor-depositing the above metal.

Since the water dispersion of the present disclosure can form a film having excellent adhesiveness in a base material, the water dispersion is suitable and particularly suitable for the use of forming a film on a nonabsorbable base material.

The nonabsorbable base material is preferably a plastic base material such as a PVC base material, a PS base material, a PC base material, a PET base material, a glycol-modified PET base material, a PE base material, a PP base material, and an acrylic resin base material.

Hereinafter, each of the components of the water dispersion of the present disclosure is described.

<Gel Particles>

The water dispersion of the present disclosure includes gel particles dispersed in water.

The gel particles have a three-dimensional crosslinked structure including at least one of a polymer structure represented by Formula (1) or a polymer structure represented by Formula (2), having a hydrophilic group and a polymerizable group, and including a photopolymerization initiator.

Hereinafter, component elements in a three-dimensional crosslinked structure are described.

The three-dimensional crosslinked structure includes any one or both of the polymer structure represented by Formula (1) (Polymer Structure (1)) and the polymer structure represented by Formula (2) (Polymer Structure (2)). Accordingly, the three-dimensional crosslinked structure becomes firm.

(Polymer Structure Represented by Formula (1))

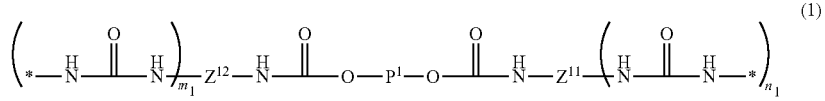

In Formula (1), $P^1$ represents a polymer chain consisting of polyester, polycarbonate, polycaprolactone, polybutadiene, polyisoprene, or polyolefin and having a number-average molecular weight (Mn) of 500 or greater.

In Formula (1), $Z^{11}$ represents a $(n_1+1)$-valent organic group, $Z^{12}$ represents a $(m_1+1)$-valent organic group, $n_1$ and $m_1$ each independently represent an integer of 1 or greater.

In Formula (1), * represents a bonding position.

In Formula (1), $n_1$ and $m_1$ each independently and preferably represent an integer of 2 or greater, preferably represent an integer of 2 to 9, more preferably represent an integer of 2 to 7, and even more preferably represent an integer of 2 to 5.

$Z^{11}$ and $Z^{12}$ in Formula (1) each independently and preferably represent an organic group that may have a hetero atom and that has 2 to 100 carbon atoms (more preferably 4 to 80 carbon atoms, even more preferably 6 to 50 carbon atoms, and even more preferably 6 to 20 carbon atoms).

The hetero atom is preferably an oxygen atom, a nitrogen atom, or a sulfur atom and more preferably an oxygen atom or a nitrogen atom.

$Z^{11}$ and $Z^{12}$ in Formula (1) may be identical to or different from each other. However, in view of easiness (productivity) of forming a three-dimensional crosslinked structure, it is preferable that $Z^{11}$ and $Z^{12}$ are identical to each other.

Hereinafter, an even more preferable range of $Z^{11}$ is described.

The even more preferable range of $Z^{12}$ is the same as the even more preferable range of $Z^{11}$.

As $Z^{11}$ in Formula (1), a trivalent or higher valent group (hereinafter, respectively referred to as "Group (Z-101)" and "Group (Z-102)") represented by Formula (Z-101) or (Z-102) is even more preferable. Among these, Group (Z-101) is even more preferable.

Groups (Z-101) and (Z-102) are residues obtained by excluding an isocyanate group (—NCO group) from a structure of an adduct-type polyfunctional isocyanate compound. The adduct-type polyfunctional isocyanate compound is described below.

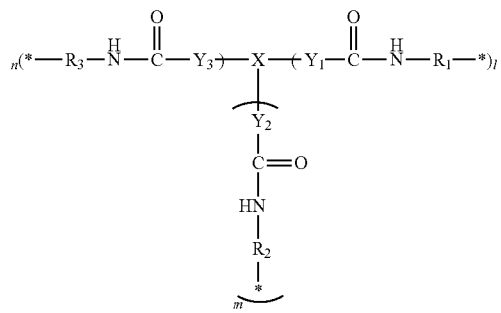

(Z-101)

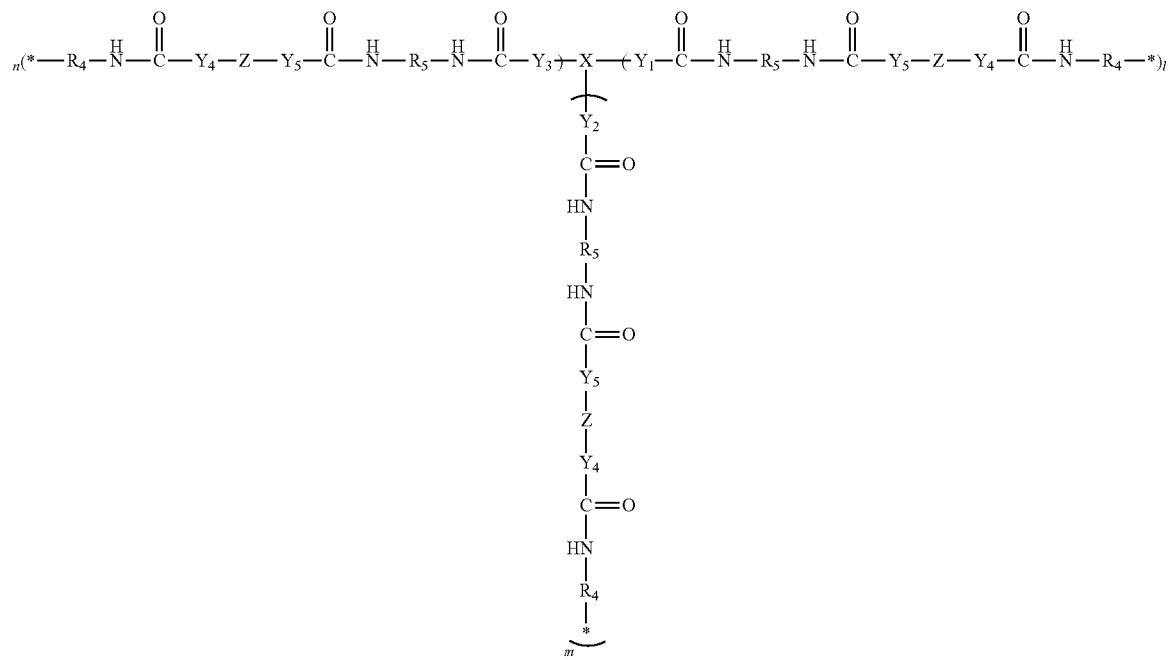

(Z-102)

In Formulae (Z-101) and (Z-102), X represents a (l+m+n)-valent organic group, l, m, and n each represent an integer of 0 or greater, and l+m+n represents an integer of 3 or greater. l+m+n preferably represents an integer of 3 to 10, more preferably an integer of 3 to 8, and even more preferably an integer of 3 to 6.

In Formulae (Z-101) and (Z-102), $Y_1$ to $Y_5$ each independently represent an oxygen atom, a sulfur atom, or a —NH— group, preferably represent a oxygen atom or a sulfur atom, and more preferably an oxygen atom.

In Formulae (Z-101) and (Z-102), Z represents a divalent organic group.

In Formulae (Z-101) and (Z-102), $R_1$ to $R_5$ represent a divalent organic group.

In Formulae (Z-101) and (Z-102), * represents a bonding position.

In Formulae (Z-101) and (Z-102), each of the divalent organic groups represented by $R_1$ to $R_5$ and Z is preferably an alkylene group (that is, chain alkylene group or cyclic alkylene group) having 2 to 100 carbon atoms (more preferably having 4 to 80 carbon atoms, even more preferably having 6 to 50 carbon atoms, even more preferably having 6 to 20 carbon atoms), an arylene group having 6 to 100 carbon atoms (more preferably having 6 to 80 carbon atoms, even more preferably having 6 to 50 carbon atoms, and even more preferably having 6 to 20 carbon atoms), an alkylene arylene group having 7 to 100 carbon atoms (more preferably having 7 to 80 carbon atoms, even more preferably having 7 to 50 carbon atoms, and even more preferably having 7 to 20 carbon atoms), an alkylene arylene alkylene group having 8 to 100 carbon atoms (more preferably having 8 to 80 carbon atoms, even more preferably having 8 to 50 carbon atoms, and even more preferably having 8 to 20 carbon atoms), or an arylene alkylene arylene group having 13 to 100 carbon atoms (more preferably having 13 to 80 carbon atoms, even more preferably having 13 to 50 carbon atoms, and even more preferably having 13 to 20 carbon atoms).

A divalent organic group represented by $R_1$ to $R_5$ and Z is more preferably a group (hereinafter, also referred to as Group (Z-1) to Group (Z-20)) represented by any one of Formulae (Z-1) to (Z-20). In Formulae (Z-1) to (Z-20), * represents a bonding position.

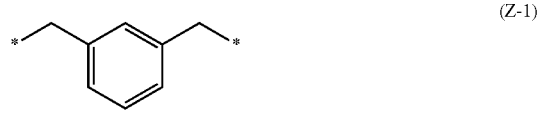

(Z-1)

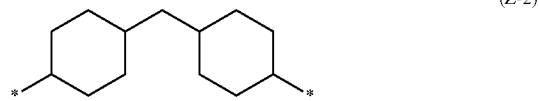

(Z-2)

(Z-3)

(Z-4)

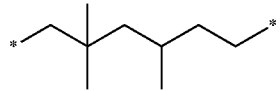

(Z-5)

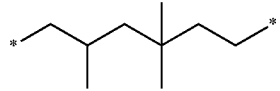

(Z-6)

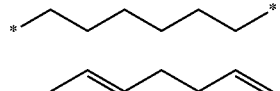

(Z-7)

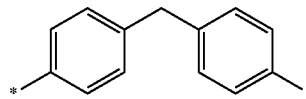

(Z-8)

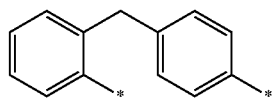

(Z-9)

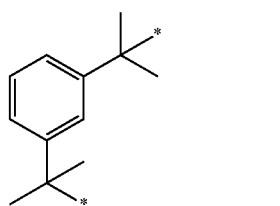

(Z-10)

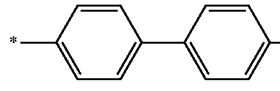

(Z-11)

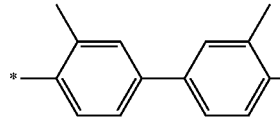

(Z-12)

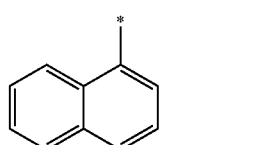

(Z-13)

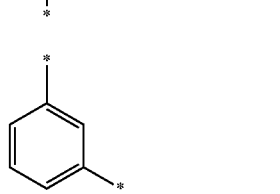

(Z-14)

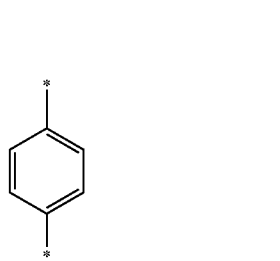

(Z-15)

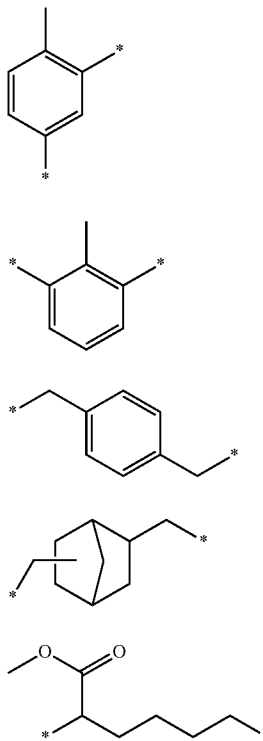
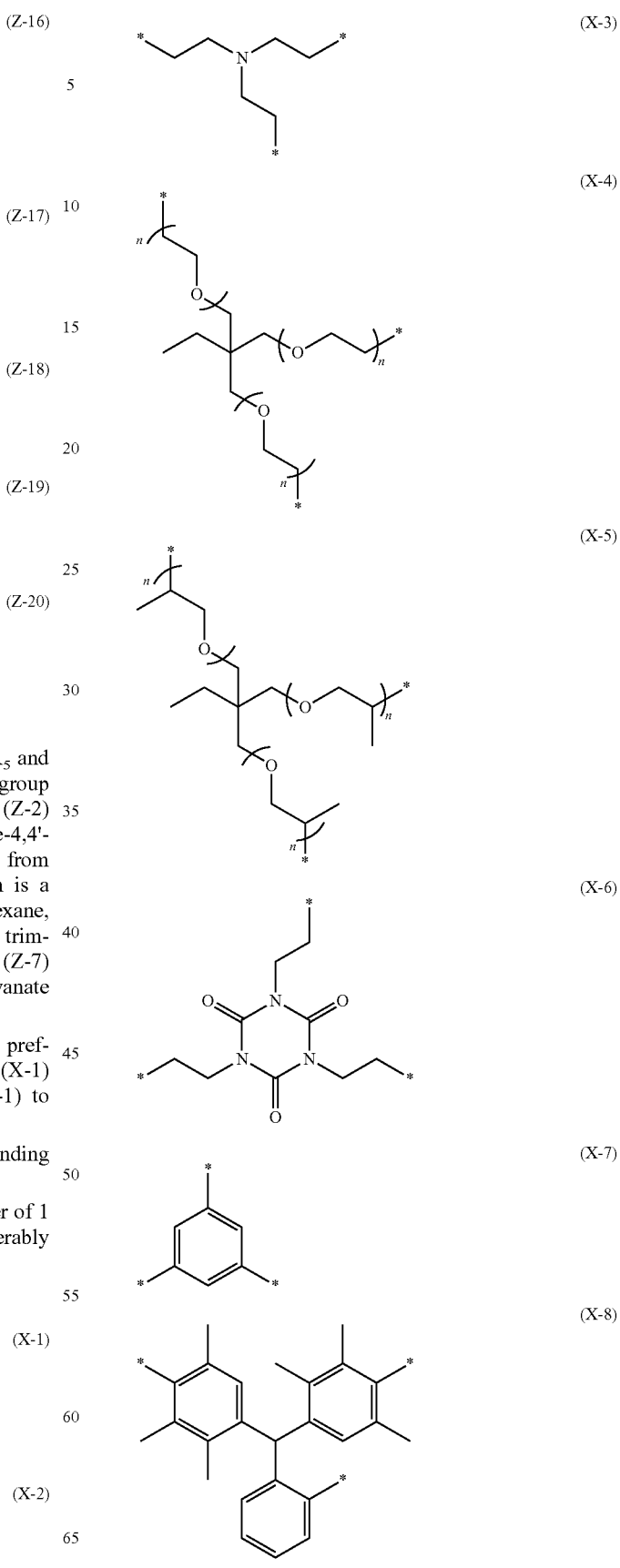

The divalent organic groups represented by $R_1$ to $R_5$ and Z is particularly preferably Group (Z-1) which is a group derived from m-xylylene diisocyanate (XDI), Group (Z-2) which is a group derived from dicyclohexylmethane-4,4'-diisocyanate, Group (Z-3) which is a group derived from isophorone diisocyanate (IPDI), Group (Z-4) which is a group derived from 1,3-bis(isocyanatomethyl) cyclohexane, Group (Z-5) or (Z-6) which is a group derived from trimethylhexamethylene diisocyanate (TMHDI), or Group (Z-7) which is a group derived from hexamethylene diisocyanate (HDI).

In Formulae (Z-101) and (Z-102), X is particularly preferably a group (hereinafter, also referred to as Group (X-1) to (X-13)) represented by any one of Formula (X-1) to (X-13).

In Formulae (X-1) to (X-13), * represents a bonding position.

In Formulae (X-1) to (X-13), n represents an integer of 1 to 200 (preferably an integer of 1 to 50 and more preferably an integer of 1 to 15).

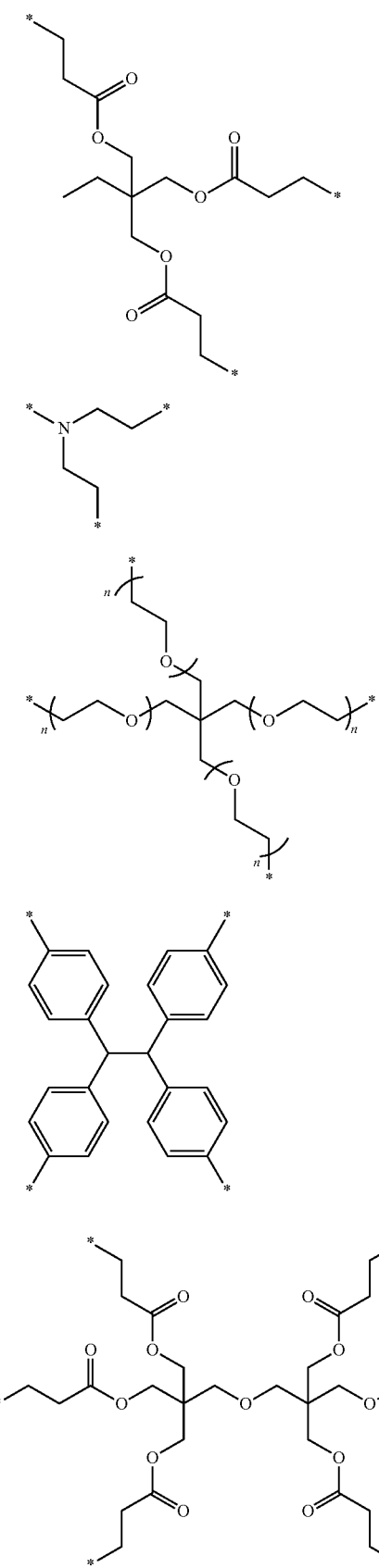

(X-9)

(X-10)

(X-11)

(X-12)

(X-13)

$Z^{11}$ in Formula (1) is also preferably a trivalent or higher valent group (hereinafter, also respectively referred to as "Group (Z-103)" and "Group (Z-104)") represented by Formula (Z-103) or (Z-104).

Group (Z-103) is a residue excluding an isocyanate group (NCO group) from a structure of a biuret-type polyfunctional isocyanate compound.

Group (Z-104) is a residue excluding an isocyanate group (NCO group) from an isocyanurate-type polyfunctional isocyanate compound.

A biuret-type polyfunctional isocyanate compound and an isocyanurate-type polyfunctional isocyanate compound are described below.

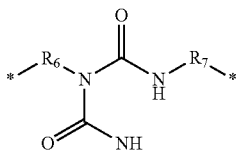

(Z-103)

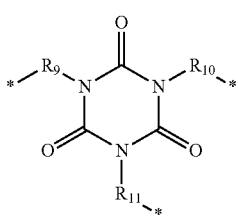

(Z-104)

In Formulae (Z-103) and (Z-104), $R_6$ to $R_{11}$ each represent a divalent organic group.

A preferable range of a divalent organic group represented by $R_6$ to $R_{11}$ in Formulae (Z-103) and (Z-104) is the same as the preferable range of the divalent organic group represented by $R_1$ to $R_5$ and Z in Formulae (Z-101) and (Z-102).

$Z^{11}$ in Formula (1) is a divalent organic group.

The preferable range of $Z^{11}$ in a case of a divalent organic group is the same as the preferable range of a divalent organic group represented by $R_1$ to $R_5$ and Z in Formulae (Z-101) and (Z-102).

In Formula (1), $P^1$ represents a polymer chain consisting of polyester, polycarbonate, polycaprolactone, polybutadiene, polyisoprene, or polyolefin and having a number-average molecular weight (Mn) of 500 or greater.

The number-average molecular weight (Mn) of the polymer chain represented by $P^1$ is preferably 500 to 50,000, more preferably 1,000 to 40,000, and even more preferably 1,000 to 30,000.

In a case where Mn is 500 or greater, adhesiveness and hardness of a film are excellent.

In a case where Mn is 50,000 or less, productivity is excellent.

In the present specification, a number-average molecular weight (Mn) and a weight-average molecular weight (Mw) mean values calculated by gel permeation chromatography (GPC) in terms of polystyrene. As a used column, for example, TSKgel (Registered trademark) SuperHZM-H, TSKgel (Registered trademark) SuperHZ4000, and TSKgel (Registered trademark) SuperHZ200 (above are all manufactured by Tosoh Corporation).

A polymer chain represented by $P^1$ is preferably a residue excluding two hydroxyl groups from polymer diol (herein after, also referred to as "Polymer Diol (1PD)") represented by Formula (1PD) below.

$P^1$ in Formula (1PD) is the same as $P^1$ in Formula (1).

The number-average molecular weight (Mn) of polymer diol represented by Formula (1PD) is preferably 500 or greater, preferably 500 to 50,000, more preferably 1,000 to 40,000, and even more preferably 1,000 to 30,000.

A hydroxyl number (mgKOH/g) of polymer diol represented by Formula (1PD) is preferably 1 mgKOH/g to 500 mgKOH/g, more preferably 2 mgKOH/g to 300 mgKOH/g, and even more preferably 3 mgKOH/g to 250 mgKOH/g.

Here, a hydroxyl number (mgKOH/g) indicates a value measured in conformity with JIS K 1557-1(2007).

A glass transition point (Tg) (particularly, Tg in a case where the polymer chain represented by $P^1$ is a polymer chain consisting of polyester) of polymer diol represented by Formula (1PD) is preferably −100° C. to 100° C., more preferably −70° C. to 80° C., and particularly preferably 0° C. to 80° C.

As the Polymer Diol (1PD), a product obtained by synthesis may be used, or a commercially available product may be used. A commercially available product is described below (see Table 1).

(Polymer Structure Represented by Formula (2))

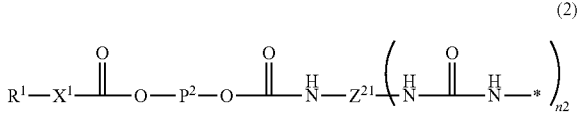

In Formula (2), $P^2$ represents a polymer chain consisting of polyurethane, polyester, polycarbonate, polycaprolactone, polybutadiene, polyisoprene, or polyolefin and having a number-average molecular weight of 500 or greater.

In Formula (2), $X^1$ represents a single bond, a —CH$_2$— group, or a —NH— group, $R^1$ represents a hydrocarbon group that may include a hetero atom, $Z^{21}$ represents a ($n_2$+1)-valent organic group, and $n_2$ represents an integer of 1 or greater.

In Formula (2), * represents a bonding position.

$n_2$ in Formula (2) is the same as $n_1$ in Formula (1), and preferable ranges thereof are also the same.

$Z^{21}$ in Formula (2) is the same as $Z^{11}$ in Formula (1), and preferable ranges thereof are also the same.

$P^2$ in Formula (2) is the same as $P^1$ in Formula (2) except that $P^2$ may be a polymer chain consisting of polyurethane and having a number-average molecular weight of 500 or greater, and the preferable ranges of the number-average molecular weight (Mn) are also the same.

In Formula (2), $R^1$ represents a hydrocarbon group that may include a hetero atom.

The hetero atom is preferably an oxygen atom, a nitrogen atom, or a sulfur atom, and more preferably an oxygen atom or a nitrogen atom.

The number of carbon atoms of a hydrocarbon group that may include a hetero atom represented by $R^1$ is preferably 1 to 30, more preferably 1 to 25, and particularly preferably 1 to 18.

In view of enhancement of hardness and adhesiveness (particularly, hardness) of a film, $R^1$ in Formula (2) is preferably group (hereinafter, also referred to as "Group (2R)") represented by Formula (2R).

Specifically, Group (2R) includes a polymerizable group in a structure. That is, in a case where $R^1$ in Formula (2) is Group (2R), a three-dimensional crosslinked structure includes a polymerizable group. Therefore, in this case, an effect (for example, adhesiveness enhancement effect of a film and hardness enhancement effect of a film) causing gel particles to include a photopolymerization initiator can be effectively exhibited.

In Formula (2R), $L^1$ represents a divalent organic group, $R^2$ represents a hydrogen atom or an alkyl group, and * represents a bonding position.

$L^1$ is preferably an alkyleneoxy group having 1 to 20 carbon atoms (more preferably having 1 to 10 carbon atoms, even more preferably having 1 to 6 carbon atoms, and particularly preferably having 1 to 3 carbon atoms). This alkyleneoxy group is preferably bonded to a carbonyl carbon atom in Formula (2R) on an oxygen atom (oxy group) side.

The alkyleneoxy group represented by $L^1$ is more preferably a methyleneoxy group or an ethyleneoxy group and particularly preferably an ethyleneoxy group.

$R^2$ is preferably a hydrogen atom or an alkylene group having 1 to 20 carbon atoms (more preferably having 1 to 10 carbon atoms, even more preferably having 1 to 6 carbon atoms, and particularly preferably having 1 to 3 carbon atoms), more preferably a hydrogen atom, a methyl group, or an ethyl group, even more preferably a hydrogen atom or a methyl group.

$R^1$ in Formula (2) is not limited to Group (2R) and may be a group (for example, an alkyl group having 1 to 30 carbon atoms (preferably having 1 to 25 carbon atoms and more preferably having 1 to 18 carbon atoms)) not having a polymerizable group.

In Formula (2), a polymer chain represented by $P^2$ is preferably a residue obtained by excluding two hydroxyl groups from polymer diol (hereinafter, also referred to as "Polymer Diol (2PD)") represented by Formula (2PD).

$P^2$ in Formula (2PD) is the same as $P^2$ in Formula (2).

The preferable ranges of Polymer Diol (2PD) is the same as the preferable ranges of Polymer Diol (1PD) except that $P^2$ may be a polymer chain consisting of polyurethane.

Subsequently, raw materials of Polymer Structures (1) and (2) are described.

(Polymer Diol)

As polymer diol (that is, Polymer Diol (1PD) and (2PD)) which is raw materials of Polymer Structure (1) and (2), well-known polymer diol may be used.

Polymer diol may be referred to as polyester diol, polycarbonate diol, polycaprolactone diol, polybutadiene diol, polyisoprene diol, or polyolefin diol, depending on kinds of $P^1$ or $P^2$.

As the polymer diol, commercially available products presented in Table 1 may be used.

TABLE 1

Polymer diol (OH—P$^1$—OH or OH—P$^2$—OH)

| Abbreviation | Product name | Name of manufacturer | P$^1$ or P$^2$ | Mn | Hydroxyl number mgKOH/g |
|---|---|---|---|---|---|
| D7110 | DYNACOLL (Registered trademark) 7110 | Evonik Industries AG | Polyester (PES) | 2000 | 55 |
| D7111 | DYNACOLL (Registered trademark) 7111 | Evonik Industries AG | | 3500 | 30 |
| D7360 | DYNACOLL (Registered trademark) 7360 | Evonik Industries AG | | 3500 | 30 |
| D7361 | DYNACOLL (Registered trademark) 7361 | Evonik Industries AG | | 8500 | 13 |
| P-510 | Kuraray (Registered trademark) PloyolP-510 | Kuraray Co., Ltd. | | 500 | 224 |
| P-1010 | Kuraray (Registered trademark) PloyolP-1010 | Kuraray Co., Ltd. | | 1000 | 112 |
| P-3010 | Kuraray (Registered trademark) PloyolP-3010 | Kuraray Co., Ltd. | | 3000 | 40 |
| P-6010 | Kuraray (Registered trademark) PloyolP-6010 | Kuraray Co., Ltd. | | 6000 | 18.8 |
| P-2020 | Kuraray (Registered trademark) PloyolP-2020 | Kuraray Co., Ltd. | | 2000 | 56 |
| FSK700 | FSK700 | Kawasaki Kasei Chemicals, LTd. | | 700 | 150 |
| FSK2000 | FSK2000 | Kawasaki Kasei Chemicals, LTd. | | 2000 | 90 |
| UE3220 | UE3220 | Unitika Ltd. | | 25000 | 3 |
| UE3500 | UE3500 | Unitika Ltd. | | 30000 | 4 |
| UE3200 | UE3200 | Unitika Ltd. | | 16000 | 6 |
| UE3201 | UE3201 | Unitika Ltd. | | 20000 | 3 |
| UE3210 | UE3210 | Unitika Ltd. | | 20000 | 4 |
| T2462 | TESLAC 2462 | Hitachi Chemical Co., Ltd. | | 2000 | 55 |
| V200 | VYLON (Registered trademark) 200 | Toyobo Co., Ltd. | | 17000 | 6 |
| V240 | VYLON (Registered trademark) 240 | Toyobo Co., Ltd. | | 15000 | 9 |
| V300 | VYLON (Registered trademark) 300 | Toyobo Co., Ltd. | | 23000 | 5 |
| V500 | VYLON (Registered trademark) 500 | Toyobo Co., Ltd. | | 23000 | 5 |
| V802 | VYLON (Registered trademark) 802 | Toyobo Co., Ltd. | | 3000 | 37 |
| VGK360 | VYLON (Registered trademark) GK360 | Toyobo Co., Ltd. | | 16000 | 5 |
| T6002 | DURANOL (Registered trademark) T6002 | Asahi Kasei Chemicals Corporation | Polycarbonate (PC) | 2000 | 55 |
| T6001 | DURANOL (Registered trademark) T6001 | Asahi Kasei Chemicals Corporation | | 1000 | 110 |
| T5650E | DURANOL (Registered trademark) T5650E | Asahi Kasei Chemicals Corporation | | 500 | 225 |
| T5652 | DURANOL (Registered trademark) T5652 | Asahi Kasei Chemicals Corporation | | 2000 | 55 |
| PCD205PL | PLACCEL (Registered trademark) CD205PL | Daicel Corporation | | 500 | 225 |
| PCD210 | PLACCEL (Registered trademark) CD210 | Daicel Corporation | | 1000 | 110 |
| PCD220 | PLACCEL (Registered trademark) CD220 | Daicel Corporation | | 2000 | 55 |
| P205 | PLACCEL (Registered trademark) 205 | Daicel Corporation | Polycaprolactone (PCL) | 530 | 213 |
| P212 | PLACCEL (Registered trademark) 212 | Daicel Corporation | | 1250 | 90 |
| P230 | PLACCEL (Registered trademark) 230 | Daicel Corporation | | 3000 | 38 |
| G-1000 | NISSO-PB (Registered trademark) G-1000 | Nippon Soda Co., Ltd. | Polybutadiene (PBD) | 1400 | 84 |
| G-3000 | NISSO-PB (Registered trademark) G-3000 | Nippon Soda Co., Ltd. | | 3000 | 27 |
| R-45HT | Poly bd R-45HT | Idemitsu Kosan Co., Ltd. | | 2800 | 46.6 |
| POLY IP | POLY IP | Idemitsu Kosan Co., Ltd. | Polyisoprene (PIP) | 2500 | 46.6 |
| BI-2000 | NISSO-PB (Registered trademark) BI-2000 | Nippon Soda Co., Ltd. | Polyolefin (PO) | 2100 | 50 |
| PO-1 | EPOL (Registered trademark) | Idemitsu Kosan Co., Ltd. | | 2500 | 46.6 |

As Polymer Diol (2PD), polymer diol in which P$^2$ is a polymer chain consisting of polyurethane (referred to as "polyurethane diol") can be used.

Polyurethane diol can be synthesized by a well-known synthesis method.

Hereinafter, synthesis examples of Polyurethane Diol PU-1 to PU-10 are provided below.

—Synthesis of Polymer Diol PU-2— m-Xylylene diisocyanate (XDI) (50 g) as an isocyanate compound ("isocyanate" in Table 2), perhydrobisphenol A (70.3 g) as a diol compound ("diol" in Table 2), and methyl ethyl ketone (280.6 g) were weighed to a 500 ml three-neck flask including a cooling pipe and heating and stirring was performed at 50° C. under the nitrogen stream. 0.401 g of NEOSTAN (Registered trademark) U-600 (manufactured by Nitto Kasei Co., Ltd., Inorganic bismuth catalyst; hereinafter, simply referred to as "U-600") was added thereto, and heating and stirring were performed at 50° C. for six hours. The obtained polymer solution was allowed to cool, the reaction solution after cooling was introduced to 2,000 ml of hexane, and vacuum drying was performed before reprecipitation and after purification, so as to obtain 110 g of Polymer Diol PU-2 which is polyurethane diol.

In the synthesis of Polymer Diol PU-2, Polyurethane Diol PU-1 and PU-3 to PU-10 can be synthesized by changing amounts of the respective components as represented in Table 2.

TABLE 2

| | | | | | | Prescription | | | | | |
|---|---|---|---|---|---|---|---|---|---|---|---|
| | Isocyanate | | Diol | | Isocyanate | Diol | MEK | U-600 | | Hydroxyl number |
| Abbreviation | Kind | Mw | Kind | Mw | amount (g) | amount (g) | amount (g) | amount (g) | Mn | mgKOH/g |
| PU-1 | TDI | 174.16 | Perhydrobisphenol A | 240.39 | 50 | 75.9 | 293.8 | 0.420 | 4200 | 26.72 |
| PU-2 | XDI | 188.18 | Perhydrobisphenol A | 240.39 | 50 | 70.3 | 280.6 | 0.401 | 4500 | 24.94 |
| PU-3 | HXDI | 194.23 | Perhydrobisphenol A | 240.39 | 50 | 68.1 | 275.5 | 0.394 | 4500 | 24.94 |
| PU-4 | HDI | 168.19 | Perhydrobisphenol A | 240.39 | 50 | 78.6 | 300.1 | 0.429 | 4100 | 27.37 |
| PU-5 | IPDI | 222.28 | Perhydrobisphenol A | 240.39 | 50 | 59.5 | 255.5 | 0.365 | 4800 | 23.38 |
| PU-6 | HXDI | 194.23 | Ethylene glycol | 62.068 | 50 | 17.6 | 157.7 | 0.225 | 3000 | 37.40 |
| PU-7 | HXDI | 194.23 | 1,6-Hexanediol | 118.18 | 50 | 33.5 | 194.8 | 0.278 | 3500 | 32.06 |
| PU-8 | HXDI | 194.23 | Bisphenol A | 228.29 | 50 | 64.6 | 267.5 | 0.382 | 3000 | 37.40 |
| PU-9 | HXDI | 194.23 | Tripropylene glycol | 192.3 | 50 | 54.5 | 243.7 | 0.348 | 2000 | 56.11 |
| PU-10 | HXDI | 194.23 | Triethylene glycol | 150.17 | 50 | 42.5 | 215.9 | 0.308 | 2500 | 44.88 |

The isocyanate compounds in Table 2 all are difunctional isocyanate compounds, and details thereof are as below.

XDI . . . m-Xylylene diisocyanate
TDI . . . 2,4-Tolylene diisocyanate
HXDI . . . 1,3-Bis(isocyanatomethyl) cyclohexane
HDI . . . Hexamethylene diisocyanate
IPDI . . . Isophorone diisocyanate (Isocyanate Group-Containing Polymer)

Polymer Structure (1) is preferably a structure derived from an isocyanate group-containing polymer (hereinafter, also referred to as "Isocyanate Group-Containing Polymer (1P)") represented by Formula (1P).

A method of forming a three-dimensional crosslinked structure including Polymer Structure (1) is not particularly limited. However, a method of forming the three-dimensional crosslinked structure by at least causing Isocyanate Group-Containing Polymer (1P) and water to react with each other is suitable. This reaction may be reaction between Isocyanate Group-Containing Polymer (1P) and water or may be reaction between Isocyanate Group-Containing Polymer (1P), water, and another isocyanate compound (for example, the following isocyanate compound to which a hydrophilic group is added).

Polymer Structure (2) is preferably a structure derived from an isocyanate group-containing polymer represented by Formula (2P) (hereinafter, also referred to as "Isocyanate Group-Containing Polymer (2P)").

The method of forming a three-dimensional crosslinked structure including Polymer Structure (2) is not particularly limited. However, a method of forming the three-dimensional crosslinked structure at least by causing Isocyanate Group-Containing Polymer (2P) and water to react with each other is suitable. This reaction may be reaction between Isocyanate Group-Containing Polymer (2P) and water or may be reaction between Isocyanate Group-Containing Polymer (2P), water, and another isocyanate compound (for example, the following isocyanate compound to which a hydrophilic group is added) used if necessary.

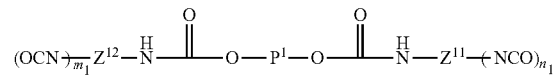

(1P)

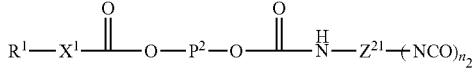

(2P)

In Formula (1P), $P^1$, $Z^{11}$, $Z^{12}$, $n_1$, and $m_1$ are respectively the same as $P^1$, $Z^{11}$, $Z^{12}$, $n_1$, and $m_1$ in Formula (1), and the preferable ranges thereof are also the same.

In Formula (2P), $P^2$, $X^1$, $R^1$, $Z^{21}$, and $n_2$ are respectively the same as $P^2$, $X^1$, $R^1$, $Z^{21}$, and $n_2$ in Formula (2), and the preferable ranges thereof are also the same.

In a case of forming the three-dimensional crosslinked structure, even in a case where any one of Isocyanate Group-Containing Polymer (1P) and Isocyanate Group-Containing Polymer (2P) is used, a urea bond is formed by reacting an isocyanate group (—NCO group) in one specific molecule of the isocyanate group-containing polymer, another —NCO group existing in a reaction system, and water. According to this formation of an urea bond, a three-dimensional crosslinked structure including a polymer structure represented by Formula (1) or (2) is formed.

Here, examples of the other —NCO group existing in a reaction system include a —NCO group in another molecule of an isocyanate group-containing polymer. In a case where the other —NCO group existing in a reaction system includes an isocyanate compound (for example, an isocyanate compound to which a hydrophilic group is added) other than Isocyanate Group-Containing Polymers (1P) and (2P) in the reaction system, examples thereof include a —NCO group in the other isocyanate compound.

In a case of forming a three-dimensional crosslinked structure, in a case where both of Isocyanate Group-Containing Polymers (1P) and (2P) are used, it is possible to form a three-dimensional crosslinked structure including both of the polymer structure represented by Formula (1) and the polymer structure represented by Formula (2).

The fact that a urea bond is formed by reaction between an isocyanate group and water is formed is well-known in the art, and thus descriptions of specific mechanisms of the reaction are omitted in the present specification.

Isocyanate Group-Containing Polymer (1P) can be produced by causing Polymer Diol (1PD) and the polyfunctional isocyanate compound (hereinafter, also referred to as "Isocyanate Compound (ZC)") represented by Formula (ZC) to react with each other.

Isocyanate Group-Containing Polymer (2P) can be produced by causing a one-terminal sealing polymer (hereinafter, also referred to as "One-Terminal Sealing Polymer (2PO)") represented by Formula (2PO) and Isocyanate Compound (ZC) to react with each other.

Here, One-Terminal Sealing Polymer (2PO) can be produced by causing Polymer Diol (2PD) and the following terminal sealing agent (hereinafter, also referred to as "Terminal Sealing Agent (M1)") represented by Formula (M1) to react with each other.

One-Terminal Sealing Polymer (2PO) can be produced by causing Polymer Diol (2PD) and the following terminal sealing agent (hereinafter, also referred to as "Terminal Sealing Agent (M2)") represented by Formula (M2) or an anhydride thereof to react with each other.

Details of the method of producing Isocyanate Group-Containing Polymer (1P) and Isocyanate Group-Containing Polymer (2P) are provided below.

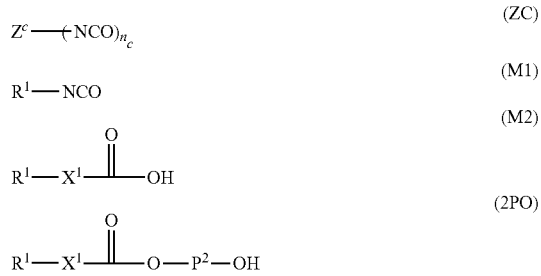

In Formula (ZC), $Z^C$ represents a $n_c$-valent organic group, and $n_c$ represents an integer of 2 or greater.

$Z^C$ and $n_c$ in Formula (ZC) are respectively the same as $Z^{11}$ and "$n_1+1$" in Formula (1), and preferable ranges thereof are also the same.

$X^1$ in Formulae (M2) and (2PO) are also the same as $X^1$ in Formula (2).

$R^1$ in Formulae (M1), (M2), and (2PO) is the same as $R^1$ in Formula (2).

(Photopolymerization Initiator)

The gel particles include a photopolymerization initiator. The inclusion is as described above.

For example, the water dispersion of the present disclosure may include only one kind of photopolymerization initiators or may include two or more kinds thereof. For example, the gel particles may include only one kind of photopolymerization initiators or may include two or more kinds thereof.

The preferable range of the amount of the photopolymerization initiator is as described above.

The photopolymerization initiator is a compound that absorbs active energy rays and generates radicals which are polymerization initiating species.

Examples of the active energy rays include γ rays, β rays, electron beams, ultraviolet rays, visible rays, and infrared rays.

As the photopolymerization initiator, the well-known compounds can be used. Examples of the preferable photopolymerization initiator include (A) a carbonyl compound such as aromatic ketones, (b) an acylphosphine oxide compound, (c) an aromatic onium salt compound, (d) organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon halogen bond, and (m) an alkylamine compound.

These photopolymerization initiators may use compounds of (a) to (m) singly or two or more kinds thereof in combination.

Preferable examples of (a) the carbonyl compound, (b) the acylphosphine oxide compound, and (e) the thio compound include compounds having a benzophenone skeleton or a thioxanthone skeleton disclosed in "RADIATION CURING IN POLYMER SCIENCE AND TECHNOLOGY", J. P. FOUASSIER, J. F. RABEK (1993), pp. 77 to 117.

More preferable examples thereof include α-thiobenzophenone compounds disclosed in JP1972-6416B (JP-S47-6416B), a benzoin ether compound disclosed in JP1972-3981B (JP-S47-3981B), an α-substituted benzoin compound JP1972-22326B (JP-S47-22326B), a benzoin derivative disclosed in JP1972-23664B (JP-S47-23664B), aroylphosphonic acid ester disclosed in JP1982-30704B (JP-S57-30704B), dialkoxybenzophenone disclosed in JP1985-26483A (JP-S60-26483A), benzoin ethers disclosed in JP1985-26403B (JP-S60-26403B) and JP1987-81345A (JP-S62-81345A), α-aminobenzophenones disclosed in JP1989-34242B (JP-H01-34242B), U.S. Pat. No. 4,318, 791A, and EP0284561A1, p-di(dimethylamino benzoyl) benzene disclosed in JP1990-211452A (JP-H02-211452A), thio-substituted aromatic ketone disclosed in JP1986-194062A (JP-S61-194062A), acyl phosphine sulfide disclosed in JP1990-9597A (JP-H02-9597A), acyl phosphine disclosed in JP1990-9596B (JP-H02-9596B), thioxanthones as disclosed in JP1988-61950B (JP-S63-61950B), and coumarin disclosed in JP1984-42864B (JP-S59-42864B).

Photopolymerization initiators disclosed in JP2008-105379A or JP2009-114290A are also preferable.

Among these photopolymerization initiators, (a) the carbonyl compound and (b) the acylphosphine oxide compound are more preferable. Specific examples thereof include bis (2,4,6-trimethylbenzoyl)-phenylphosphine oxide (for example, IRGACURE (Registered trademark) 819: manufactured by BASF SE), 2-(dimethylamine)-1-(4-morpholinophenyl)-2-benzyl-1-butanone (for example, IRGACURE (Registered trademark) 369: manufactured by BASF SE), 2-methyl-1-(4-methylthiophenyl)-2-morpholinopropan-1-one (for example, IRGACURE (Registered trademark) 907: manufactured by BASF SE), 1-hydroxy-cyclohexyl-phenyl-ketone (for example, IRGACURE (Registered trademark) 184: manufactured by BASF SE), and 2,4,6-trimethylbenzoyl-diphenyl-phosphine oxide (for example, DAROCUR (Registered trademark) TPO and LUCIRIN (Registered trademark) TPO: all manufactured by BASF SE).

Among these, in view of sensitivity enhancement and suitability to LED light, (b) the acylphosphine oxide compound is preferable, and a monoacylphosphine oxide compound (particularly preferably 2,4,6-trimethylbenzoyl-diphenyl-phosphine oxide (for example, DAROCUR TPO or LUCIRIN TPO)) or a bisacylphosphine oxide compound (particularly preferably bis(2,4,6-trimethylbenzoyl)-phenylphosphine oxide (for example, IRGACURE 819)) is more preferable.

In the water dispersion of the present disclosure, the preferable ranges of the amount of the included photopolymerization initiator is as described above. However, the amount thereof is preferably 0.5 mass % to 12 mass % with respect to a total solid content of the gel particles.

In a case where an amount of the included photopolymerization initiator is 0.5 mass % or greater, sensitivity is more enhanced, and as a result, fixing properties and the like are enhanced.

In view of fixing properties and the like, an amount of the included photopolymerization initiator is more preferably 2.0 mass % or greater, even more preferably 4.0 mass % or greater, and particularly preferably 5.0 mass % or greater.

In a case where the amount of the photopolymerization initiator is 12 mass % or less, dispersion stability of the gel particles are enhanced, and as a result, preservation stability of the water dispersion liquid is enhanced.

In view of preservation stability and the like, an amount of the photopolymerization initiator is preferably 10 mass % or less and more preferably 8.0 mass % or less.

(Polymerizable Group)

The gel particles have a polymerizable group.

An aspect in which the gel particles have a polymerizable group and preferable ranges of the polymerizable group are as described above.

(Polymerizable Monomer)

The gel particles preferably include a polymerizable monomer (that is, a monomer having a polymerizable group).

Even in a case where the three-dimensional crosslinked structure does not have a polymerizable group as a portion of the corresponding structure, the gel particles include a polymerizable monomer, the polymerizable group of the inclusion polymerizable monomer functions as the polymerizable group of the gel particles.

The polymerizable monomer (hereinafter, also referred to as "inclusion polymerizable monomer") included in the gel particles is selected from a polymerizable monomer having an ethylenically unsaturated bond that can perform radical polymerization.

Examples of the polymerizable monomer having an ethylenically unsaturated bond that can perform radical polymerization used as the inclusion polymerizable monomer include a compound having an ethylenically unsaturated group, acrylonitrile, styrene, and various radical polymerizable monomers such as unsaturated polyester, unsaturated polyether, unsaturated polyamide, and unsaturated urethane.

The inclusion polymerizable monomer is preferably a compound having an ethylenically unsaturated group.

The inclusion polymerizable monomer is used singly or two or more kinds thereof may be used in combination.

In view of reactivity (curing sensitivity) in a case of photocuring, adhesiveness to a film, and hardness of a film, the inclusion polymerizable monomer is preferably a (meth)acrylate monomer.

Examples of the (meth)acrylate monomer include an acrylate monomer such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl) propane, polyethylene glycol diacrylate, polypropylene glycol diacrylate, dipentaerythritol tetraacrylate, trimethylolpropane triacrylate (for example, A-TMPT manufactured by Shin-Nakamura Chemical Co., Ltd.), pentaerythritol triacrylate (for example, A-TMM-3L manufactured by Shin-Nakamura Chemical Co., Ltd.), pentaerythritol tetraacrylate (for example, A-TMMT manufactured by Shin-Nakamura Chemical Co., Ltd.), ditrimethylolpropane tetraacrylate (for example, AD-TMP manufactured by Shin-Nakamura Chemical Co., Ltd.), dipentaerythritol pentaacrylate (for example, SR-399E manufactured by Sartomer), dipentaerythritol hexaacrylate (for example, A-DPH manufactured by Shin-Nakamura Chemical Co., Ltd.), oligoester acrylate, N-methylol acrylamide, diacetone acrylamide, epoxy acrylate, isobornyl acrylate, dicyclopentenyl acrylate, dicyclopentenyloxyethyl acrylate, dicyclopentanyl acrylate, and neopentyl glycol propylene oxide adduct diacrylate (NPGPODA); KAYARAD (Registered trademark) DPEA-12 manufactured by Nippon Kayaku Co., Ltd., and VIS-COAT (Registered trademark)#802 manufactured by Osaka Organic Chemical Industry Ltd.; and a methacrylate monomer such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, 2,2-bis(4-methacryloxypolyethoxyphenyl) propane, and trimethylolpropane trimethacrylate (for example, TMPT manufactured by Shin-Nakamura Chemical Co., Ltd.).

Among these (meth)acrylate monomers, trimethylolpropane triacrylate, pentaerythritol triacrylate, ditrimethylolpropane tetraacrylate, dipentaerythritol pentaacrylate, dipentaerythritol hexaacrylate, and neopentyl glycol propylene oxide adduct diacrylate are preferable, and dipentaerythritol pentaacrylate is more preferable.

In view of crosslinking properties and film hardness (for example, film hardness. The same is applied in the followings.), the inclusion polymerizable monomer is preferably a polyfunctional polymerizable monomer, more preferably a trifunctional or higher functional polymerizable monomer (preferably trifunctional or higher functional (meth)acrylate monomer), and even more preferably a tetrafunctional or higher functional polymerizable monomer (preferably tetrafunctional or higher functional (meth)acrylate monomer).

In view of reactivity (curing sensitivity) in a case of photocuring, a (meth)acrylate monomer is preferably an acrylate monomer.

That is, in view of reactivity (curing sensitivity) in a case of photocuring, adhesiveness to a film, and hardness of a film, a trifunctional or higher functional acrylate monomer is preferable, and a tetrafunctional or higher functional acrylate monomer is more preferable.

In addition to the above inclusion polymerizable monomer, commercially available products disclosed in "Handbook of Crosslinking Agent" edited by Yamashita, Shinzo (1981, Taiseisha, Ltd.); "UV.EB Curing Handbook (Raw materials section)" edited by Kato, Kiyomi (1985, Kobtmshi Kankokai); page 79 of "Applications and Markets of UV.EB Curing Technology" edited by RadTech Japan (1989, CMC Publishing, Inc.); "Handbook of Polyester Resins" written by Takiyama, Eiichiro, (1988, Nikkan Kogyo Shimbun, Ltd.); and the like and radical polymerizable or crosslinking monomers well-known in the industry can be used.

For example, photocurable polymerizable monomers used in a photopolymerizable composition disclosed in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), and JP2004-514014A are known as the inclusion polymerizable monomer, and these can be also included in the gel particles according to the present disclosure.

As the inclusion polymerizable monomer, commercially available products on the market may be used. Examples thereof include urethane acrylate such as AH-600, AT-600, UA-306H, UA-306T, UA-306I, UA-510H, UF-8001G and DAUA-167 (manufactured by Kyoeisha Chemical Co., Ltd.) and UV-1700B, UV-6300B, UV-7550B, UV7600B, UV-7605B, UV-7620EA, UV-7630B, UV-7640B, UV-7650B, UV-6630B, UV7000B, UV-7510B, UV-7461TE, UV-2000B, UV-2750B, UV-3000B, UV-3200B, UV-3210EA, UV-3300B, UV-3310B, UV-3500BA, UV-3520TL, UV-3700B, and UV-6640B (manufactured by Nippon Synthetic Chemical Industry Co., Ltd.), ethoxylated or propoxylated acrylate such as SR415, SR444, SR454, SR492, SR499, CD501, SR502, SR9020, CD9021, SR9035, and SR494 (manufactured by Sartomer), and an isocyanur monomer such as A-9300 and A-9300-1CL (manufactured by Shin-Nakamura Chemical Co., Ltd.).

In the present disclosure, as a molecular weight of the inclusion polymerizable monomer, a weight-average molecular weight is preferably 100 to 100,000, more preferably 100 to 30,000, even more preferably 100 to 10,000, even more preferably 100 to 1,000, even more preferably 100 to 900, even more preferably 100 to 800, and even more preferably 150 to 750.

In a case where the gel particles include an inclusion polymerizable monomer, the content of the inclusion polymerizable monomer is preferably 0.1 mass % to 75 mass %, more preferably 1 mass % to 65 mass %, even more preferably 10 mass % to 60 mass %, and even more preferably 20 mass % to 50 mass % with respect to the total solid content of the gel particles. In a case where the content thereof is in this range, crosslinking properties and film hardness are enhanced.

(Hydrophilic Group)

The gel particles have a hydrophilic group.

As described above, in view of dispersibility of the gel particles and preservation stability of the water dispersion, the hydrophilic group is preferably at least one group selected from the group consisting of a carboxyl group, a salt of the carboxyl group, a sulfo group, a salt of the sulfo group, a sulfate group, a salt of the sulfate group, a phosphonic acid group, a salt of the phosphonic acid group, a phosphoric acid group, a salt of the phosphoric acid group, an ammonium salt group, a betaine group, and an alkyleneoxy group and more preferably at least one group selected from the group consisting of a salt of a carboxyl group, a salt of a sulfo group, a salt of a sulfate group, and alkyleneoxy group.

The hydrophilic group may be a group (hereinafter, also referred to as "Group (W)") represented by Formula (W) which is a monovalent group including an alkyleneoxy group.

*—($R^{W1}$O)$_{nw}$—$R^{W2}$ group        Formula (W)

In Formula (W), $R^{W1}$ represents an alkylene group having 1 to 10 carbon atoms, $R^{W2}$ represents an alkyl group having 1 to 10 carbon atoms, nw represents an integer of 1 to 200, and * represents a bonding position.

The number of carbon atoms of the alkylene group which is represented by $R^{W1}$ and which has 1 to 10 carbon atoms is preferably 1 to 8, more preferably 2 to 4, and particularly preferably 2 or 3.

The number of carbon atoms of the alkyl group which is represented by $R^{W2}$ and which has 1 to 10 carbon atoms is preferably 1 to 8, even more preferably 1 or 2, and particularly preferably 1.

nw is more preferably an integer of 2 to 150 and particularly preferably an integer of 50 to 150.

(Compound Having Hydrophilic Group)

The hydrophilic group of the gel particles can be introduced by a compound having a hydrophilic group.

In the course of the producing of the water dispersion of the gel particles, the compound having a hydrophilic group may react with at least one of an isocyanate group-containing polymer which is a raw material of a three-dimensional crosslinked structure and water or may not react with the same.

In a case where the above reaction is performed in the course of the producing of the water dispersion of the gel particles, a three-dimensional crosslinked structure having a hydrophilic group is formed.

In a case where the above reaction is not performed in the course of the producing of the water dispersion of the gel particles, a compound having a hydrophilic group independently from the three-dimensional crosslinked structure exists in the gel particles.

In other words, a hydrophilic group exists somewhere (preferably on the surface) in a structure of the gel particles exist in the water dispersion of the present disclosure.

The compound having a hydrophilic group is preferably a surfactant having a long-chain hydrophobic group, in addition to the hydrophilic group.

As the surfactant, for example, surfactants disclosed in "Surfactant Handbook" (Ichiro Nishi et al., published by Sangyo Tosho Co., Ltd., (1980)) may be used.

Specific examples of the surfactant include alkyl sulfate having a salt of a sulfate group as a hydrophilic group, alkyl sulfonate having a salt of a sulfo group as a hydrophilic group, and alkyl benzene sulfonate having a salt of a sulfo group as a hydrophilic group.

Among these, alkyl sulfate is preferable, alkyl sulfate having an alkyl group having 8 to 20 carbon atoms (more preferably 12 to 18 carbon atoms) is more preferable, and sodium dodecyl sulfate (SDS) or sodium hexadecyl sulfate (SCS) are even more preferable.

An isocyanate compound to which a hydrophilic group is added can be used as the compound having a hydrophilic group. In a case where an isocyanate compound to which a hydrophilic group is added is used as the compound having a hydrophilic group, it is possible to form a three-dimensional crosslinked structure including a hydrophilic group.

Examples of the isocyanate compound to which a hydrophilic group is added include an adduct of trimethylolpropane (TMP), xylene diisocyanate (XDI), and polyethylene glycol monomethyl ether (EO) (for example, TAKENATE (Registered trademark) D-116N produced by Mitsui Chemicals, Inc.) (an isocyanate compound including alkyleneoxy group (specifically, Group (W)) as a hydrophilic group), and a reaction product (an isocyanate compound including a carboxyl group as a hydrophilic group) of 2,2-bis(hydroxymethyl) propionic acid (DMPA) and isophorone diisocyanate (IPDI). A carboxyl group in this reactant may be neutralized in the course of manufacturing the gel particles.

In addition to the above, examples of the compound having a hydrophilic group include the following compounds.

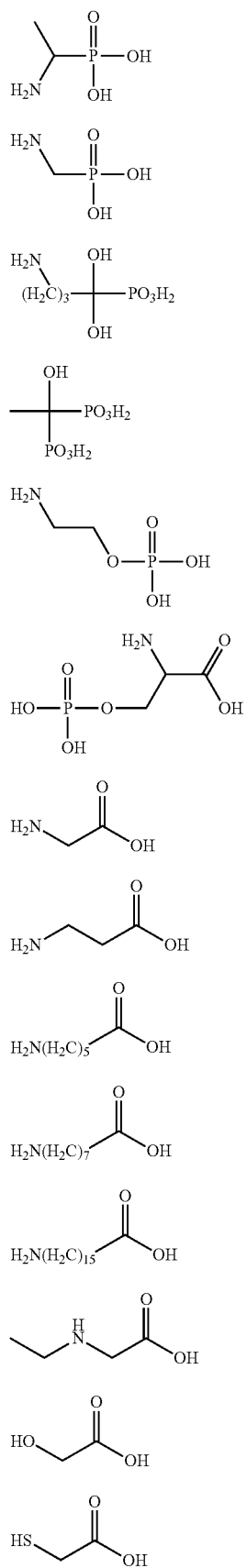
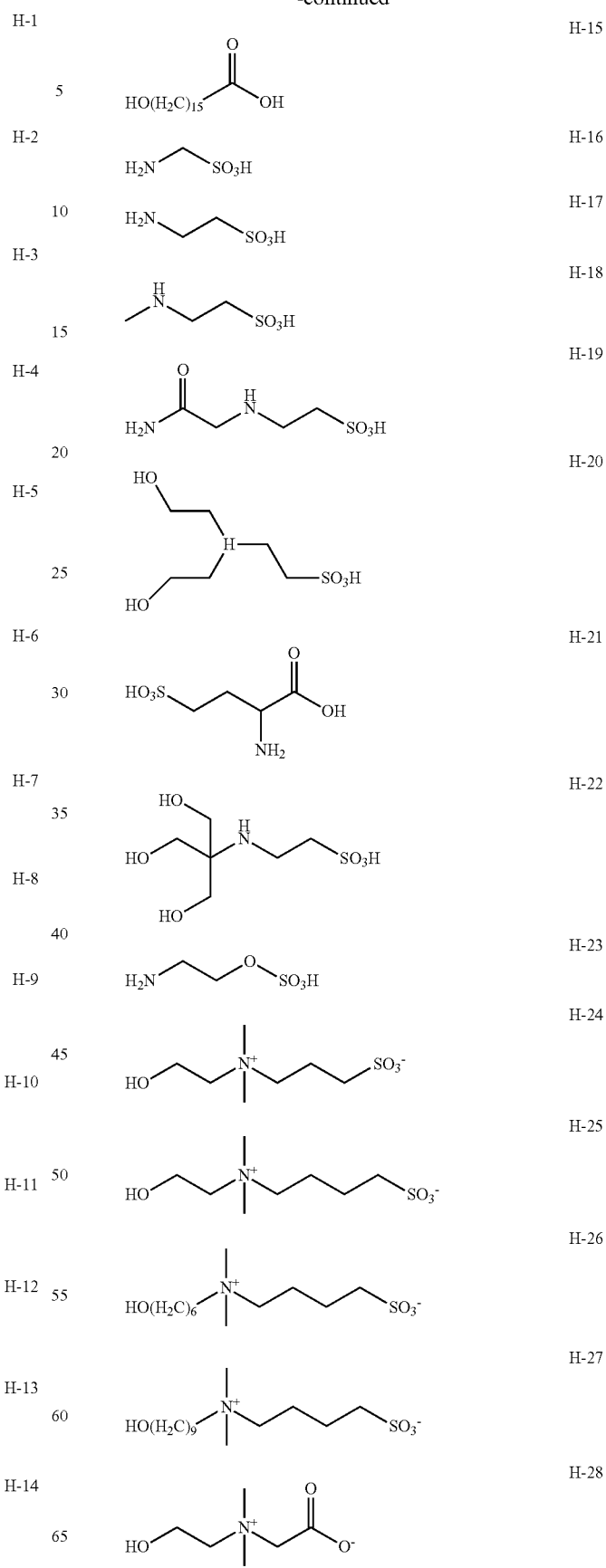

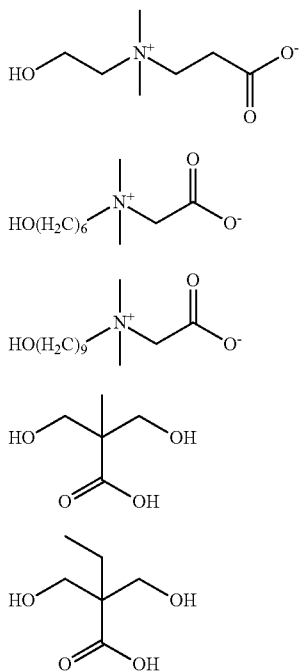

Examples of the compound having a hydrophilic group include (meth)acrylic acid or a salt thereof; a sulfonic acid compound having a polymerizable group such as 2-acrylamido-2-methylpropanesulfonic acid (hereinafter, also referred to as "AMPS"), vinyl sulfonic acid, vinyl sulfate, and sulfopropyl acrylate, and a salt thereof; and polyalkylene glycol (meth) acrylate.

Polyalkylene glycol (meth)acrylate is preferably polyalkylene glycol mono(meth)acrylate, polyalkylene glycol di(meth)acrylate, or alkoxypolyalkylene glycol mono(meth)acrylate.

All of polyalkylene glycol (meth)acrylate is preferably a compound in which a repetition number of an alkyleneoxy group is 1 to 200 (more preferably 2 to 150 and more preferably 50 to 150).

The number of carbon atoms in an alkyleneoxy group in polyalkylene glycol (meth)acrylate is preferably 1 to 10, more preferably 1 to 8, even more preferably 2 to 4, and particularly preferably 2 or 3 (that is, an alkyleneoxy group is an ethyleneoxy group or a propyleneoxy group).

The number of carbon atoms in the alkoxy group in alkoxypolyalkylene glycol mono(meth)acrylate is preferably 1 to 10, more preferably 1 to 8, more preferably 1 to 2, and particularly preferably 1 (that is, an alkoxy group is a methoxy group).

The polyalkylene glycol (meth)acrylate is particularly preferably methoxy polyethylene glycol methacrylate.

As polyalkylene glycol (meth)acrylate, a commercially available product can be used.

Examples of the commercially available product include a BLEMMER (Registered trademark) series manufactured by NOF Corporation.

<Total Solid Content of Gel Particles>

The total solid content of the gel particles in the water dispersion of the present disclosure is preferably 1 mass % to 50 mass %, more preferably 3 mass % to 40 mass %, and even more preferably 5 mass % to 30 mass %, with respect to the total amount of the water dispersion.

In a case where the total solid content of the gel particles is 1 mass % or greater, adhesiveness and hardness of the film are enhanced.

In a case where the total solid content of the gel particles is 50 mass % or less, the preservation stability is enhanced.

The total solid content of the gel particles is a value also including components such as a photopolymerization initiator existing inside the gel particles (in gaps of the three-dimensional crosslinked structure).

The total solid content of the gel particles in the water dispersion of the present disclosure is preferably 50 mass % or greater, more preferably 60 mass % or greater, even more preferably 70 mass % or greater, even more preferably 80 mass % or greater, and even more preferably 85 mass % or greater with respect to the total solid content of the water dispersion.

The upper limit of the total solid content of the gel particles may be 100 mass % with respect to the total solid content of the water dispersion. In a case where the water dispersion includes a solid component in addition to the gel particles, the upper limit thereof is preferably 99 mass % or less and more preferably 95 mass % or less.

<Water>

The water dispersion of the present disclosure includes water as a dispersion medium of the gel particles.

That is, since the water dispersion of the present disclosure is an aqueous composition, the water dispersion of the present disclosure is excellent in reduction of environmental impact and workability, compared with the solvent-based composition.

The amount of water in the water dispersion of the present disclosure is not particularly limited. However, the amount thereof is preferably 10 mass % to 99 mass %, more preferably 20 mass % to 95 mass %, even more preferably 30 mass % to 95 mass %, even more preferably 50 mass % to 95 mass %, even more preferably 60 mass % to 95 mass %, and particularly preferably 70 mass % to 90 mass % with respect to the total amount of the water dispersion.

<Colorant>

The water dispersion of the present disclosure may include at least one colorant.

In a case where the water dispersion includes a colorant, the colorant may be included in the gel particles or may not be included in the gel particles.

The colorant is not particularly limited and can be arbitrarily selected from well-known colorants such as a pigment, a water soluble dye, and a dispersed dye. Among these, in view of excellent weather fastness and opulent color reproducibility, it is more preferable that a pigment is included as the colorant.

The pigment is not particularly limited, and can be appropriately selected depending on the purposes. Examples of the pigment include well-known organic pigments and inorganic pigments, and also include resin particles colored with a dye, a commercially available pigment dispersion, or a surface-treated pigment (for example, a dispersion obtained by dispersing a pigment as a dispersion medium in water, a liquid compound, or an insoluble resin and a dispersion obtained by treating a pigment surface with a resin or a pigment derivative).

Examples of the organic pigment and the inorganic pigment include a yellow pigment, a red pigment, a magenta pigment, a blue pigment, a cyan pigment, a green pigment, an orange pigment, a violet pigment, a brown pigment, a black pigment, and a white pigment.

In a case where the pigment is used as a colorant, in a case where pigment particles are prepared, a pigment dispersing agent may be used, if necessary.

With respect to the colorant and pigment dispersing agent such as a pigment, paragraphs 0180 to 0200 of JP2014-040529A can be suitably referred to.

<Sensitizer>

The water dispersion of the present disclosure may contain a sensitizer.

It is preferable that the sensitizer is further included in the gel particles.

In a case where the water dispersion of the present disclosure contains a sensitizer, decomposition of the photopolymerization initiator due to the irradiation with active energy rays can be promoted.

The sensitizer is a material that absorbs specific active energy rays and in an electron excited state.

The sensitizer in an electron excited state comes into contact with a photopolymerization initiator and generates an action such as electron transfer, energy transfer, heat generation. Accordingly, a chemical change of the photopolymerization initiator, that is, decomposition or generation of radical, acid, or base is promoted.

Examples of the well-known sensitizers that can be used together include benzophenone, thioxanthone, 2,4-diethylthioxanthone, isopropylthioxanthone, anthraquinone, 9,10-dibutoxyanthracene, a 3-acylcoumarin derivative, terphenyl, styrylketone, 3-(aroylmethylene) thiazoline, camphorquinone, eosin, rhodamine, and erythrosine.

As the sensitizer, a compound represented by Formula (i) disclosed in JP2010-24276A or a compound represented by Formula (I) disclosed in JP1994-107718A (JP-H06-107718A) can be suitably used.

The sensitizer is preferably benzophenone, thioxanthone, isopropyl thioxanthone, 2,4-diethylthioxanthone, or 9,10-dibutoxyanthracene.

In view of suitability to LED light and reactivity with the photopolymerization initiator, the sensitizer is preferably benzophenone, thioxanthone, or isopropyl thioxanthone, more preferably thioxanthone or isopropyl thioxanthone, and particularly preferably isopropyl thioxanthone.

In a case where the water dispersion of the present disclosure contains a sensitizer, the amount of the sensitizer is preferably 0.1 mass % to 25 mass %, more preferably 0.1 mass % to 20 mass %, even more preferably 0.1 mass % to 15 mass %, and particularly preferably 0.1 mass % to 5 mass % with respect to the total solid content of the gel particles.

In a case where the amount of the sensitizer is 0.1 mass % or greater, sensitivity is enhanced, and as a result, fixing properties and the like are enhanced.

In view of fixing properties and the like, the amount of the sensitizer is more preferably 0.3 mass % or greater, even more preferably 0.5 mass % or greater, and particularly preferably 0.8 mass % or greater.

In a case where the amount of the sensitizer is 25 mass % or less (more preferably 20 mass % or less, even more preferably 15 mass % or less, and particularly preferably 5 mass % or less), the dispersion stability of the gel particles is enhanced, and as a result, preservation stability of the water dispersion liquid is enhanced.

In view of the preservation stability and the like, the amount of the sensitizer is even more preferably 4 mass % or less and particularly preferably 3 mass % or less.

<Other Additives>

The water dispersion of the present disclosure may contain other components in addition to the above.

The other components may be included in the gel particles and may not be included in the gel particles.

(Polymerization Inhibitor)

The water dispersion of the present disclosure may contain a polymerization inhibitor.

In a case where the water dispersion of the present disclosure contains a polymerization inhibitor, preservation stability of the water dispersion can be further enhanced.

Examples of the polymerization inhibitor include p-methoxyphenol, quinones (hydroquinone, benzoquinone, and methoxybenzoquinone), phenothiazine, catechols, alkylphenols (dibutylhydroxytoluene (BHT)), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperi dine-1-oxyl (TEMPO), 2,2, 6,6-tetramethyl-4-hydroxypiperidin-1-oxyl (TEMPOL), cupferron Al, and tris(N-nitroso-N-phenylhydroxylamine) aluminum salt.

Among these, p-methoxyphenol, catechols, quinones, alkylphenols, TEMPO, TEMPOL, cupferron Al, and tris(N-nitroso-N-phenylhydroxylamine) aluminum salt are preferable, and p-methoxyphenol, hydroquinone, benzoquinone, BHT, TEMPO, TEMPOL, cupferron Al, and tris(N-nitroso-N-phenylhydroxylamine) aluminum salt is more preferable.

(Ultraviolet Absorbing Agent)

The water dispersion of the present disclosure may contain an ultraviolet absorbing agent.

In a case where the water dispersion of the present disclosure contains an ultraviolet absorbing agent, weather fastness of the film can be enhanced.

Examples of the ultraviolet absorbing agent include the well-known ultraviolet absorbing agent, for example, a benzotriazole-based compound, a benzophenone-based compound, a triazine-based compound, and a benzoxazole-based compound.

(Solvent)

The water dispersion of the present disclosure may contain an organic solvent.

In a case where the water dispersion of the present disclosure contains a solvent, adhesiveness between the film and the base material can be enhanced.

In a case where the water dispersion of the present disclosure contains an organic solvent, the content of the organic solvent is preferably 0.1 mass % to 10 mass % and more preferably 1 mass % to 10 mass % with respect to a total amount of the water dispersion.

Specific examples of the organic solvent are as follows.

Alcohols (for example, methanol, ethanol, propanol, isopropanol, butanol, isobutanol, secondary butanol, tertiary butanol, pentanol, hexanol, cyclohexanol, and benzyl alcohol), Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methyl propanediol), Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), Amines (for example, ethanolamine, diethanolamine, triethanolamine, N-methyldiethanolamine, N-ethyldiethanolamine, morpholine, N-ethylmorpholine, ethylenediamine, diethylenedi amine, triethylenetetramine, tetraethylenepentamine, polyethyleneimine, pentamethyl diethylenetriamine, and tetramethylpropylenediamine), Amides (for example, formamide, N,N-dimethylformamide, and N,N-dimethylacetamide), Heterocyclic rings (for example, 2-pyrrolidone, N-methyl-2-pyrrolidone, cyclohexylpyrrolidone, 2-oxazolidone, 1,3-dimethyl-2-imidazolidinone, and γ-butyrolactone), Sulfoxides (for example, dimethylsulfoxide), Sulfones (for example, sulfolane), and Other (urea, acetonitrile, and acetone)

(Other Surfactants)

The water dispersion of the present disclosure may contain other surfactants, in addition to the above surfactants (for example, alkyl sulfate, alkyl sulfonate, and alkyl benzene sulfonate) having a long-chain hydrophobic group, exemplified in the "compound having a hydrophilic group".

Examples of the other surfactants include surfactants disclosed in JP1987-173463A (JP-S62-173463A) and JP1987-183457A (JP-S62-183457A). Examples thereof include a nonionic surfactant such as polyoxyethylene alkyl ethers, polyoxyethylene alkyl allyl ethers, acetylene glycols, and a polyoxyethylene.polyoxypropylene block copolymer.

As the surfactant, an organic fluoro compound may be used.

The organic fluoro compound is preferably hydrophobic. Examples of the organic fluoro compound include a fluorine-based surfactant, an oily fluorine-based compound (for example, fluorine oil), and a solid-like fluorine compound resin (for example, tetrafluoroethylene resin), and include compounds disclosed in JP1982-9053A (JP-S57-9053A) (Sections 8 to 17), JP1987-135826B (JP-S62-135826B).

In view of film properties, adhesiveness, and jettability control, the water dispersion of the present disclosure may contain a photopolymerization initiator, a polymerizable compound, a water soluble resin, and a water-dispersible resin outside the gel particles, if necessary.

Here, the expression "a water dispersion contains a photopolymerization initiator outside the gel particles" means that the water dispersion contains a photopolymerization initiator that is not included in the gel particles. The same is applied to a case of a polymerizable compound, a water soluble resin, a water-dispersible resin, and the like are contained outside the gel particles.

(Photopolymerization Initiator that can be Contained Outside Gel Particles)

Examples of the photopolymerization initiator that can be contained outside the gel particles include photopolymerization initiators which are the same as the above photopolymerization initiators (photopolymerization initiator included in the gel particles). As the photopolymerization initiator that can be contained outside the gel particles, a water-soluble or water-dispersible photopolymerization initiator is preferable. In this point of view, preferable examples thereof include DAROCUR (Registered trademark) 1173, IRGACURE (Registered trademark) 2959, IRGACURE (Registered trademark) 754, DAROCUR (Registered trademark) MBF, IRGACURE (Registered trademark) 819DW, IRGACURE (Registered trademark) 500 (above manufactured by BASF SE).

The expression "water solubility" in the photopolymerization initiator that can be contained outside the gel particles refers to properties in which a dissolution amount to 100 g of distilled water at 25° C. in a case where drying is performed for two hours at 105° C. exceeds 1 g.

The expression "water dispersibility" in the photopolymerization initiator that can be contained outside the gel particles means properties which are water insoluble and dispersed in water. Here, the expression "water insoluble" refers to properties in which a dissolution amount to 100 g of distilled water at 25° C. is 1 g or less in a case where the compound is dried at 105° C. for two hours.

(Polymerizable Compound that can be Contained Outside Gel Particles)

Examples of the polymerizable compound that can be contained outside the gel particles include a compound having an ethylenically unsaturated group and a radical polymerizable compound such as acrylonitrile, styrene, unsaturated polyester, unsaturated polyether, unsaturated polyamide, and unsaturated urethane.

Among these, a compound having an ethylenically unsaturated group is preferable, and a compound having a (meth)acryloyl group is particularly preferable.

As the polymerizable compound that can be contained outside the gel particles, a water-soluble or water-dispersible polymerizable compound is preferable.

The "water solubility" in the polymerizable compound that can be contained outside the gel particles is the same as the above "water solubility" in the "photopolymerization initiator that can be contained outside the gel particles", and the "water dispersibility" in the polymerizable compound that can be contained outside the gel particles is the same as the above "water dispersibility" in the "photopolymerization initiator that can be contained outside the gel particles".

In view of water solubility or water dispersibility, as the polymerizable compound, a compound having at least one selected from an amide structure, a polyethylene glycol structure, a polypropylene glycol structure, a carboxyl group, and a salt of the carboxyl group is preferable.

In view of the water solubility or water dispersibility, as the polymerizable compound that can be contained outside the gel particles, for example, (meth)acrylic acid, sodium (meth)acrylate, potassium (meth)acrylate, N,N-dimethylacrylamide, N,N-diethylacrylamide, morpholine acrylamide, N-2-hydroxyethyl (meth)acrylamide, N-vinyl pyrrolidone, N-vinyl caprolactam, 2-hydroxyethyl (meth)acrylate, 3-hydroxypropyl (meth)acrylate, 2-hydroxypropyl (meth) acrylate, glycerin monomethacrylate, N-[tris(3-acryloylaminopropyloxymethylene)methyl]acrylamide, diethylene glycol bis(3-acryloylaminopropyl) ether, polyethylene glycol di(meth)acrylate, or polypropylene glycol di(meth)acrylate is preferable, and (meth)acrylic acid, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene)methyl]acrylamide, diethylene glycol bis(3-acryloylaminopropyl) ether, polyethylene glycol di(meth)acrylate, or polypropylene glycol di(meth) acrylate is more preferable.

(Water Soluble Resin or Water-Dispersible Resin that can be Contained Outside the Gel Particles)

The structures of the water soluble resin or the water-dispersible resin that can be contained outside the gel particles are not particularly limited, and may be any structures.

Examples of the structures of the water soluble resin or the water-dispersible resin that can be contained outside the gel particles include a chain-shaped structure, a ramified (branched) structure, a star-shaped structure, a crosslinked structure, and a mesh-shaped structure.

The expression "water soluble" in the water soluble resin that can be contained outside the gel particles has the same meaning as that of the expression "water soluble" in the "photopolymerization initiator that can be contained outside the gel particles", and the expression "water dispersibility" in the water-dispersible resin that can be contained outside the gel particles has the same meaning as that of the expression "water dispersibility" in the "photopolymerization initiator that can be contained outside the gel particles".

As the water soluble resin or the water-dispersible resin, a resin having a functional group selected from a carboxyl group, a salt of the carboxyl group, a sulfo group, a salt of the sulfo group, a sulfuric acid group, a salt of the sulfuric acid group, a phosphonic acid group, a salt of the phosphonic acid group, a phosphoric acid group, a salt of the phosphoric acid group, an ammonium salt group, a hydroxyl group, a carboxylic acid amide group, and an alkyleneoxy group is preferable.

As the counter cation of the salt, an alkali metal cation such as sodium and potassium, an alkali earth metal cation such as calcium and magnesium, an ammonium cation, or a phosphonium cation is preferable, an alkali metal cation is particularly preferable.

As an alkyl group included in an ammonium group of an ammonium salt group, a methyl group or an ethyl group is preferable.

As the counter anion of the ammonium salt group, a halogen anion such as chlorine and bromine, a sulfate anion, a nitrate anion, a phosphate anion, a sulfonate anion, a carboxylate anion, or a carbonate anion is preferable, and a halogen anion, a sulfonate anion, or a carbonate anion is particularly preferable.

As a substituent on the nitrogen atom of the carboxylic acid amide group, an alkyl group having 8 or less carbon atoms is preferable, and an alkyl group having 6 or less carbon atoms is particularly preferable.

The resin having an alkyleneoxy group preferably has an alkyleneoxy chain consisting of repetition of an alkyleneoxy group. The number of the alkyleneoxy groups included in the alkyleneoxy chain is preferably 2 or greater and particularly preferably 4 or greater.

<Preferable Physical Properties of Water Dispersion>

In a case where the water dispersion is at 25° C. to 50° C., the viscosity of the water dispersion of the present disclosure is preferably 3 mPa·s to 15 mPa·s and more preferably 3 mPa·s to 13 mPa·s. Particularly, as the water dispersion of the present disclosure, the water dispersion of which viscosity at 25° C. is 50 mPa·s or less is preferable. In a case where the viscosity of the water dispersion is in the above range, high jetting stability can be realized, in a case where the water dispersion is applied to ink jet recording.

The viscosity of the water dispersion is obtained by using a viscometer: VISCOMETER TV-22 (manufactured by Toki Sangyo Co., Ltd.).

The method of producing the water dispersion of the present disclosure is not particularly limited, as long as the method is a method of capable of dispersing gel particles having a three-dimensional crosslinked structure including at least one of Polymer Structure (1) or Polymer Structure (2), having a hydrophilic group and a polymerizable group, and including a photopolymerization initiator in water.

In view of easiness of obtaining the water dispersion of the present disclosure, the method of producing the water dispersion of gel particles of the present disclosure is preferably a method of producing a water dispersion of gel particles of this embodiment.

[Method of Producing Water Dispersion of Gel Particles]

A method of producing the water dispersion of gel particles according to the present embodiment (hereinafter, referred to as a "producing method of the present embodiment") includes: a preparation step of preparing at least one (hereinafter, also simply referred to as "isocyanate group-containing polymer") of Isocyanate Group-Containing Polymer (1P) or Isocyanate Group-Containing Polymer (2P);

an emulsification step of obtaining an emulsion by mixing an oil phase component including the isocyanate group-containing polymer, a photopolymerization initiator, and an organic solvent and a water phase component including water and performing emulsification; and a gelation step of obtaining a water dispersion of gel particles by heating the emulsion and causing the isocyanate group-containing polymer and water to react each other.

The producing method of the present embodiment may have other steps, if necessary.

It is possible to easily produce the water dispersion of the present disclosure by the producing method of the present embodiment. Particularly, it is possible to produce the gel particles including a photopolymerization initiator by causing both of the isocyanate group-containing polymer and the photopolymerization initiator to be contained in the oil phase component.

<Preparation Step>

According to the present embodiment, a preparation step is a step defined for convenience and is a step of preparing the isocyanate group-containing polymer (at least one of Isocyanate Group-Containing Polymer (1P) or Isocyanate Group-Containing Polymer (2P)).

Isocyanate Group-Containing Polymer (1P) and Isocyanate Group-Containing Polymer (2P) are as described above as the raw materials of the three-dimensional crosslinked structure.

According to the present embodiment, in the producing of the water dispersion, an isocyanate group-containing polymer prepared in advance may be used, or an isocyanate group-containing polymer may be produced in a case of producing the water dispersion.

That is, the preparation step may have a stage of producing the isocyanate group-containing polymer. The stage of producing the isocyanate group-containing polymer is described below.

<Oil Phase Component>

The oil phase component includes an isocyanate group-containing polymer, a photopolymerization initiator, and an organic solvent.

Examples of the organic solvent included in the oil phase component include ethyl acetate, methyl ethyl ketone, and acetone.

The isocyanate group-containing polymer may be included in the oil phase component singly or two or more kinds thereof may be included in the oil phase component.

In the producing method of the present embodiment, a content (total content in a case where two or more kinds are used) of the isocyanate group-containing polymer is preferably 20 mass % to 98 mass %, more preferably 20 mass % to 95 mass %, even more preferably 30 mass % to 90 mass %, and even more preferably 35 mass % to 85 mass % with respect to the total amount (total solid content) excluding the organic solvent and water from the oil phase component and the water phase component.

In a case where the total amount is 25 mass % or greater, the three-dimensional crosslinked structure is more easily formed.

In a case where the content is 95 mass % or less, the content of the photopolymerization initiator and the like can be easily secured.

In the present specification, a total amount (total solid content) excluding the organic solvent and water from the oil phase component and the water phase component corresponds to a total solid content of the produced gel particles.

The photopolymerization initiator is a component included in the gel particles which is a target product of the producing method of the present embodiment, and is contained in the oil phase component in the raw material stage. Accordingly, the producing of the gel particles including the photopolymerization initiator becomes easier.

The preferable range of the photopolymerization initiator is as described above.

The photopolymerization initiator may be included in the oil phase component singly or two or more kinds thereof may be included in the oil phase component.

A preferable range of the content (total content in a case where two or more kinds are used) of the photopolymerization initiator with respect to the total solid content of the oil phase component and the water phase component is the same as the preferable range of the content (total content in a case where two or more kinds are used) of the photopolymerization initiator with respect to the total solid content of the gel particles.

Even in a case where components in addition to the photopolymerization initiator are included in the gel particles which are a target product, the components are preferably contained in the oil phase component.

For example, in a case where gel particles including a polymerizable monomer are produced, the polymerizable monomer is preferably contained in the oil phase component. In this case, the preferable range of the content (total content in a case where two or more kinds are used) of the polymerizable monomer with respect to the total solid content of the oil phase component and the water phase component is the same as the preferable range of the content (total content in a case where two or more kinds are used) of the polymerizable monomer (inclusion polymerizable monomer) with respect to the total solid content of the gel particles.

In a case where gel particles including the sensitizer are produced, the sensitizer is preferably contained in the oil phase component. In this case, the preferable range of the content (total content in a case where two or more kinds are used) of the sensitizer with respect to the total solid content of the oil phase component and the water phase component is the same as the preferable range of the content (total content in a case where two or more kinds are used) of the sensitizer with respect to the total solid content of the gel particles.

The oil phase component may contain a component that can form a three-dimensional crosslinked structure, in addition to at least one of Isocyanate Group-Containing Polymer (1P) or Isocyanate Group-Containing Polymer (2P). Examples of the component include a compound (for example, the isocyanate compound to which a hydrophilic group is added) having other isocyanate group in addition to at least one of Isocyanate Group-Containing Polymer (1P) or Isocyanate Group-Containing Polymer (2P).

The other compound having an isocyanate group may correspond to a compound having a hydrophilic group (that is, may be an isocyanate compound to which a hydrophilic group is added).

In a case where the other compound having an isocyanate group is used, a content (total content in a case where two or more kinds are used) of the other compound having an isocyanate group is preferably 1 mass % to 30 mass %, more preferably 3 mass % to 20 mass %, and particularly preferably 5 mass % to 15 mass % with respect to the total solid content of the oil phase component and the water phase component.

The oil phase component may contain a catalyst.

In a case where the oil phase component includes a catalyst, the reaction in the gelation step more effectively proceeds.

Examples of the catalyst include triethylamine, diisopropylethylamine, 1,4-diazabicyclo[2.2.2]octane, dimethyl benzyl amine, bis(dimethylaminoethyl) ether, N,N-dimethylethanolamine, triethylenediamine, N,N-dimethylcyclohexylamine, pentamethyldiethylenetriamine, N,N,N',N',N''-pentamethyldipropylenetriamine, N-ethyl morpholine, N-methyl morpholine, diaminoethoxyethanol, trimethylaminoethylethanolamine, dimethylaminopropylamine, dimorpholino dimethyl ether, and 1,3,5-tris(3-(dimethylamino) propyl)-hexahydro-2-triazine.

Examples of the catalyst include U-CAT (Registered trademark) SA 102 and U-CAT (Registered trademark) SA 1102 manufactured by San-Apro Ltd.

<Water Phase Component>

The water phase component is not particularly limited, as long as the water phase component includes water. The water phase component may be only water.

The component that can be contained in the water phase component includes a compound (hereinafter, referred to as a "hydrophilic group-containing compound") having a hydrophilic group, in addition to water.

In the producing method of the present embodiment, at least one of the oil phase component or the water phase component preferably includes a hydrophilic group-containing compound. The hydrophilic group-containing compound may be used singly or two or more kinds thereof may be used.

Here, in a case where the isocyanate group-containing polymer has a hydrophilic group (for example, having Group (W)), the hydrophilic group-containing compound may not be contained in the oil phase component and may not be contained in the water phase component.

In the present embodiment, the hydrophilic group-containing compound may be used singly or two or more kinds thereof may be used.

A first hydrophilic group-containing compound may be contained in an oil phase component, and a second hydrophilic group-containing compound different from the first hydrophilic group-containing compound may be contained in the water phase component.

Each of the first hydrophilic group-containing compound and the second hydrophilic group-containing compound may be used singly and two or more kinds thereof may be used.

In a case where at least one of the oil phase component or the water phase component include a hydrophilic group-containing compound, a content (total content in a case where two or more kinds are used) of the hydrophilic group-containing compound is preferably 0.5 mass % to 20 mass % with respect to the total solid content of the oil phase component and the water phase component.

In a case where the amount of the hydrophilic group-containing compound is 0.5 mass % or greater, dispersibility, redispersibility, and preservation stability are enhanced.

In a case where the amount of the hydrophilic group-containing compound is 20 mass % or less, hardness of the formed film is enhanced.

The amount of the hydrophilic group-containing compound is more preferably 1 mass % to 20 mass % and even more preferably 5 mass % to 20 mass %, with respect to the total solid content.

In a case where the oil phase component includes a compound having a carboxyl group, a sulfo group, a sulfate group, a phosphonic acid group, or a phosphoric acid group as a hydrophilic group-containing compound, the water phase component may contain a neutralizing agent. In this case, in a case where the oil phase component and the water phase component are mixed, a carboxyl group, a sulfo group, a sulfate group, a phosphonic acid group, or a phosphoric acid group are neutralized, and a salt of a carboxyl group, a salt of a sulfo group, a salt of a sulfate group, a salt of a phosphonic acid group, or a salt of a phosphoric acid group are formed. These salts function as hydrophilic groups of gel particles. These salts have particularly excellent in an effect of dispersing gel particles in water.

Examples of the neutralizing agent include sodium hydroxide and potassium hydroxide.

<Emulsification Step>

The emulsification step is a step of obtaining an emulsion by mixing an oil phase component and a water phase component and perform emulsification.

The mixing of the oil phase component and the water phase component and the emulsification of the mixture obtained by the mixing can be performed by well-known methods.

The emulsification can be performed by a disperser such as a homogenizer.

Examples of the rotation speed in the emulsification include 5,000 rpm to 20,000 rpm, and the rotation speed is preferably 10,000 rpm to 15,000 rpm.

Examples of the rotation time in the emulsification include 1 minute to 120 minutes, and the rotation time is preferably 3 minutes to 60 minutes, more preferably 3 minutes to 30 minutes, and particularly preferably 5 minutes to 15 minutes.

<Gelation Step>

The gelation step is a step of obtaining a water dispersion of gel particles by heating the emulsion and at least causing the isocyanate group-containing polymer and water to react with each other.

According to this reaction, a urea bond is formed, a three-dimensional crosslinked structure including at least one of Polymer Structure (1) or Polymer Structure (2) is formed.

The heating temperature (reaction temperature) of the emulsion in the gelation step is preferably 35° C. to 70° C. and more preferably 40° C. to 60° C.

The heating time (reaction time) in the gelation step is preferably 6 hours to 50 hours, more preferably 12 hours to 40 hours, and particularly preferably 15 hours to 35 hours.

The gelation step preferably includes a stage of distilling an organic solvent from the emulsion.

The stage of causing the isocyanate group-containing polymer and water to react with each other also functions as a stage of distilling an organic solvent from an emulsion.

The gelation step can include a stage of adding a catalyst to an emulsion. Examples of the catalyst is as described above.

The producing method of the embodiment may have other steps in addition to the preparation step, the emulsification step, and the gelation step, if necessary.

Examples of the other step include a step of adding the other components such as a colorant to the water dispersion of the gel particles obtained in the gelation step.

The other added components are as described above as the other components that can contain the water dispersion.

<Producing of Isocyanate Group-Containing Polymer>

As described above, the preparing stage in the producing method of the present embodiment may include a stage of producing an isocyanate group-containing polymer (at least one of Isocyanate Group-Containing Polymer (1P) or Isocyanate Group-Containing Polymer (2P)).

In view of obtaining an isocyanate group-containing polymer, the preparation step includes at least one of:

a stage (hereinafter, also referred to as "Stage 1") obtaining Isocyanate Group-Containing Polymer (1P) by causing Polymer Diol (1PD) and Isocyanate Compound (ZC) to react with each other, and a stage of obtaining One-Terminal Sealing Polymer (2PO) by causing Polymer Diol (2PD) and Terminal Sealing Agent (M1), Terminal Sealing Agent (M2), or an anhydride thereof to react with each other and obtaining Isocyanate Group-Containing Polymer (2P) (hereinafter, also referred to as "Stage 2") by causing One-Terminal Sealing Polymer (2PO) and Isocyanate Compound (ZC) to react with each other.

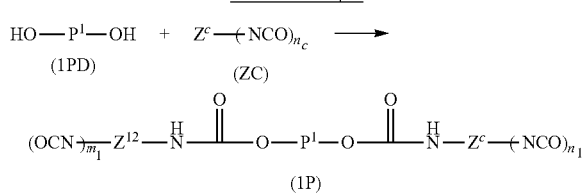

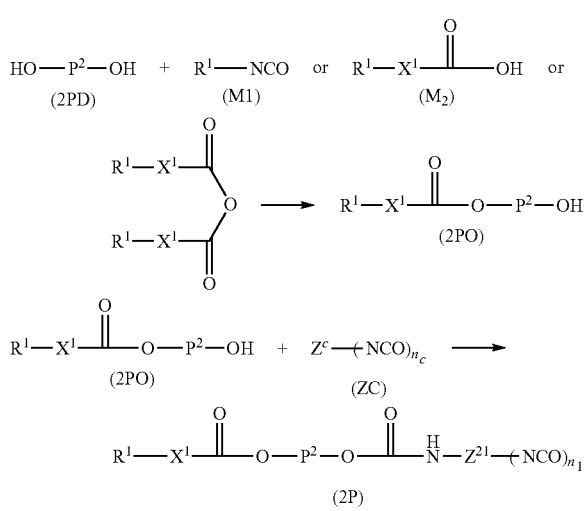

Formulae and reference numerals in the scheme are as described above.

In Stage 1, a used amount of Isocyanate Compound (ZC) with respect to the used amount of Polymer Diol (1PD) is preferably an amount in which a ratio of the number of NCO groups (ZC) to the number of OH groups (1PD) [the number of NCO groups (ZC)/the number of OH groups (1PD)] is greater than 1.0 (hereinafter, also referred to as "excessive amount" in this reaction), where the number of hydroxyl groups in Polymer Diol (1PD) is set as "the number of OH groups (1PD)", and the number of isocyanate groups in Isocyanate Compound (ZC) is set as "the number of NCO groups (ZC)". Accordingly, after the reaction, ideally, in a case where all hydroxyl groups in Polymer Diol (1PD) are changed to urethane bonds, isocyanate groups derived from Isocyanate Compound (ZC) exist, and thus Isocyanate Group-Containing Polymer (1P) is easily formed.

The ratio [the number of NCO groups (ZC)/the number of OH groups (1PD)] is preferably 1.1 or greater, more preferably 1.5 or greater, and even more preferably 2.0 or greater.

The upper limit of the ratio [the number of NCO groups (ZC)/the number of OH groups (1PD)] is not particularly limited. However, in view of used amount reduction of Isocyanate Compound (ZC), the ratio [the number of NCO groups (ZC)/the number of OH groups (1PD)] is preferably 5.0 or less and more preferably 4.0 or less.

The reaction temperature of the reaction in Stage 1 is preferably 35° C. to 70° C. and more preferably 40° C. to 60° C.

The reaction time of the reaction in Stage 1 is preferably 1 hour to 10 hours, more preferably 1 hour to 5 hours, and particularly preferably 2 hours to 4 hours.

In Stage 2, in a case where Terminal Sealing Agent (M1) is used, a used amount of Terminal Sealing Agent (M1) with respect to the used amount of Polymer Diol (2PD) is preferably an amount in which the ratio [the number of NCO groups (M1)/the number of OH groups (2PD)] is 0.10 to 0.80 (more preferably 0.15 to 0.70 and particularly preferably 0.25 to 0.60), where the number of hydroxyl groups in Polymer Diol (2PD) is set as "the number of OH groups (2PD)", and the number of isocyanate groups in Terminal Sealing Agent (M1) is set as "the number of NCO groups (M1)".

In Stage 2, in a case where Terminal Sealing Agent (M2) or an anhydride thereof is used, a used amount of Terminal Sealing Agent (M2) or an anhydride thereof with respect to the used amount of Polymer Diol (2PD) is preferably a value in which the ratio [the number of COOH groups (M2)/the number of OH groups (2PD)] is 0.10 to 0.80 (more preferably 0.15 to 0.70 and particularly preferably 0.25 to 0.60), where the number of hydroxyl groups in Polymer Diol (2PD) is set as "the number of OH groups (2PD)", and all of the number of carboxyl groups in Terminal Sealing Agent (M2) and the number of carboxyl groups generated from the anhydride of Terminal Sealing Agent (M2) are set as "the number of COOH groups (M2)".

In a case where the used amount of Terminal Sealing Agent (M1), Terminal Sealing Agent (M2), or an anhydride thereof is set as described above, One-Terminal Sealing Polymer (2PO) is easily formed.

In Stage 2, the reaction temperature of the reaction between Polymer Diol (2PD) and Terminal Sealing Agent (M1), Terminal Sealing Agent (M2), or an anhydride thereof is preferably 35° C. to 70° C. and more preferably 40° C. to 60° C.

In Stage 2, the reaction time of the reaction between Polymer Diol (2PD) and Terminal Sealing Agent (M1), Terminal Sealing Agent (M2), or an anhydride thereof is preferably 1 hour to 10 hours, more preferably 1 hour to 5 hours, and particularly preferably 2 hours to 4 hours.

In Stage 2, the used amount of Isocyanate Compound (ZC) with respect to the amount of One-Terminal Sealing Polymer (2PO) is preferably an amount (hereinafter, also referred to as an "excessive amount" in this reaction) in which the ratio [the number of NCO groups (ZC)/the number of OH groups (2PO)] of the number of NCO groups (ZC) with respect to the number of OH groups (2PO) is greater than 1.0, where the number of hydroxyl groups in One-Terminal Sealing Polymer (2PO) is set as "the number of OH groups (2PO)", and the number of isocyanate groups in Isocyanate Compound (ZC) is set as "the number of NCO groups (ZC)". According to this, after the reaction, ideally, in a case where all hydroxyl groups in One-Terminal Sealing Polymer (2PO) are changed to urethane bonds, isocyanate groups derived from Isocyanate Compound (ZC) exist, and thus Isocyanate Group-Containing Polymer (2P) is easily formed.

The ratio [the number of NCO groups (ZC)/the number of OH groups (2PO)] is preferably 1.1 or greater and more preferably 1.5 or greater.

The upper limit of the ratio [the number of NCO groups (ZC)/the number of OH groups (2PO)] is not particularly limited. However, in view of the used amount reduction of Isocyanate Compound (ZC), the ratio [the number of NCO groups (ZC)/the number of OH groups (2PO)] is preferably 5.0 or less and more preferably 4.0 or less.

The reaction temperature of the reaction between One-Terminal Sealing Polymer (2PO) and Isocyanate Compound (ZC) in Stage 2 is preferably 35° C. to 70° C. and more preferably 40° C. to 60° C.

The reaction time of the reaction between One-Terminal Sealing Polymer (2PO) and Isocyanate Compound (ZC) in Stage 2 is preferably 1 hour to 10 hours, more preferably 1 hour to 5 hours, and particularly preferably 2 hours to 4 hours.

<Isocyanate Compound (ZC)>

Isocyanate Compound (ZC) used in Stages 1 and 2 are described.

Isocyanate Compound (ZC) is a polyfunctional isocyanate compound as represented in Formula (ZC).

$$Z^c\text{---}(\text{NCO})_{n_c} \quad (ZC)$$

In Formula (ZC), $Z^C$ represents a $n_c$-valent organic group and $n_c$ represents an integer of 2 or greater.

$Z^C$ and $n_c$ in Formula (ZC) are respectively the same as $Z^{11}$ and "$n_1+1$" in Formula (1), and preferable ranges thereof are also the same.

Isocyanate Compound (ZC) is preferably a trifunctional or higher functional isocyanate compound (that is, $n_c$ in Formula (ZC) is an integer of 3 or greater).

The trifunctional or higher functional isocyanate compound is preferably a compound derived from a difunctional isocyanate compound (compound having two isocyanate groups in a molecule). The trifunctional or higher functional isocyanate compound is more preferably an isocyanate compound derived from at least one selected from isophorone diisocyanate, hexamethylene diisocyanate, trimethylhexamethylene diisocyanate, 1,3-bis(isocyanatomethyl) cyclohexane, m-xylylene diisocyanate, and dicyclohexylmethane 4,4'-diisocyanate.

The expression "to derive" means to include a structure derived from a raw material by using the compound in the raw material.

With respect to the trifunctional or higher functional isocyanate compound, for example, as an adduct substance (adduct) between a difunctional or higher functional isocyanate compound (compound having two or more isocyanate groups in a molecule) and a compound having three or more active hydrogen groups in one molecule such as trifunctional or higher functional polyol, polyamine, and polythiol, a trifunctional or higher functional isocyanate compound (adduct type), a trimer (biuret type or isocyanurate type) of a difunctional or higher functional isocyanate compound, and a compound having three or more isocyanate groups in a molecule such as a formalin condensate of benzene isocyanate are preferable.

These trifunctional or higher functional isocyanate compounds may be mixtures in which a plurality of compounds are included, it is preferable that Isocyanate Compound (ZC) (here, $n_c$ in Formula (ZC) is an integer of 3 or greater) is a main component of these mixtures, and other components may be included.

A polyfunctional isocyanate compound of an aspect in which $Z^C$ in Formula (ZC) which is a group represented by Formula (Z-101) or Formula (Z-102) is an adduct-type isocyanate compound.

In (Z-201) or (Z-202), $R_1$ to $R_5$ each are more preferably Group (5-3) derived from isophorone diisocyanate (IPDI), Group (5-7) derived from hexamethylene diisocyanate (HDI), Group (5-5) derived from trimethylhexamethylene diisocyanate (TMHDI), Group (5-4) derived from 1,3-bis(isocyanatomethyl) cyclohexane, Group (5-1) derived from m-xylylene diisocyanate (XDI), and Group (5-2) derived from dicyclohexylmethane 4,4'-diisocyanate.

The adduct-type trifunctional or higher functional isocyanate compound can be synthesized by causing the following compound having three or more active hydrogen groups in one molecule and the following difunctional or higher functional isocyanate compound to react with each other. The active hydrogen group means a hydroxyl group, a primary amino group, a secondary amino group, and a mercapto group.

The adduct-type trifunctional or higher functional isocyanate compound can be obtained, for example, by heating (50° C. to 100° C.) a compound having three or more active hydrogen groups in one molecule and a difunctional or higher functional isocyanate compound in an organic solvent under stirring, or perform stirring at low temperature (0° C. to 70° C.) while adding a catalyst such as stannous octoate (see Synthesis Scheme 1).

Generally, the difunctional or higher functional isocyanate compound that is reacted with a compound having three or more active hydrogen groups in one molecule, of which the number of moles (the number of molecules) is 0.6 times or greater of the number of moles (the number of molecules) of the difunctional or higher functional isocyanate compound with respect to the number of moles (equivalent number of active hydrogen groups) of active hydrogen groups in the compound having three or more active hydrogen groups in one molecule, is used. The number of moles of the difunctional or higher functional isocyanate compound is preferably 0.6 times to 5 times, more preferably 0.6 times to 3 times, and even more preferably 0.8 times to 2 times of the number of moles of the active hydrogen group.

Respective reference numerals ($Y_1$, $R_1$, and the like) in Synthesis Schemes 1 and 2 are the same as reference numerals ($Y_1$, $R_1$, and the like) in Formulae (Z-101) and (Z-102).

Synthesis Scheme 1

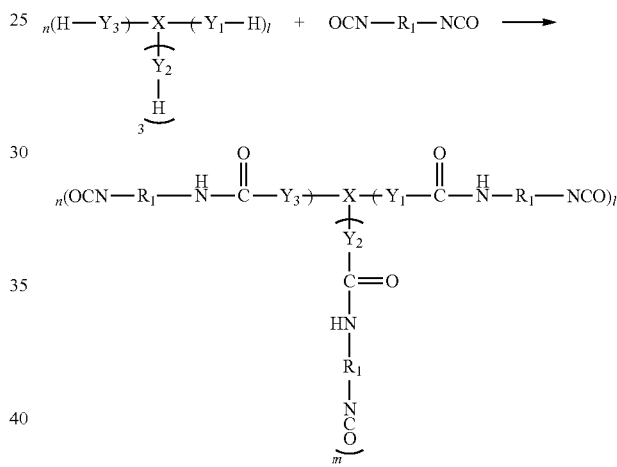

The adduct-type trifunctional or higher functional isocyanate compound can be obtained by synthesizing an adduct (prepolymer) of a compound having two active hydrogen groups in one molecule and a difunctional or higher functional isocyanate compound and causing this prepolymer and a compound having three or more active hydrogen groups in one molecule to be reacted with each other (Synthesis Scheme 2).

Synthesis Scheme 2

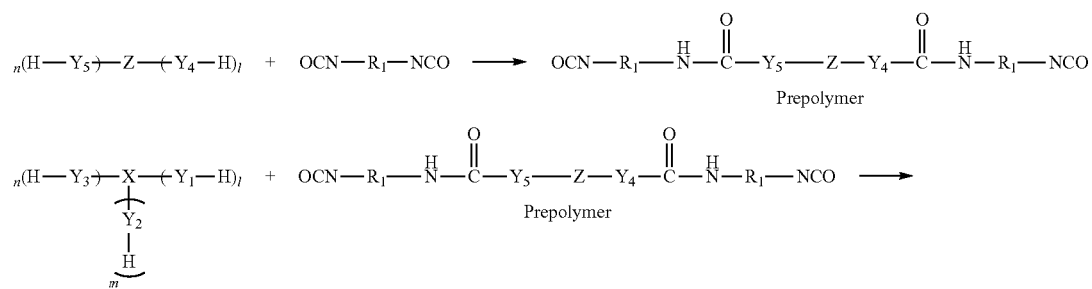

-continued

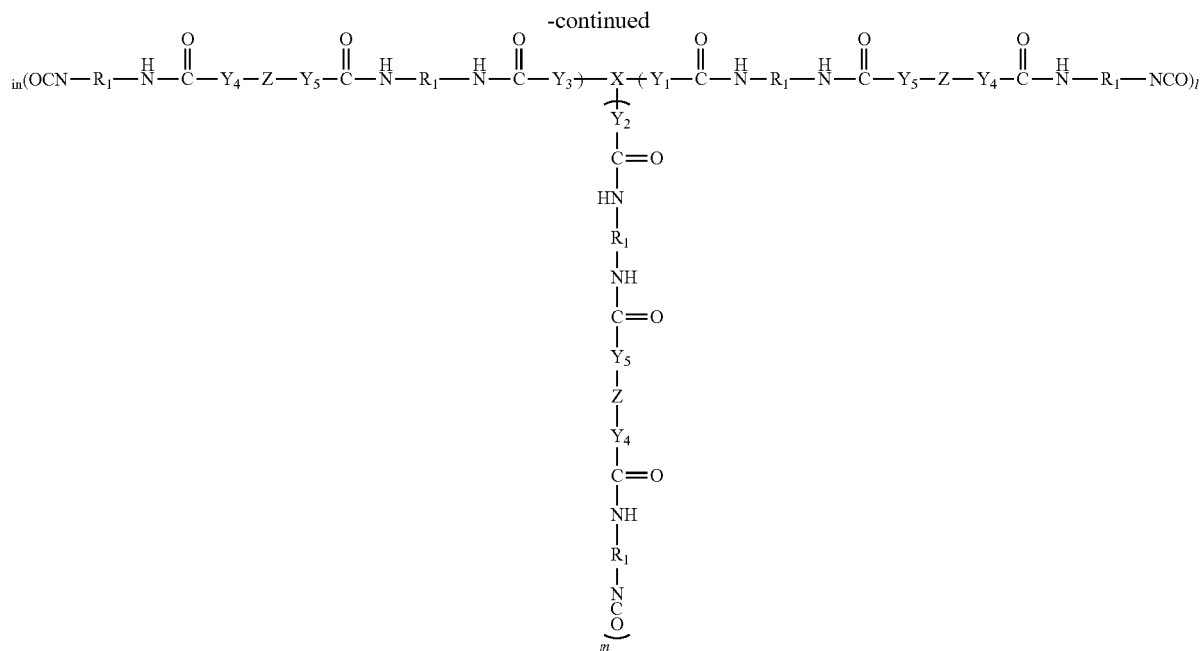

Examples of the difunctional or higher functional isocyanate compound include a difunctional or higher functional aromatic isocyanate compound, and a difunctional or higher functional aliphatic isocyanate compound.

Specific examples of the difunctional or higher functional isocyanate compound include isophorone diisocyanate (IPDI), m-phenylene diisocyanate, p-phenylene diisocyanate, 2,6-tolylene diisocyanate, 2,4-tolylenediisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylilene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl) cyclohexane, 1,3-bis(isocyanatomethyl) cyclohexane (HXDI), norbornene diisocyanate (NBDI), trimethylhexamethylene diisocyanate (TMHDI), lysine diisocyanate, and 1,3-bis(2-isocyanato 2-propyl) benzene.

As the difunctional or higher functional isocyanate compound, compounds of structures represented by (8-1) to (8-24) are preferable.

(B-1)

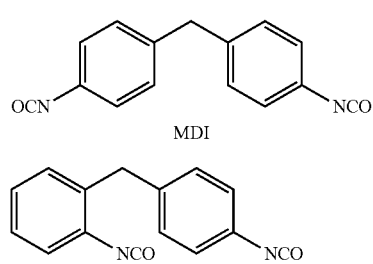
MDI (B-2)

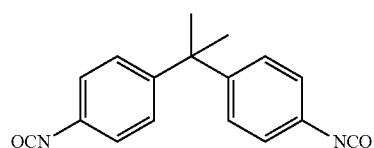

(B-3)

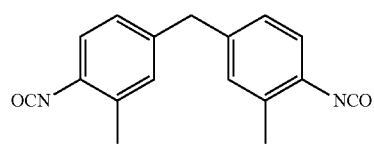

(B-4)

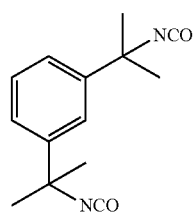

(B-5)

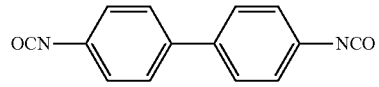

(B-6)

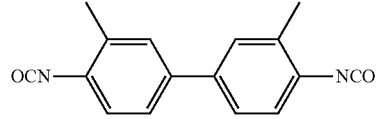

(B-7)

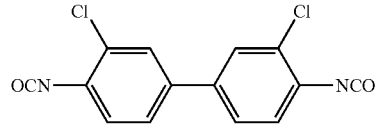

(B-8)

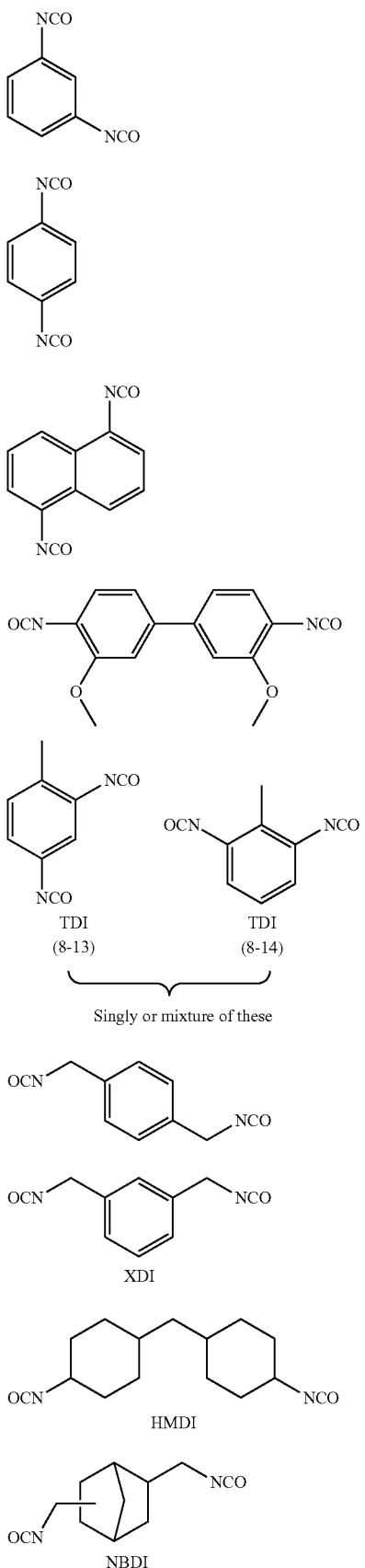

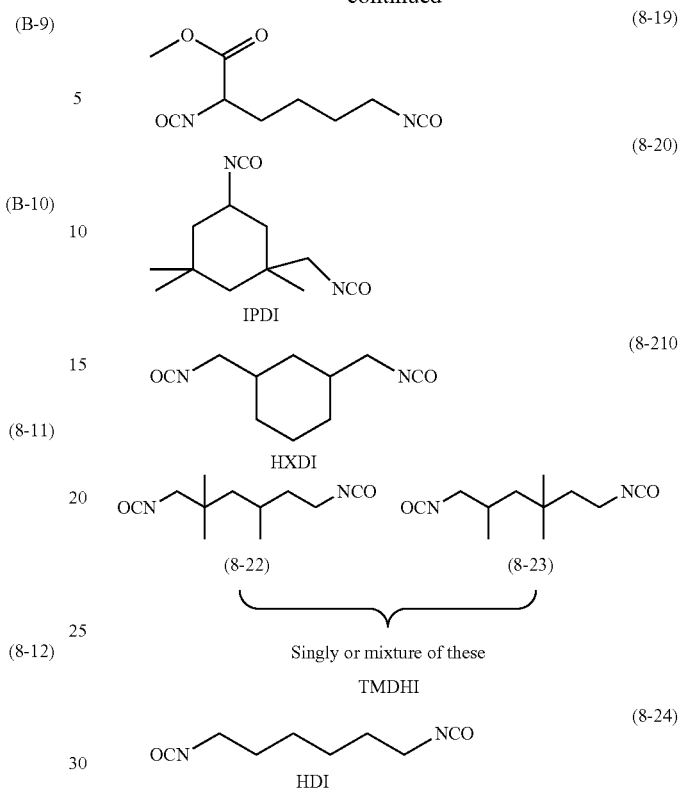

Among these difunctional or higher functional isocyanate compounds, isophorone diisocyanate (IPDI), hexamethylene diisocyanate (HDI), trimethylhexamethylene diisocyanate (TMHDI), 1,3-bis(isocyanatomethyl) cyclohexane (HXDI), m-xylylene diisocyanate (XDI), or dicyclohexylmethane-4,4'-diisocyanate is preferable.

As the difunctional or higher functional isocyanate compound, a difunctional isocyanate compound derived from the compound can be used. Examples thereof include DURANATE (Registered trademark) D101, D201, and A101 (manufactured by Asahi Kasei Corporation).

The compound having three or more active hydrogen groups in one molecule is a compound having three or more of at least one group selected from a hydroxyl group, a primary amino group, a secondary amino group, and a mercapto group in one molecule, and examples thereof include compounds in structures represented by any one of Formulae (9-1) to (9-13). In Formulae (9-1) to (9-13), n represents an integer of 1 to 200, preferably an integer of 1 to 50 and more preferably an integer of 1 to 20.

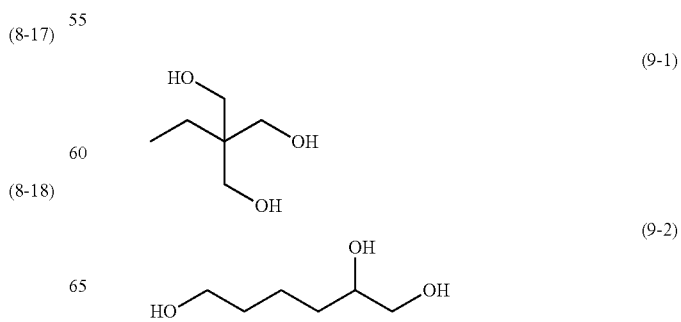

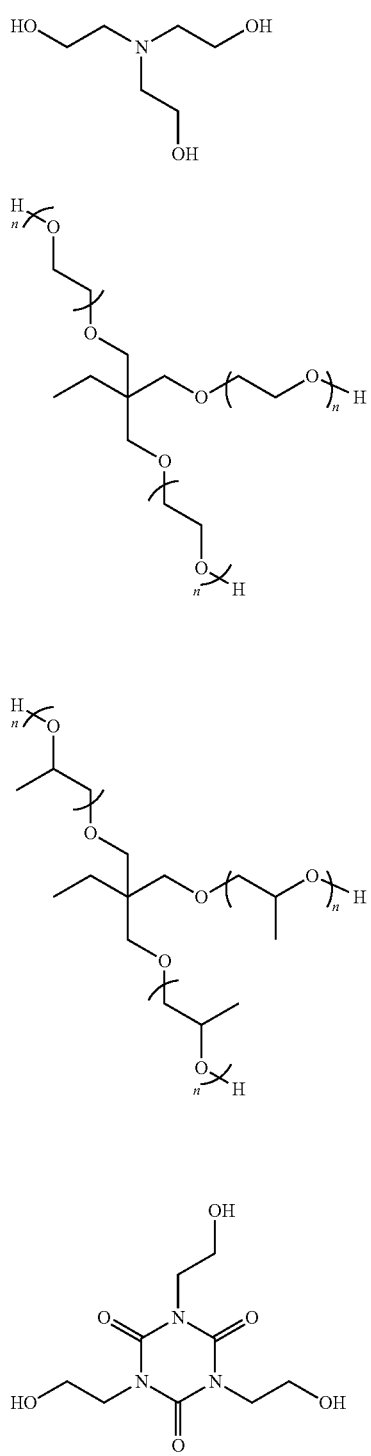
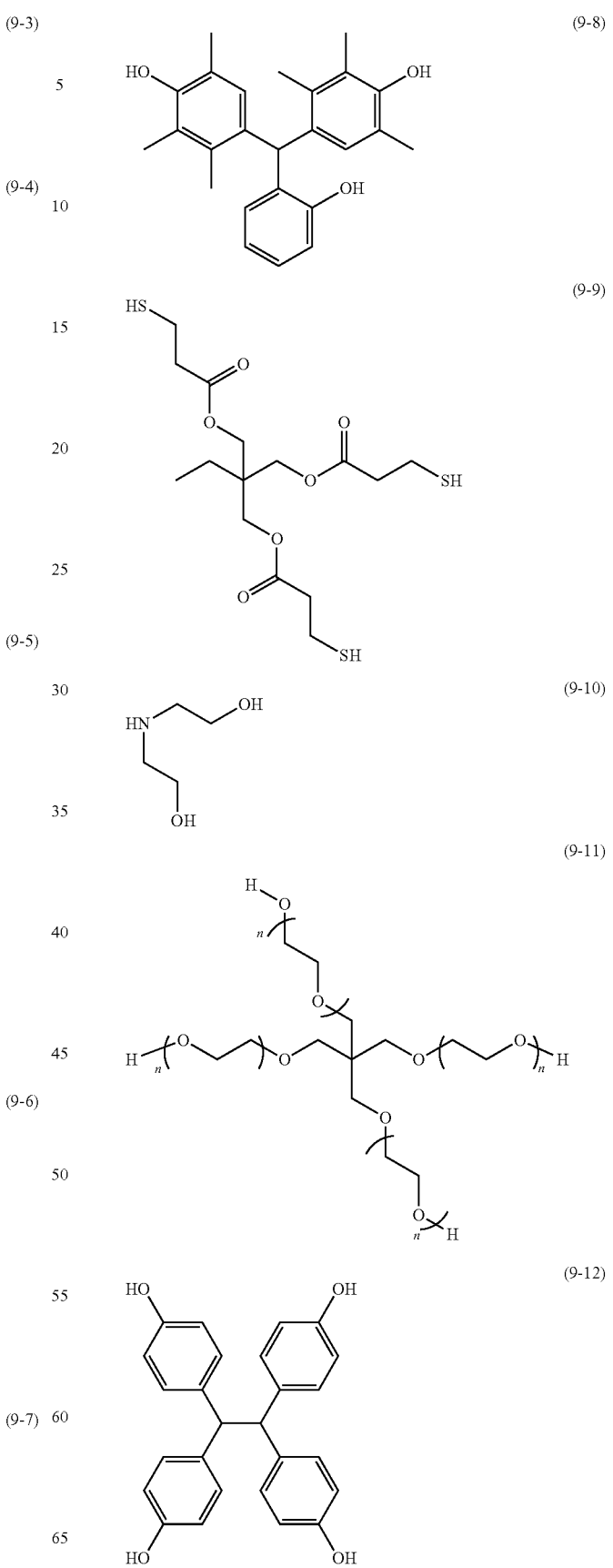

-continued (9-13)

[Structure showing dipentaerythritol hexakis(3-mercaptopropionate) with six SH groups]

As the adduct-type trifunctional or higher functional isocyanate compound, a compound obtained by causing a compound having two or more active hydrogen groups in one molecule and a difunctional or higher functional isocyanate compound to be reacted with each other in a combination represented in Table 3 is preferably used.

TABLE 3

| Compound No. | Polyisocyanate structure | | Composition | |
| --- | --- | --- | --- | --- |
| | Compound having two or more active hydrogen groups | Difunctional isocyanate compound | Compound having two or more active hydrogen groups (mol equivalent) | Difunctional isocyanate compound (mol equivalent) |
| NCO 101 | Trimethylolpropane | 2,4-Tolylene diisocyanate (TDI) | 1 | 4 |
| NCO 102 | | m-Xylylene diisocyanate (XDI) | 1 | 4 |
| NCO 103 | | Hexamethylene diisocyanate (HDI) | 1 | 4 |
| NCO 104 | | 1,3-Bis(isocyanatomethyl) cyclohexane (HXDI) | 1 | 4 |
| NCO 105 | | Isophorone diisocyanate (IPDI) | 1 | 4 |
| NCO 106 | 1,3,5-Trihydroxybenzene | Hexamethylene diisocyanate (HDI) | 1 | 4 |
| NCO 107 | | Isophorone diisocyanate (IPDI) | 1 | 4 |

TABLE 3-continued

| Compound No. | Polyisocyanate structure | | Composition | |
|---|---|---|---|---|
| | Compound having two or more active hydrogen groups | Difunctional isocyanate compound | Compound having two or more active hydrogen groups (mol equivalent) | Difunctional isocyanate compound (mol equivalent) |
| NCO 108 | Pentaerythritol ethylene oxide | 1,3-Bis(isocyanatomethyl) cyclohexane (HXDI) | 1 | 5 |
| NCO 109 | Pentaerythritol ethylene oxide | Isophorone diisocyanate (IPDI) | 1 | 5 |
| NCO 110 | Dipentaerythritol hexakis(3-mercaptopropionate) | Hexamethylene diisocyanate (HDI) | 1 | 7 |
| NCO 111 | Dipentaerythritol hexakis(3-mercaptopropionate) | Isophorone diisocyanate (IPDI) | 1 | 7 |
| NCO 112 | Triethanolamine | Hexamethylene diisocyanate (HDI) | 1 | 4 |
| NCO 113 | Triethanolamine | Isophorone diisocyanate (IPDI) | 1 | 4 |

As the adduct-type trifunctional or higher functional isocyanate compound, NCO102 to NCO105, NCO107, NCO108, NCO111, and NCO113 are more preferable among the compounds represented by Table 3.

As the adduct-type trifunctional or higher functional isocyanate compound, the commercially available products in the market may be used, and examples thereof include TAKENATE (Registered trademark) D-102, D-103, D-103H, D-103M2, P49-75S, D-110N, D-120N, D-140N, and D-160N (hereinafter, manufactured by Mitsui Chemicals, Inc.), DESMODUR (Registered trademark) L75 and UL57SP (hereinafter, manufactured by Covestro Japan Ltd.), CORONATE (Registered trademark) HL, HX, and L (hereinafter, manufactured by Tosoh Corporation), and P301-75E (hereinafter, manufactured by Asahi Kasei Corporation).

Among these adduct-type trifunctional or higher functional isocyanate compounds, D-110N, D-120N, D-140N, and D-160N (hereinafter, manufactured by Mitsui Chemicals, Inc.) are more preferable.

A polyfunctional isocyanate compound in an aspect in which $Z^C$ in Formula (ZC) is a group represented by Formula (Z-103) is a biuret-type isocyanate compound.

A polyfunctional isocyanate compound in an aspect in which $Z^C$ in Formula (ZC) is a group represented by Formula (Z-104) is an isocyanurate-type isocyanate compound.

As the biuret-type trifunctional or higher functional isocyanate compound, commercially available products in the market may be used, and examples thereof include D-165N and NP1100 (manufactured by Mitsui Chemicals, Inc.), DESMODUR (Registered trademark) N3200 (Covestro Japan Ltd.), and DURANATE (Registered trademark) 24A-100 (manufactured by Asahi Kasei Corporation).

As the isocyanurate-type trifunctional or higher functional isocyanate compound, commercially available products in the market may be used, and examples thereof include D-127N, D-170N, D-170HN, D-172N, and D-177N (manufactured by Mitsui Chemicals, Inc.), SUMIDUR N3300, DESMODUR (Registered trademark) N3600, N3900, and Z4470BA (Covestro Japan Ltd.), CORONATE (Registered trademark) HX and HK (manufactured by Tosoh Corporation), and DURANATE (Registered trademark) TPA-100, TKA-100, TSA-100, TSS-100, TLA-100, and TSE-100 (manufactured by Asahi Kasei Corporation).

Among these biuret type and isocyanurate-type trifunctional or higher functional isocyanate compounds, DURANATE (Registered trademark) 24A-100 (manufactured by Asahi Kasei Corporation), D-127 (manufactured by Mitsui Chemicals, Inc.), and TKA-100 and TSE-100 (manufactured by Asahi Kasei Corporation) are more preferable.

[Image Forming Method]

The image forming method of the present embodiment has an application step of using the water dispersion of the present disclosure as ink and applying a water dispersion as ink on a recording medium and an irradiation step of irradiating the water dispersion applied on the recording medium with the active energy rays.

In a case where these steps are performed, an image having excellent adhesiveness is formed on the recording medium. This formed image is also excellent in hardness, fixing properties, water resistance, and a solvent resistance.

As the recording medium, the above base materials (plastic base materials and the like) can be used.

A preferable combination between a material of a base material and a material of a polymer chain represented by $P^1$ or $P^2$ in view of adhesiveness of a base material and a film is as described above in "Water dispersion of gel particles" Section.

<Application Step>

The application step is a step of applying the water dispersion of the present disclosure on the recording medium.

As an aspect of applying the water dispersion to the recording medium, an aspect of applying the water dispersion by an ink jet method is preferable.

The application of the water dispersion by an ink jet method can be performed by using the well-known ink jet recording devices.

An ink jet recording device is not particularly limited, a well-known ink jet recording device that can achieve the desired resolution can be arbitrarily selected to be used.

That is, any one of the well-known ink jet recording devices including a commercially available product can discharge the water dispersion to a recording medium by the image forming method of the present embodiment.

Examples of the ink jet recording device include devices including an ink supplying method, a temperature sensor, and heating means.

Examples of the ink supplying method include an original tank including the water dispersion of the present disclosure, a supply piping, an ink supply tank just before an ink jet head, a filter, and a piezo-type ink jet head. The piezo-type ink jet head can be driven so as to eject multi-sized dots of preferably 1 pl to 100 pl and more preferably 8 pl to 30 pl at a resolution of preferably 320 dpi×320 dpi to 4,000 dpi×4,000 dpi (dot per inch), more preferably 400 dpi×400 dpi to 1,600 dpi×1,600 dpi, and even more preferably 720 dpi×720 dpi.

The dpi (dot per inch) according to the present embodiment represents the number of dots per 2.54 cm (1 inch).

<Irradiation Step>

The irradiation step is a step of irradiating the water dispersion applied to the recording medium with the active energy rays.

In a case where the water dispersion applied to the recording medium is irradiated with active energy rays, the crosslinking reaction of the gel particles in the water dispersion proceeds, the image is fixed, and the film hardness of the image can be improved.

Examples of the active energy rays that can be used in the irradiation step include ultraviolet rays (hereinafter, also referred to as UV light), and visible rays, electron beams. Among these, UV light is preferable.

A peak wavelength of the active energy rays (light) is preferably 200 nm to 405 nm, more preferably 220 nm to 390 nm, even more preferably 220 nm to 385 nm, and even more preferably 220 nm to 365 nm.

The peak wavelength thereof is also preferably 200 nm to 310 nm and also preferably 200 nm to 280 nm.

For example, the exposure surface illuminance in a case of irradiation with the active energy rays (light) may be 10 mW/cm$^2$ to 2,000 mW/cm$^2$ and is preferably 20 mW/cm$^2$ to 1,000 mW/cm$^2$·s As the light source for generating the active energy rays (light), a mercury lamp, a metal halide lamp, a UV fluorescent lamp, a gas laser, a solid-state laser, and the like are widely known.

The replacement of the light sources exemplified above into a semiconductor ultraviolet light emitting device is industrially and environmentally useful.

Among these, among semiconductor ultraviolet light emitting devices, light emitting diode (LED) and a laser diode (LD) are compact, has a long lifetime, high efficiency, and low cost, and is expected as a light source.

As the light source, a metal halide lamp, an extra high pressure mercury lamp, a high pressure mercury lamp, a medium pressure mercury lamp, a low pressure mercury lamp, LED, and a blue-violet laser are preferable.

Among these, an extra high pressure mercury lamp that can perform irradiation with light at a wavelength of 365 nm, 405 nm, or 436 nm, a high pressure mercury lamp that can perform irradiation with light at a wavelength of 365 nm, 405 nm, or 436 nm, LED that can perform irradiation with light at a wavelength of 355 nm, 365 nm, 385 nm, and 395 nm, or 405 nm is more preferable, and LED that can perform irradiation with light at a wavelength of 355 nm, 365 nm, 385 nm, 395 nm, or 405 nm is most preferable.

In the irradiation step, the irradiation time of the water dispersion applied on the recording medium with the active energy rays may be 0.01 seconds to 120 seconds and preferably 0.1 seconds to 90 seconds.

With respect to the irradiation condition of the active energy rays and basic irradiation method, conditions disclosed in JP1985-132767A (JP-S60-132767A) can be suitably referred to.

Specifically, a method of scanning the head unit and the light sources by a so-called shuttle method of providing the light sources on both sides of the head unit including the ink ejection device and a method of performing irradiation with active energy rays by a separate light source without driving are preferable as an irradiation method with active energy rays.

The irradiation with the active energy rays is preferably performed for a certain period of time (for example, for 0.01 seconds to 120 seconds and preferably for 0.01 seconds to 60 seconds) after water dispersion is landed and dried by heating.

<Heating and Drying Step>

If necessary, the image forming method of the present embodiment may have a heating and drying step of heating and drying the water dispersion on the recording medium before the irradiation step and after the application step.

The heating means for performing heating and drying is not particularly limited. However, examples thereof include a heat drum, hot air, an infrared lamp, a heat oven, and a heat plate.

The heating temperature is preferably 40° C. or higher, more preferably 40° C. to 150° C., and even more preferably 40° C. to 80° C.

The heating time can be appropriately set by adding the composition of the water dispersion, the printing speed, and the like.

EXAMPLES

Hereinafter, the invention is specifically described with reference to the specific examples, but the invention is not limited to the following examples without departing from the gist of the invention.

Unless particularly described otherwise, a "part" is based on mass.

[Preparation of Polymer Diol]

As the raw material of the three-dimensional crosslinked structure in each of the following examples (Tables 4 and 5), polymer diol (Polymer Diol (1PD) or Polymer Diol (2PD)) represented by Tables 4 and 5 is prepared. With respect to details of the polymer diol in Tables 4 and 5, Tables 1 and 2 can be referred to.

[Synthesis of Isocyanate Group-Containing Polymer]

Isocyanate Group-Containing Polymer P-1 to P-45 provided in each of the following examples (Tables 4 and 5) which were raw materials of the three-dimensional crosslinked structure were synthesized by using polymer diol prepared above.

In each of the following examples, in the gelation step, a urea bond was formed by causing an isocyanate group of at least one of Isocyanate Group-Containing Polymers P-1 to P-45 and water to react with each other, a three-dimensional crosslinked structure (Polymer Structure (1) or Polymer Structure (2)) having a urea bond was formed.

<Synthesis of Isocyanate Group-Containing Polymer P-1>

According to the following scheme, Isocyanate Group-Containing Polymer P-1 was synthesized.

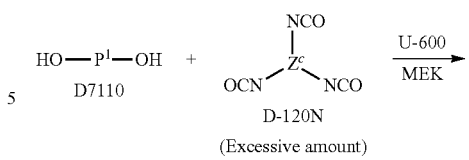

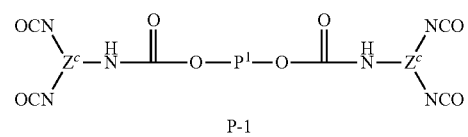

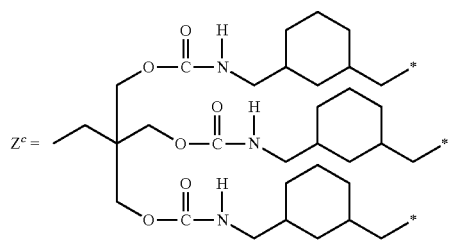

Detailed operations of the scheme are as follows.

D7110 (see Table 1) (100 g) as Polymer Diol (1PD), TAKENATE (Registered trademark) D-120N ("Zc" was a trivalent organic group described in the following scheme. Hereinafter, a specific structure of "ZC" of D-120N is omitted.) (112.33 g) (an excessive amount with respect to an amount of the OH group of D7110) manufactured by Mitsui Chemicals, Inc. as Isocyanate Compound (ZC), and methyl ethyl ketone (MEK) (429.9 g) were weighed to a 1,000 ml three-neck flask including a cooling pipe and heating and stirring was performed at 50° C. under the nitrogen stream. 0.642 g of NEOSTAN (Registered trademark) U-600 (manufactured by Nitto Kasei Co., Ltd., Inorganic bismuth catalyst) was added thereto, and heating and stirring were performed at 50° C. for three hours, so as to obtain a 30 mass % target solution of Isocyanate Group-Containing Polymer P-1.

Here, the expression "an excessive amount with respect to an amount of the OH group of D7110" was specifically an amount in which the ratio [the number of NCO groups of D-120N/the number of OH groups of D7110] was 3.0.

<Synthesis of Isocyanate Group-Containing Polymers P-2 to P-16>

Isocyanate Group-Containing Polymers P-2 to P-16 were synthesized in the same manner as in the synthesis of Isocyanate Group-Containing Polymer P-1 except for changing kinds of polymer diol and kinds of Isocyanate Compound (ZC) to those as presented in Table 4.

"(ZC)" Sections in Tables 4 and 5 present kinds of Isocyanate Compound (ZC) which was one of raw materials of the isocyanate group-containing polymer. Structures of the respective materials in "(ZC)" Section were as provided below. X in 101A was a trivalent group.

120N

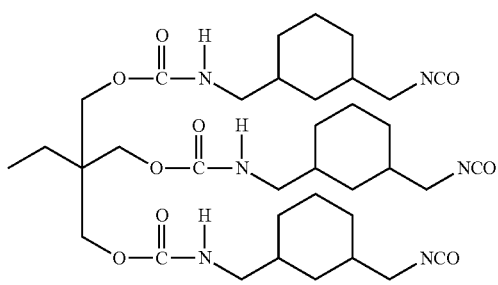

110N

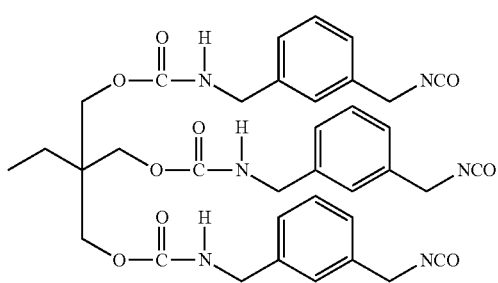

101A

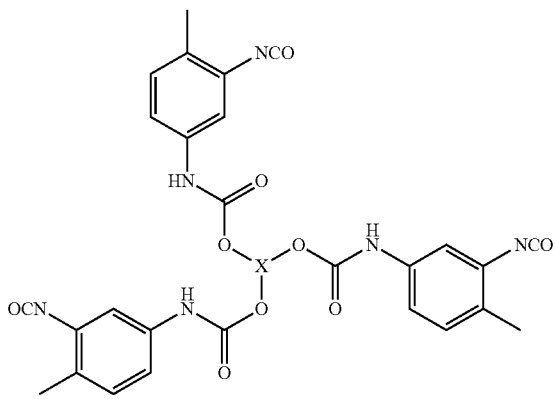

127N

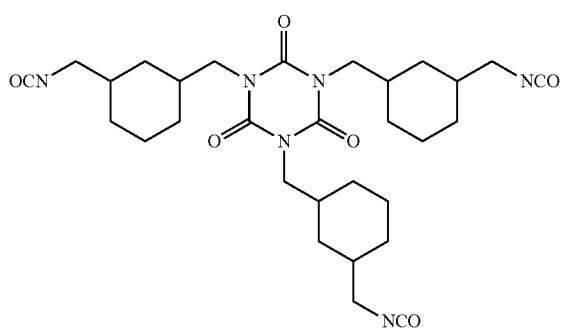

TPA

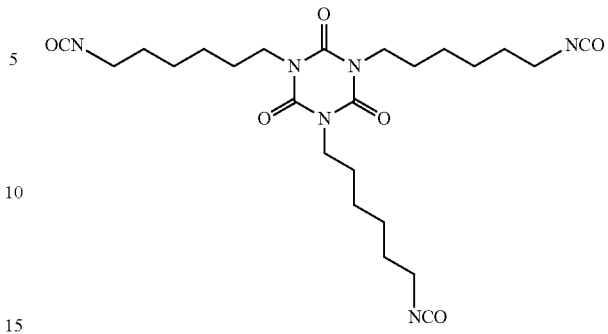

Specifically, each of the above materials is the following commercially available products.

120N . . . TAKENATE (Registered trademark) D-120N manufactured by Mitsui Chemicals, Inc.

110N . . . TAKENATE (Registered trademark) D-110N manufactured by Mitsui Chemicals, Inc.

101A . . . TAKENATE (Registered trademark) D-101A manufactured by Mitsui Chemicals, Inc.

127N . . . TAKENATE (Registered trademark) D-127N manufactured by Mitsui Chemicals, Inc.

TPA . . . DURANATE (Registered trademark) TPA-100 manufactured by Asahi Kasei Corporation <Synthesis of Isocyanate Group-Containing Polymer P-17>

According to the following scheme, Isocyanate Group-Containing Polymer P-17 was synthesized.

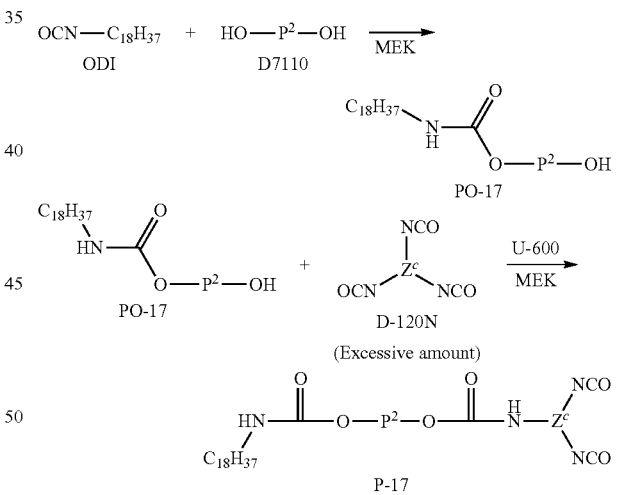

Detailed operations of the scheme are as follows.

D7110 (100 g) as Polymer Diol (2PD), octadecyl isocyanate (ODI (also called stearyl isocyanate)) (9.66 g) as a terminal sealing agent (1M), and methyl ethyl ketone (MEK) (386.9 g) were weighed to a 1,000 ml three-neck flask including a cooling pipe, the temperature was set to 50° C. under the nitrogen stream, 0.459 g of U-600 was added thereto, and heating and stirring were performed for three hours, so as to obtain a solution of One-Terminal Sealing Polymer PO-17 as One-Terminal Sealing Polymer (2PO). After the solution was allowed to cool, 74.89 g of D-120N (an excessive amount with respect to an amount of the OH group of Polymer PO-17) was added thereto, and heating and stirring was further performed at 50° C. for three hours, so as to obtain a 30 mass % target solution of Isocyanate Group-Containing Polymer P-17.

Here, the expression "an excessive amount with respect to an OH group of Polymer PO-17" was specifically an amount in which the ratio [the number of NCO groups of D-120N/the number of OH groups of Polymer PO-17] was 2.0.

In the synthesis, a used amount (9.66 g) of ODI was an amount in which a ratio [the number of NCO groups in ODI/the number of OH groups in D7110] was 0.33.

<Isocyanate Group-Containing Polymers P-18 to P-34>

Isocyanate Group-Containing Polymers P-18 to P-34 were synthesized in the same manner as in the synthesis of Isocyanate Group-Containing Polymer P-17 except for changing kinds of polymer diol to those as presented in Table 4.

<Synthesis of Isocyanate Group-Containing Polymer P-35>

Isocyanate Group-Containing Polymer P-35 was synthesized according to the following scheme.

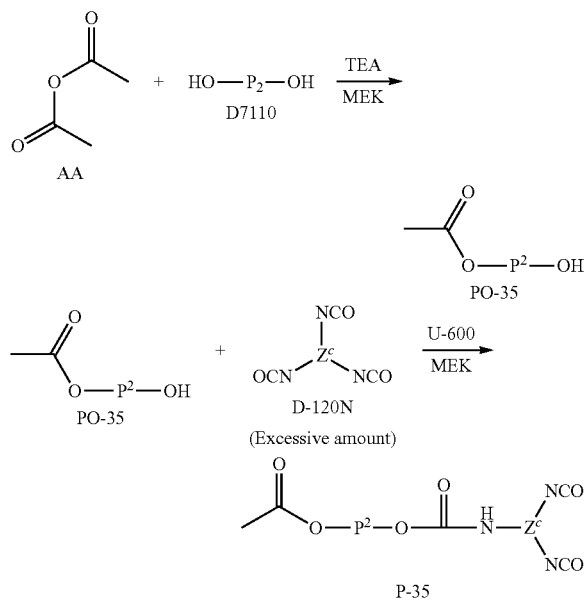

Detailed operations of the scheme are as follows.

100 g of D7110 as Polymer Diol (2PD), 3.34 g of acetic anhydride (AA) as an anhydride of Terminal Sealing Agent (M2), and 250.57 g of methyl ethyl ketone (MEK) were weighed to a 500 ml three-neck flask including a cooling pipe, stirring was performed at room temperature under the nitrogen stream. 3.96 g of triethylamine (TEA) was dropwise added thereto, and stirring was further performed for three hours. 100 g of ethyl acetate was added to the obtained solution, washing was performed once with a saturated aqueous sodium hydrogen carbonate solution, and washing was further performed twice with distilled water. The solution after the washing twice with distilled water was dried with anhydrous magnesium sulfate, and the solvent was distilled, so as to obtain 101 g of Polymer PO-35 as One-Terminal Sealing Polymer (2PO).

Polymer PO-35 (101 g) of which one terminal was sealed and 386.9 g of methyl ethyl ketone were weighed to a 1,000 ml three-neck flask including a cooling pipe, 74.89 g of D-120N (an excessive amount with respect to an OH group of Polymer PO-35) was added, and heating was performed to 50° C. 0.562 g of U-600 was added thereto, and heating and stirring were performed at 50° C. for three hours, so as to obtain a 30 mass % target solution of Isocyanate Group-Containing Polymer P-35.

Here, the expression "an excessive amount with respect to an OH group of Polymer PO-35" was specifically an amount in which the ratio [the number of NCO groups of D-120N/the number of OH groups of Polymer PO-35] was 2.0.

In the synthesis, a used amount of AA (3.34 g) was an amount in which a ratio [the number of COOH groups generated from AA/the number of OH groups in D7110] was 0.33.

<Synthesis of Isocyanate Group-Containing Polymer P-36>

Isocyanate Group-Containing Polymer P-36 was synthesized in the same manner as in the synthesis of Isocyanate Group-Containing Polymer P-35 except for changing a kind of polymer diol to that represented by Table 4.

<Synthesis of Isocyanate Group-Containing Polymer P-37>

Isocyanate Group-Containing Polymer P-37 was synthesized according to the following scheme.

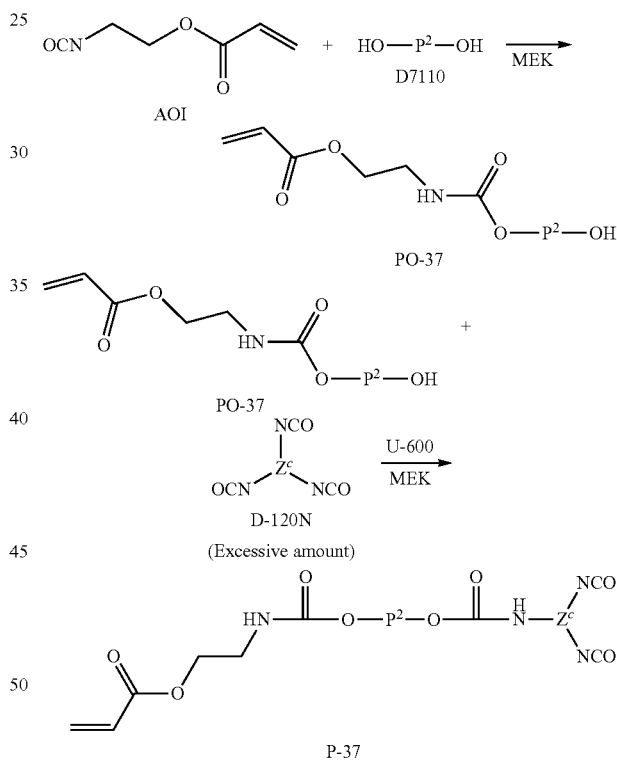

Detailed operations of the scheme are as follows.

D7110 (100 g) as Polymer Diol (2PD), AOI ("KARENZ AOI" (Registered trademark) manufactured by Showa Denko K.K., compound name: 2-acryloyloxyethyl isocyanate) (4.61 g) as Terminal Sealing Agent (M1), and methyl ethyl ketone (375.1 g) were weighed to a 1,000 ml three-neck flask including a cooling pipe, heating was performed to 50° C., 0.550 g of NEOSTAN U-600 was added thereto, and heating and stirring was performed for three hours, so as to obtain a solution of Polymer PO-37 as One-Terminal Sealing Polymer (2PO). After the solution was allowed to cool, 74.89 g of D-120N (an excessive amount with respect to an amount of the OH group of Polymer PO-37) was added thereto, and heating and stirring was further performed at 50° C. for three hours, so as to obtain a 30 mass % target solution of Isocyanate Group-Containing Polymer P-37.

Here, the expression "an excessive amount with respect to an OH group of Polymer PO-37" was specifically an amount in which the ratio [the number of NCO groups of D-120N/the number of OH groups of Polymer PO-37] was 2.0.

In the synthesis, a used amount of AOI (4.61 g) was an amount in which a ratio [the number of NCO groups in AOI/the number of OH groups in D7110] was 0.33.

<Synthesis of Isocyanate Group-Containing Polymer P-38 to P-45>

Isocyanate Group-Containing Polymer P-38 to P-45 were synthesized in the same manner as in the synthesis of Isocyanate Group-Containing Polymer P-37 except for changing kinds of polymer diol to those as presented in Table 4.

[Synthesis of Comparative Polymer]

Comparative Polymers C-1 to C-4 used in comparative examples were synthesized. Comparative Polymers C-1 to C-4 were polymers not containing an isocyanate group.

<Synthesis of Comparative Polymer C-1>

Comparative Polymer C-1 was synthesized by the following scheme.

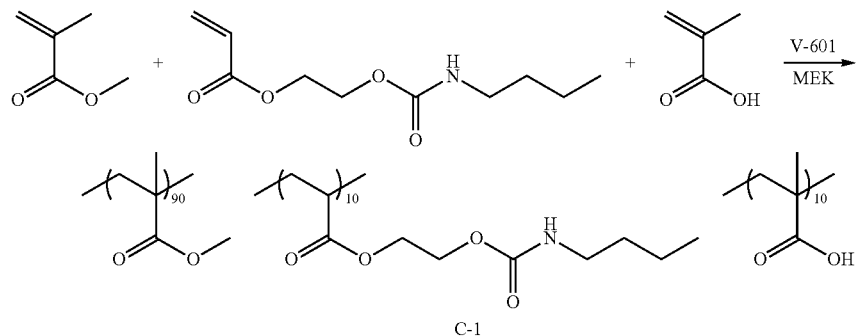

C-1

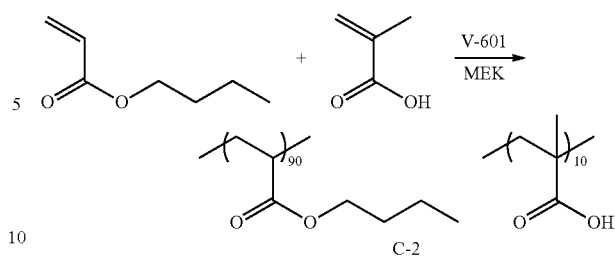

C-2

Detailed operations of the scheme are as follows.

75.1 g of methyl ethyl ketone was weighed to a 500 ml three-neck flask including a cooling pipe and heating and stirring was performed at 75° C. under the nitrogen stream.

Independently from this, a mixed solution prepared by mixing 175.2 g of methyl ethyl ketone, 90 g of methyl methacrylate, 10 g of 1,2-ethanediol 1-acrylate 2-(N-butyl-carbamate), 10 g of methacrylic acid, and 6.65 g of V-601 (dimethyl 2,2'-azobis(2-methyl propionate), manufactured by Wako Pure Chemical Industries, Ltd.) was added dropwise to the flask over two hours. After the dropwise addition was completed and heating was performed for four hours at 75° C., 0.216 g of V-601 was added, stirring was further performed for two hours at 90° C., and reaction was performed. The obtained reaction solution was allowed to cool, and cooling was performed to room temperature. The concentration of the obtained reaction solution was adjusted by using methyl ethyl ketone, so as to obtain a solution (solid content: 30 mass %) of Comparative Polymer C-1 (weight-average molecular weight (Mw): 40,000).

<Synthesis of Comparative Polymer C-2>

Comparative Polymer C-2 was synthesized by the following scheme.

Detailed operations of the scheme are as follows.

75.1 g of methyl ethyl ketone was weighed to a 500 ml three-neck flask including a cooling pipe and heating and stirring was performed at 75° C. under the nitrogen stream. Independently from this, a mixed solution prepared by mixing 175.2 g of methyl ethyl ketone, 90 g of butyl methacrylate, 10 g of methacrylic acid, and 6.612 g of V-601 (dimethyl 2,2'-azobis(2-methyl propionate), manufactured by Wako Pure Chemical Industries, Ltd.) was added dropwise to the flask over two hours. After the dropwise addition was completed and heating was performed for four hours at 75° C., 0.17 g of V-601 was added, stirring was further performed for two hours at 90° C., and reaction was performed. The obtained reaction solution was allowed to cool, and cooling was performed to room temperature. The concentration of the obtained reaction solution was adjusted by using methyl ethyl ketone, so as to obtain a 30 mass % solution (solid content: 30 mass %) of Comparative Polymer C-2 (weight-average molecular weight (Mw): 35,000).

<Synthesis of Comparative Polymer C-3 (Urethane Acrylate (a))>

Comparative Polymer C-3 ("Urethane Acrylate (a)" in the publication) was synthesized according to paragraph 0183 of JP2013-199602A.

444.6 parts by mass of isophorone diisocyanate (IPDI) and 202.3 parts by mass of 1,12-dodecanediol were introduced to a reaction vessel including a stirrer, a cooling pipe, a dropping funnel, and an air introduction pipe, 0.26 parts by mass of stannous octoate was added under stirring, and the temperature in the reaction vessel was increased to 90° C., so as to perform reaction for 1.5 hours. After the reaction, 700.0 parts by mass of methoxy PEG1000 (methoxy polyethylene glycol, Toho Chemical Industry Co., Ltd.) and 0.54 parts by mass of tin stannous octoate were added, and reaction was further performed for 1.5 hours. Subsequently, 1300.0 parts of dipentaerythritol pentaacrylate, 1.32 parts of methoquinone, and 1.06 parts of stannous octoate were introduced to the corresponding reaction vessel and were mixed with each other, the temperature in the reaction vessel was increased to 85° C. under air bubbling, and reaction was performed for three hours, and cooling was performed, so as to obtain Comparative Polymer C-3 (Urethane Acrylate (a)).

It is considered that all of the isocyanate groups in IPDI were reacted, and urethane bonds were generated in the synthesis of Comparative Polymer C-3. That is, it is considered that an isocyanate group was not remain in Comparative Polymer C-3.

<Synthesis of Comparative Polymer C-4 (Urethane Acrylate (b))>

Comparative Polymer C-4 ("Urethane Acrylate (b)" in the publication) was synthesized according to paragraph 0184 of JP2013-199602A.

578.0 parts of a trimer (CORONATE (Registered trademark) HXR, manufactured by Tosoh Corporation) of hexamethylene diisocyanate (HDI), 200.0 parts of methoxy PEG400 (methoxy polyethylene glycol, manufactured by Toho Chemical Industry Co., Ltd.), and 200.0 parts of methoxy PEG1000 were introduced to a reaction vessel including a stirrer, a cooling pipe, a dropping funnel, and an air introduction pipe, 0.39 parts of stannous octoate was added under stirring, and the temperature in the reaction vessel was increased to 75° C., so as to perform reaction for 1.5 hours. Subsequently, 1051.6 parts of pentaerythritol triacrylate, 1.01 parts of methoquinone, and 0.81 parts of stannous octoate were introduced to this reaction vessel and were mixed with each other, the temperature in the reaction vessel under air bubbling was increased to 80° C., reaction was performed for two hours, and cooling was performed, so as to obtain Urethane Acrylate (b).

Comparative Polymer C-4 (Urethane Acrylate (b)) was urethane acrylate of which one terminal was an acryloyl group and in which trifunctional isocyanate was used.

It is considered that all of the isocyanate groups in HDI were reacted, and urethane bonds were generated in the synthesis of Comparative Polymer C-4. That is, it is considered that an isocyanate group was not remain in Comparative Polymer C-4.

Example 1

<Manufacturing of Water Dispersion>

(Emulsification Step)

—Manufacturing of Emulsification Step—

An oil phase component was obtained by mixing 22.3 g of a solution (solid content 30 mass %) of Isocyanate Group-Containing Polymer P-1, 3.5 g of a 50 mass % ethyl acetate solution (manufactured by Mitsui Chemicals, Inc., TAKANATE (Registered trademark) D-116N) of an adduct (a compound having an ethyleneoxy group as a hydrophilic group) of trimethylolpropane, xylene diisocyanate, and polyethylene glycol monomethyl ether, 7 g of SR-399E (dipentaerythritol pentaacrylate; manufactured by Sartomer) as a polymerizable monomer, 1.07 g of IRGACURE (Registered trademark) 819 (manufactured by BASF SE) as a photopolymerization initiator, and 16 g of ethyl acetate, and dissolving respective components.

In Tables 4 and 5, the photopolymerization initiator is simply referred to as an "initiator".

—Manufacturing of Water Phase Component—

A water phase component was obtained by dissolving 0.493 g of sodium hexadecyl sulfate (SCS) as a compound having a hydrophilic group (sodium salt of sulfate group) in 46 g of distilled water.

The mixture obtained by mixing the oil phase component and the water phase component was emulsified for 10 minutes at 12,000 rpm by using a homogenizer.

(Gelation Step)

A water dispersion of gel particles was obtained by heating the emulsion and causing Isocyanate Group-Containing Polymer P-1 and water to react with each other. In this reaction, an isocyanate group of Isocyanate Group-Containing Polymer P-1 and water were reacted with each other, and a urea bond was formed, so as to form a three-dimensional crosslinked structure having a polymer structure represented by Formula (1). Detailed operations are provided below.

Ethyl acetate and methyl ethyl ketone were distilled from the emulsion by adding 16.3 g of distilled water to the emulsion and subsequently performing heating at 40° C. for 5 hours under stirring. The temperature of the obtained liquid was increased to 50° C., the liquid was stirred at 50° C. for 24 hours, so as to form particles in the liquid. The liquid including particles was diluted with distilled water such that the solid content (that is, content of particles) become 20 mass %, so as to obtain a water dispersion of the particles.

<Determination of Gelling>

The following operations were performed in the condition of the liquid temperature of 25° C.

Samples were gathered from the water dispersion. With respect to the gathered samples, 100 times by mass of tetrahydrofuran (THF) were added and mixed with respect to the total solid content of the sample (particles in the present example) so as to prepare a diluent of the water dispersion. With respect to the obtained diluent, centrifugation was performed under the conditions of 80,000 rpm and 40 minutes. After the centrifugation, whether there are residues was visually checked. In a case where there were residues, water was added to these residues, stirring was performed for one hour with a stirrer, such that the residues were re-dispersed with water, so as to obtain a redispersion liquid. A particle size distribution of the obtained redispersion liquid was measured by a light scattering method by using a wet-type particle size distribution determination device (LA-910, manufactured by Horiba Ltd.).

Whether particles were gelled (that is, whether particles are gel particles) was determined according to the following determination standard based on the results of the operations.

The results are provided in Table 4.

—Determination Standard of Gelling—

Y: Residues were checked after centrifugation, particle size distribution of the redispersion liquid of the residue was checked, and it was checked that particles were gelled (that is, particles were gel particles).

N: Residues were not checked after centrifugation, or particle size distribution of the redispersion liquid was not checked even in a case where residues were checked, and gelling was not checked.

<Measuring of Volume-Average Particle Diameter of Gel Particles>

A volume-average particle diameter (hereinafter, simply referred to as "particle diameter") of the obtained gel particles in the water dispersion was measured by a light scattering method by using LA-910.

The results are provided in Table 4.

<Manufacturing of Ink Composition>

The following components were mixed, so as to manufacture an ink composition.

The obtained ink composition is an aspect of the water dispersion of gel particles.

—Components of Ink Composition—

The above water dispersion . . . 82 parts

Pigment dispersion liquid (Pro-jet Cyan APD1000 (Registered trademark) (manufactured by FUJIFILM Imaging Colorants, Inc.) . . . 13 parts Fluorine-based surfactant (manufactured by DuPont, Zonyl FS300) . . . 0.7 parts 2-Methylpropanediol . . . 4.3 parts <Evaluation>

The following evaluation was performed by using the ink composition which is an aspect of the water dispersion of gel particles.

The results are provided in Table 6.

(Adhesiveness of Cured Film (Cross Hatch Test))

The adhesiveness was evaluated by using each of the evaluation sample (PVC), the evaluation samples (PS), the evaluation samples (PC), the evaluation samples (PET), the evaluation samples (G-modified PET), the evaluation samples (PP), and the evaluation samples (Acryl).

An evaluation sample (PVC) was manufactured by coating a polyvinyl chloride (PVC) sheet as a base material with the ink composition obtained above in a thickness of 12 μm by using bar No. 2 of K hand coater manufactured by RK PRINT COAT INSTRUMENTS Ltd. and heating and drying the obtained coated film at 60° C. for three minutes.

The evaluation sample (PS) was manufactured in the same manner as the manufacturing of the evaluation sample (PVC) except for changing the base material to a polystyrene (PS) sheet.

The evaluation sample (PC) was manufactured in the same manner as the manufacturing of the evaluation sample (PVC) except for changing the base material to a polycarbonate (PC) sheet.

The evaluation sample (PET) was manufactured in the same manner as the manufacturing of the evaluation sample (PVC) except for changing the base material to a polyethylene terephthalate (PET) sheet.

The evaluation sample (G-modified PET) was manufactured in the same manner as the manufacturing of the evaluation sample (PVC) except for changing the base material to a glycol-modified polyethylene terephthalate (G-modified PET) sheet.

The evaluation sample (PP) was manufactured in the same manner as the manufacturing of the evaluation sample (PVC) except for changing the base material to a polypropylene (PP) sheet.

The evaluation sample (Acryl) was manufactured in the same manner as the manufacturing of the evaluation sample (PVC) except for changing the base material to an acrylic resin sheet.

Here, the following sheets were used for each of the PVC sheet, the PS sheet, the PC sheet, the PET sheet, the PP sheet, the G-modified PET sheet, and the acrylic resin sheet.

PVC sheet: "AVERY (Registered trademark) 400 GLOSS WHITE PERMANENT" manufactured by Avery Dennison Corporation PS sheet: "falcon hi impact polystyrene" manufactured by Robert Horne Group Ltd.

PC sheet: "PC1600-2" manufactured by Takiron Co., Ltd.

PP sheet: "Correx" manufactured by Robert Horne Group Ltd.

PET sheet: PET sheet manufactured by Robert Horne Group Ltd.

G-modified PET sheet: "VIVAK (Registered trademark)" manufactured by Bayer AG

Acrylic resin sheet: "ACRYACE (Registered trademark) UV" manufactured by JSP Corporation In the evaluation of the adhesiveness, a UV mini conveyor device for a test CSOT (manufactured by GS Yuasa International Ltd.) to which an ozone-less metal halide lamp MAN250L was mounted as an exposure device and in which a conveyor speed was set as 35 m/min and exposure intensity was set as 2.0 W/cm$^2$ was used.

With respect to the coated film of each evaluation sample, the coated film was cured by irradiating the coated film with the UV light (ultraviolet rays) using the exposure device, so as to obtain a cured film.

A cross hatch test was performed on the cured film in conformity with ISO2409 (cross cut method) and the cured film was evaluated according to the following evaluation standard.

In this cross hatch test, cut intervals were set to 1 mm, and 25 square lattices having angles of 1 mm were formed.

According to the following evaluation standard, 0 and 1 are levels that are acceptable in practice.

According to the evaluation standard, a proportion (%) in which a lattice was peeled off was a value obtained by the following equation. The total number of the lattices according to the following equation was 25.

Ratio of Peeled Lattice (%)=[(the Number of Lattices in which Peeling was Generated)/(the Total Number of Lattices)]×100

—Evaluation Standard of Adhesiveness of Cured Film—

0: A proportion (%) in which a lattice was peeled off was 0%.

1: A proportion (%) in which a lattice was peeled off was greater than 0% and 5% or less.

2: A proportion (%) in which a lattice was peeled off was greater than 5% and 15% or less.

3: A proportion (%) in which a lattice was peeled off was greater than 15% and 35% or less.

4: A proportion (%) in which a lattice was peeled off was greater than 35% and 65% or less.

5: A proportion (%) in which a lattice was peeled off was greater than 65%.

(Pencil Hardness of Cured Film)

Pencil hardness of the cured film was evaluated by using the above evaluation sample (PVC).

In the same manner as the evaluation of the adhesiveness of the cured film, the coated film of the evaluation sample (PVC) was irradiated with UV light and was cured, so as to obtain a cured film.

A pencil hardness test was performed on a cured film in conformity with JIS K5600-5-4 (1999) by using UNI (Registered trademark) manufactured by Mitsubishi Pencil Co., Ltd. as a pencil.

According to the test results, an allowable range of the pencil hardness is HB or harder and preferably H or harder. A printed matter having the pencil hardness of 2B or less is not preferable, since there is a possibility that scratches may be generated in a case of handling the printed matter.

(Jettability of Ink Composition)

The ink composition obtained above was ejected from the head of an ink jet printer (SP-300V, manufactured by Roland DG Corporation) for 30 minutes and then the ejection was stopped.

After five minutes had elapsed from the stop of the ejection, the ink composition was ejected to the polyvinyl chloride (PVC) sheet described above from the head, so as to form a solid image of 5 cm×5 cm.

These images were visually observed so as to check existence of dot losses due to the generation of the non-ejection nozzles, and jettability of the ink composition was evaluated according to the following evaluation standard.

In the following evaluation standards, jettability of an ink composition was most excellent in A.

—Evaluation Standard of Jettability of Ink Composition—

A: Dot losses were not acknowledged due to the generation of the non-ejection nozzles and the like, and a satisfactory image was able to be obtained.

B: Some dot losses due to the generation of the non-ejection nozzles and the like were acknowledged, but no troubles were generated in practice.

C: Dot losses due to the generation of the non-ejection nozzles and the like were generated, but an image was unsatisfactory in practice.

D: Ejection from heads was not able to be performed.

(Redispersibility of Ink Composition)

The following operation was performed under a yellow lamp so as to evaluate redispersibility of the ink compositions.

An aluminum plate was coated with the ink composition in a thickness of 12 μm by using bar No. 2 of K hand coater manufactured by RK PRINT COAT INSTRUMENTS Ltd, so as to form a coated film. The obtained coated film was dried by heating at 60° C. for 3 minutes. The surface of the coated film after being dried was rubbed with a sponge impregnated with water.

Fourier transform infrared spectroscopy (FT-IR) was performed on each of the coated films before being rubbed with a sponge and the coated film after being rubbed. Residual ratios of gel particles were calculated based on the following equation from obtained results.

Residual ratio of gel particles=(Intensity of peak derived from gel particles in coated film after being rubbed with sponge/Intensity of peak derived from gel particles in coated film before being rubbed with sponge)×100

—Evaluation Standard of Redispersibility of Ink Composition—

A: A residual ratio of the gel particles was 1% or less, and redispersibility was excellent.

B: A residual ratio of the gel particles was greater than 1% and 5% or less, and redispersibility was in a range acceptable in practice.

C: A residual ratio of the gel particles was greater than 5% and 10% or less, and redispersibility was out of a range acceptable in practice.

D: A residual ratio of the gel particles was greater than 10%, and redispersibility was extremely bad.

(Preservation Stability of Ink Composition)

The ink compositions were sealed in a container, two weeks had elapsed at 60° C., the same evaluation as the above jettability evaluation was performed, and preservation stability of the ink composition was evaluated according to the same evaluation standard.

In the evaluation standards, preservation stability of an ink composition was most excellent in A.

Examples 2 to 72, Comparative Examples 1 and 2

The same operation was performed in the same manner as in Example 1 except for changing the followings. The results are provided in Tables 4 and 7.

Hereinafter, changes from Example 1 are provided.

In all examples, combinations of kinds of the isocyanate group-containing polymer, kinds of the compound having a hydrophilic group, kinds of the polymerizable monomer, and kinds of the photopolymerization initiator ("initiator" in Tables 4 and 5) were set as combinations provided in Tables 4 and 5.

In Examples 46 to 48 (In Table 4, examples in which a polymerizable monomer section was "-"), a polymerizable monomer (SR-399E) and ethyl acetate were not caused to be contained in the oil phase component, and an amount (22.3 g) of a solution of the isocyanate group-containing polymer in the oil phase component was changed to 45.6 g. Examples 46 to 48 were examples in which polymerizable monomers were not included, but the three-dimensional crosslinked structure had a polymerizable group.

In Examples 58 to 67, sensitizers (0.3 g) presented in Table 5 were further contained in the oil phase components.

In Examples 68 to 72, a sensitizer (0.3 g) presented in Table 5 was contained in the oil phase component, D-116N (3.5 g) in the oil phase components was changed to Component (A) (3.4 g), an amount (16 g) of ethyl acetate was changed to 15 g, and an amount (22.3 g) of the isocyanate group-containing polymer was changed to 24.1 g in the oil phase component, 0.054 g of sodium hydroxide was further contained in the water phase component, an amount (46 g) of distilled water was changed to 45.76 g, and an amount (0.493 g) of SCS was changed to 0.400 g in the water phase component. In Examples 68 to 70, SCS was changed to SDS.

Component (A) (simply presented as "(A)" in Table 5) used in Examples 68 to 72 was a 35 mass % ethyl acetate solution of a reaction product (Isocyanate Compound A (an isocyanate compound having a carboxyl group as a hydrophilic group)) obtained by reacting 2,2-bis(hydroxymethyl) propionic acid (DMPA) and isophorone diisocyanate (IPDI) in the proportion of DMPA/IPDI=1/3 (molar ratio).

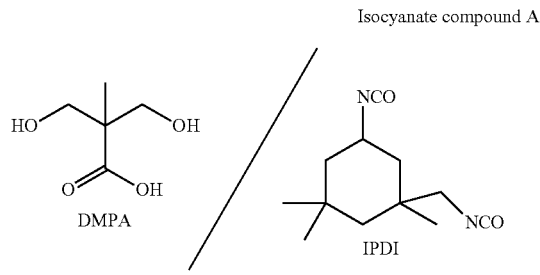

Isocyanate compound A

Component (A) was synthesized as follows.

45 g of 2,2-bis(hydroxymethyl) propionic acid (DMPA), 223.72 g of isophorone diisocyanate (IPDI), and 499.05 g of ethyl acetate (AcOEt) were added to a three-neck flask, heating was performed to 50° C., and 0.7677 g of U-600 was added tereto, and reaction was performed for three hours, so as to obtain a 35 mass % ethyl acetate solution of Isocyanate compound A (an isocyanate compound having a carboxyl group as a hydrophilic group), as a Component (A).

Comparative Examples 3 and 4

With reference to paragraphs 0187 and 0188 disclosed in JP2013-199602A, emulsions for comparison (emulsions for comparison) with the water dispersions of the above respective examples were manufactured.

27.5 parts of a comparative polymer (Comparative Polymer 3 or 4), 9.2 parts of tripentaerythritol polyacrylate (VISCOAT (Registered trademark) #802 manufactured by Osaka Organic Chemical Industry Ltd.), and 3.3 parts of a photoradical polymerization initiator (TPO) were introduced to a reaction vessel including a stirrer, a cooling pipe, a dropping funnel, and an air introduction pipe, the temperature in the reaction vessel was increased to 80° C. under stirring, and the temperature was maintained for two hours.

Subsequently, after the temperature in the reaction vessel was cooled down to 50° C., 60 parts of deionized water was added under stirring, and the temperature was maintained for one hour at 40° C., so as to obtain a dispersion liquid of 40 mass % of a nonvolatile content (comparative polymer, tripentaerythritol polyacrylate, and a photoradical polymerization initiator (TPO)). Distilled water was added to obtained dispersion liquid, so as to obtain an emulsion for comparison having a solid content of 20 mass %.

The same operation as in Example 1 was performed except for changing a water dispersion in Example 1, to the same mass of an emulsion for comparison.

The results are provided in Tables 4 to 7.

TABLE 4

| | | | | | | | | | | | | | | |
|---|---|---|---|---|---|---|---|---|---|---|---|---|---|---|
| | | | | | Particles | | | | | | | | | |
| | | | | | Raw material of three-dimensional crosslinked structure | | | | | | | | | |
| | | | | One-terminal | | Polymer diol | | | | Compound having | Poly- | | Sen- | Particle |
| | Gel-ling | Struc-ture | For-mula No. | sealing agent | Group (2R) | Abbre-viation | $P^1$ or $P^2$ | Mn | (ZC) | hydrophilic group | merizable monomer | Ini-tiator | si-tizer | diameter (μm) |
| Example 1 | Y | (1) | P-1 | (1P) | — | N | D7110 | PES | 2000 | 120N | SCS | 116N 399E | 819 | — | 0.15 |
| Example 2 | Y | | P-2 | | — | N | P-510 | | 500 | 120N | SCS | 116N 399E | 819 | — | 0.15 |
| Example 3 | Y | | P-3 | | — | N | UE3220 | | 25000 | 110N | SCS | 116N 399E | 819 | — | 0.15 |
| Example 4 | Y | | P-4 | | — | N | UE3500 | | 30000 | 120N | SCS | 116N 399E | 819 | — | 0.15 |
| Example 5 | Y | | P-5 | | — | N | UE3200 | | 16000 | 101A | SCS | 116N 399E | 819 | — | 0.15 |
| Example 6 | Y | | P-6 | | — | N | V200 | | 17000 | TPA | SCS | 116N 399E | 819 | — | 0.15 |
| Example 7 | Y | | P-7 | | — | N | V240 | | 15000 | 127N | SCS | 116N 399E | 819 | — | 0.15 |
| Example 8 | Y | | P-8 | | — | N | T6002 | PC | 2000 | 120N | SCS | 116N 399E | 819 | — | 0.15 |
| Example 9 | Y | | P-9 | | — | N | T6001 | | 1000 | 120N | SCS | 116N 399E | 819 | — | 0.15 |
| Example 10 | Y | | P-10 | | — | N | PCD210 | | 1000 | 120N | SCS | 116N 399E | 819 | — | 0.15 |
| Example 11 | Y | | P-11 | | — | N | P212 | PCL | 1250 | 120N | SCS | 116N 399E | 819 | — | 0.15 |
| Example 12 | Y | | P-12 | | — | N | P230 | | 3000 | 120N | SCS | 116N 399E | 819 | — | 0.15 |
| Example 13 | Y | | P-13 | | — | N | G-1000 | PBD | 1400 | 120N | SCS | 116N 399E | 819 | — | 0.15 |
| Example 14 | Y | | P-14 | | — | N | R-45HT | | 2800 | 120N | SCS | 116N 399E | 819 | — | 0.15 |
| Example 15 | Y | | P-15 | | — | N | POLY IP | PIP | 2500 | 120N | SCS | 116N 399E | 819 | — | 0.15 |
| Example 16 | Y | | P-16 | | — | N | PO-1 | PO | 2500 | 120N | SCS | 116N 399E | 819 | — | 0.15 |
| Example 17 | Y | (2) | P-17 | (2P) | ODI | N | D7110 | PES | 2000 | 120N | SCS | 116N 399E | 819 | — | 0.15 |
| Example 18 | Y | | P-18 | | ODI | N | P-510 | | 500 | 120N | SCS | 116N 399E | 819 | — | 0.15 |
| Example 19 | Y | | P-19 | | ODI | N | UE3220 | | 25000 | 120N | SCS | 116N 399E | 819 | — | 0.15 |
| Example 20 | Y | | P-20 | | ODI | N | UE3500 | | 30000 | 120N | SCS | 116N 399E | 819 | — | 0.15 |
| Example 21 | Y | | P-21 | | ODI | N | UE3200 | | 16000 | 120N | SCS | 116N 399E | 819 | — | 0.15 |
| Example 22 | Y | | P-22 | | ODI | N | V200 | | 17000 | 120N | SCS | 116N 399E | 819 | — | 0.15 |
| Example 23 | Y | | P-23 | | ODI | N | V240 | | 15000 | 120N | SCS | 116N 399E | 819 | — | 0.15 |
| Example 24 | Y | | P-24 | | ODI | N | T6002 | PC | 2000 | 120N | SCS | 116N 399E | 819 | — | 0.15 |
| Example 25 | Y | | P-25 | | ODI | N | T6001 | | 1000 | 120N | SCS | 116N 399E | 819 | — | 0.15 |
| Example 26 | Y | | P-26 | | ODI | N | PCD210 | | 1000 | 120N | SCS | 116N 399E | 819 | — | 0.15 |
| Example 27 | Y | | P-27 | | ODI | N | P212 | PCL | 1250 | 120N | SCS | 116N 399E | 819 | — | 0.15 |
| Example 28 | Y | | P-28 | | ODI | N | P230 | | 3000 | 120N | SCS | 116N 399E | 819 | — | 0.15 |
| Example 29 | Y | | P-29 | | ODI | N | G-1000 | PBD | 1400 | 120N | SCS | 116N 399E | 819 | — | 0.15 |

TABLE 4-continued

| | | | | Particles | | | | | | | | |
|---|---|---|---|---|---|---|---|---|---|---|---|---|
| | | | | Raw material of three-dimensional crosslinked structure | | | | | | | | |
| | | | | One-terminal sealing agent | Group (2R) | Polymer diol | | | | Compound having hydrophilic group | Polymerizable monomer | Initiator | Sensitizer | Particle diameter (μm) |
| | Gelling | Structure | No. | Formula | | | Abbreviation | P¹ or P² | Mn | (ZC) | | | | | |
| Example 30 | Y | | P-30 | | ODI | N | R-45HT | | 2800 | 120N | SCS | 116N | 399E | 819 | — | 0.15 |
| Example 31 | Y | | P-31 | | ODI | N | POLY IP | PIP | 2500 | 120N | SCS | 116N | 399E | 819 | — | 0.15 |
| Example 32 | Y | | P-32 | | ODI | N | PO-1 | PO | 2500 | 120N | SCS | 116N | 399E | 819 | — | 0.15 |
| Example 33 | Y | | P-33 | | ODI | N | PU-2 | PU | 4500 | 120N | SCS | 116N | 399E | 819 | — | 0.15 |
| Example 34 | Y | | P-34 | | ODI | N | PU-9 | | 2000 | 120N | SCS | 116N | 399E | 819 | — | 0.15 |
| Example 35 | Y | | P-35 | | AA | N | D7110 | PES | 2000 | 120N | SCS | 116N | 399E | 819 | — | 0.15 |
| Example 36 | Y | | P-36 | | AA | N | T6002 | PC | 2000 | 120N | SCS | 116N | 399E | 819 | — | 0.15 |
| Example 37 | Y | (2) | P-37 | (2P) | AOI | Y | D7110 | PES | 2000 | 120N | SCS | 116N | 399E | 819 | — | 0.15 |
| Example 38 | Y | | P-38 | | AOI | Y | UE3200 | | 16000 | 120N | SCS | 116N | TMM3L | 819 | — | 0.15 |
| Example 39 | Y | | P-39 | | AOI | Y | V200 | | 17000 | 120N | SCS | 116N | DPH | 819 | — | 0.15 |
| Example 40 | Y | | P-40 | | AOI | Y | T6002 | PC | 2000 | 120N | SCS | 116N | TMM3L | 819 | — | 0.15 |
| Example 41 | Y | | P-41 | | AOI | Y | P212 | PCL | 1250 | 120N | SCS | 116N | 399E | 819 | — | 0.15 |
| Example 42 | Y | | P-42 | | AOI | Y | R-45HT | PBD | 2800 | 120N | SCS | 116N | 399E | 819 | — | 0.15 |
| Example 43 | Y | | P-43 | | AOI | Y | POLY IP | PIP | 2500 | 120N | SCS | 116N | 399E | 819 | — | 0.15 |
| Example 44 | Y | | P-44 | | AOI | Y | PO1 | PO | 2500 | 120N | SCS | 116N | 399E | 819 | — | 0.15 |
| Example 45 | Y | | P-45 | | AOI | Y | PU-9 | PU | 2000 | 120N | SCS | 116N | 399E | 819 | — | 0.15 |
| Example 46 | Y | (2) | P-38 | (2P) | AOI | Y | UE3200 | PES | 16000 | 120N | SCS | 116N | — | 819 | — | 0.15 |
| Example 47 | Y | | P-40 | | AOI | Y | T6002 | PC | 2000 | 120N | SCS | 116N | — | 819 | — | 0.15 |
| Example 48 | Y | | P-45 | | AOI | Y | PU-9 | PU | 2000 | 120N | SCS | 116N | — | 819 | — | 0.15 |
| Example 49 | Y | (1) | P-8 | (1P) | — | N | T6002 | PC | 2000 | 120N | SCS | 116N | DA1 | 819 | — | 0.15 |
| Example 50 | Y | | P-11 | | — | N | P212 | PCL | 1250 | 120N | SCS | 116N | TMM3L | 819 | — | 0.15 |
| Example 51 | Y | | P-14 | | — | N | R-45HT | PBD | 2800 | 120N | SCS | 116N | DPH | 819 | — | 0.15 |
| Example 52 | Y | (2) | P-39 | (2P) | AOI | Y | V200 | PES | 17000 | 120N | SCS | 116N | DA1 | 819 | — | 0.15 |
| Example 53 | Y | | P-41 | | AOI | Y | P212 | PCL | 1250 | 120N | SCS | 116N | TMM3L | 819 | — | 0.15 |
| Example 54 | Y | | P-43 | | AOI | Y | POLY IP | PIP | 2500 | 120N | SCS | 116N | DPH | 819 | — | 0.15 |

TABLE 5

| | Particles | | | | | | | | | | | | |
|---|---|---|---|---|---|---|---|---|---|---|---|---|---|
| | Raw material of three-dimensional crosslinked structure (isocyanate-containing polymer) | | | | | | | | | | | | Particle |
| | | | | One-terminal | | Polymer diol | | | | Compound having | Poly- | | |
| | Gel-ling | Struc-ture | No. | For-mula | sealing agent | Group (2R) | Abbre-viation | P¹ or P² | Mn | (ZC) | hydrophilic group | merizable monomer | Ini-tiator | Sensi-tizer | dia-meter (μm) |
| Example 55 | Y | (1) | P-1 | (1P) | — | N | D7110 | PES | 2000 | 120N | SCS | 116N | 399E | TPO | — | 0.15 |
| Example 56 | Y | | P-8 | | — | N | T6002 | PC | 2000 | 120N | SCS | 116N | 399E | 907 | — | 0.15 |
| Example 57 | Y | | P-11 | | — | N | P212 | PCL | 1250 | 120N | SCS | 116N | 399E | 907 | — | 0.15 |
| Example 58 | Y | | P-6 | | — | N | V200 | PES | 2000 | 120N | SCS | 116N | 399E | 819 | 1331 | 0.15 |
| Example 59 | Y | | P-6 | | — | N | V200 | | 2000 | 120N | SCS | 116N | 399E | 819 | ITX | 0.15 |
| Example 60 | Y | | P-6 | | — | N | V200 | | 2000 | 120N | SCS | 116N | 399E | 819 | DETX | 0.15 |
| Example 61 | Y | | P-8 | | — | N | T6002 | PC | 2000 | 120N | SCS | 116N | 399E | 819 | ITX | 0.15 |
| Example 62 | Y | | P-11 | | — | N | P212 | PCL | 1250 | 120N | SCS | 116N | 399E | 819 | ITX | 0.15 |
| Example 63 | Y | | P-14 | | — | N | R-45HT | PBD | 2800 | 120N | SCS | 116N | 399E | 819 | ITX | 0.15 |
| Example 64 | Y | (2) | P-39 | (2P) | AOI | Y | V200 | PES | 17000 | 120N | SCS | 116N | 399E | 819 | ITX | 0.15 |
| Example 65 | Y | | P-41 | | AOI | Y | P212 | PCL | 1250 | 120N | SCS | 116N | 399E | 819 | ITX | 0.15 |
| Example 66 | Y | | P-43 | | AOI | Y | POLY IP | PIP | 2500 | 120N | SCS | 116N | 399E | 819 | ITX | 0.15 |
| Example 67 | Y | | P-33 | | ODI | N | PU-2 | PU | 4500 | 120N | SCS | 116N | 399E | 819 | ITX | 0.15 |
| Example 68 | Y | (1) | P-6 | (1P) | — | N | V200 | PES | 2000 | 120N | SDS | (A) | 399E | 819 | 1331 | 0.18 |
| Example 69 | Y | | P-6 | | — | N | V200 | | 2000 | 120N | SDS | (A) | 399E | 819 | ITX | 0.18 |
| Example 70 | Y | | P-6 | | — | N | V200 | | 2000 | 120N | SDS | (A) | 399E | 819 | DETX | 0.18 |
| Example 71 | Y | | P-8 | | — | N | T6002 | PC | 2000 | 120N | SCS | (A) | 399E | 819 | ITX | 0.18 |
| Example 72 | Y | | P-11 | | — | N | P212 | PCL | 1250 | 120N | SCS | (A) | 399E | 819 | ITX | 0.18 |
| Comparative Example 1 | N | — | | | | | Comparative Polymer C-1 | | | | SCS | — | 399E | 819 | — | 0.30 |
| Comparative Example 2 | N | — | | | | | Comparative Polymer C-2 | | | | SCS | — | 399E | 819 | — | 0.30 |
| Comparative Example 3 | N | — | | | | | Comparative Polymer C-3 | | | | — | — | #802 | TPO | | 0.30 |
| Comparative Example 4 | N | — | | | | | Comparative Polymer C-4 | | | | — | — | #802 | TPO | | 0.30 |

TABLE 6

| | Evaluation results (Ink composition) | | | | | | | | | | |
|---|---|---|---|---|---|---|---|---|---|---|---|
| | Pencil hardness | Jettability | Redispersibility | Preservation stability | Adhesiveness | | | | | | |
| | | | | | PVC | PS | PC | PET | G-modified PET | PP | Acryl |
| Example 1 | H | A | A | A | 0 | 1 | 0 | 0 | 0 | 1 | 1 |
| Example 2 | F | A | A | A | 0 | 1 | 1 | 1 | 0 | 1 | 1 |
| Example 3 | H | A | A | A | 0 | 1 | 0 | 0 | 0 | 1 | 0 |
| Example 4 | H | A | A | A | 0 | 1 | 0 | 0 | 0 | 1 | 0 |
| Example 5 | H | A | A | A | 0 | 1 | 0 | 0 | 0 | 1 | 0 |
| Example 6 | H | A | A | A | 0 | 1 | 0 | 0 | 0 | 1 | 0 |
| Example 7 | H | A | A | A | 0 | 1 | 0 | 0 | 0 | 1 | 0 |
| Example 8 | H | A | A | A | 0 | 0 | 0 | 0 | 1 | 1 | 0 |
| Example 9 | H | A | A | A | 0 | 1 | 0 | 0 | 1 | 1 | 0 |
| Example 10 | H | A | A | A | 0 | 1 | 0 | 0 | 1 | 1 | 0 |
| Example 11 | F | A | A | A | 0 | 0 | 0 | 0 | 1 | 1 | 1 |
| Example 12 | F | A | A | A | 0 | 0 | 0 | 0 | 1 | 1 | 0 |
| Example 13 | B | A | A | A | 0 | 0 | 0 | 1 | 1 | 0 | 1 |
| Example 14 | B | A | A | A | 0 | 0 | 0 | 1 | 1 | 0 | 1 |
| Example 15 | B | A | A | A | 0 | 0 | 0 | 1 | 1 | 0 | 1 |
| Example 16 | B | A | A | A | 0 | 0 | 0 | 1 | 1 | 0 | 1 |
| Example 17 | F | A | A | A | 0 | 1 | 0 | 0 | 0 | 1 | 1 |
| Example 18 | F | A | A | A | 0 | 1 | 1 | 1 | 0 | 1 | 1 |
| Example 19 | H | A | A | A | 0 | 1 | 0 | 0 | 0 | 1 | 0 |
| Example 20 | H | A | A | A | 0 | 1 | 0 | 0 | 0 | 1 | 0 |
| Example 21 | H | A | A | A | 0 | 1 | 0 | 0 | 0 | 1 | 0 |
| Example 22 | H | A | A | A | 0 | 1 | 0 | 0 | 0 | 1 | 0 |
| Example 23 | H | A | A | A | 0 | 1 | 0 | 0 | 0 | 1 | 0 |
| Example 24 | H | A | A | A | 0 | 0 | 0 | 0 | 1 | 1 | 0 |
| Example 25 | H | A | A | A | 0 | 1 | 0 | 0 | 1 | 1 | 0 |
| Example 26 | H | A | A | A | 0 | 1 | 0 | 0 | 1 | 1 | 0 |

TABLE 6-continued

Evaluation results (Ink composition)

| | Pencil hardness | Jettability | Redispersibility | Preservation stability | PVC | PS | PC | PET | G-modified PET | PP | Acryl |
|---|---|---|---|---|---|---|---|---|---|---|---|
| Example 27 | F | A | A | A | 0 | 0 | 0 | 0 | 1 | 1 | 1 |
| Example 28 | F | A | A | A | 0 | 0 | 0 | 0 | 1 | 1 | 0 |
| Example 29 | F | A | A | A | 0 | 0 | 0 | 1 | 1 | 0 | 1 |
| Example 30 | F | A | A | A | 0 | 0 | 0 | 0 | 1 | 0 | 1 |
| Example 31 | F | A | A | A | 0 | 0 | 0 | 1 | 1 | 0 | 1 |
| Example 32 | F | A | A | A | 0 | 0 | 0 | 1 | 1 | 0 | 1 |
| Example 33 | H | A | A | A | 0 | 1 | 0 | 0 | 0 | 1 | 1 |
| Example 34 | H | A | A | A | 0 | 1 | 0 | 0 | 0 | 1 | 1 |
| Example 35 | F | A | A | A | 0 | 1 | 0 | 0 | 0 | 1 | 1 |
| Example 36 | H | A | A | A | 0 | 1 | 0 | 0 | 0 | 1 | 1 |
| Example 37 | H | A | A | A | 0 | 1 | 0 | 0 | 0 | 1 | 1 |
| Example 38 | 2H | A | A | A | 0 | 1 | 0 | 0 | 0 | 1 | 0 |
| Example 39 | 2H | A | A | A | 0 | 1 | 0 | 0 | 0 | 1 | 0 |
| Example 40 | H | A | A | A | 0 | 0 | 0 | 0 | 1 | 1 | 0 |
| Example 41 | H | A | A | A | 0 | 0 | 0 | 0 | 1 | 1 | 1 |
| Example 42 | H | A | A | A | 0 | 0 | 0 | 0 | 1 | 0 | 1 |
| Example 43 | H | A | A | A | 0 | 0 | 0 | 1 | 1 | 0 | 1 |
| Example 44 | H | A | A | A | 0 | 0 | 0 | 1 | 1 | 0 | 1 |
| Example 45 | 2H | A | A | A | 0 | 1 | 0 | 0 | 0 | 1 | 1 |
| Example 46 | 2H | A | A | A | 0 | 1 | 0 | 0 | 0 | 1 | 0 |
| Example 47 | 2H | A | A | A | 0 | 1 | 0 | 0 | 0 | 1 | 1 |
| Example 48 | 2H | A | A | A | 0 | 1 | 0 | 0 | 0 | 1 | 1 |
| Example 49 | F | A | A | A | 0 | 1 | 0 | 0 | 0 | 1 | 1 |
| Example 50 | F | A | A | A | 0 | 0 | 0 | 0 | 1 | 1 | 1 |
| Example 51 | F | A | A | A | 0 | 0 | 0 | 0 | 1 | 0 | 1 |
| Example 52 | H | A | A | A | 0 | 1 | 0 | 0 | 0 | 1 | 0 |
| Example 53 | 2H | A | A | A | 0 | 0 | 0 | 0 | 1 | 1 | 1 |
| Example 54 | H | A | A | A | 0 | 0 | 0 | 1 | 1 | 0 | 1 |

TABLE 7

Evaluation results (Ink composition)

| | Pencil hardness | Jettability | Redispersibility | Preservation stability | PVC | PS | PC | PET | G-modified PET | PP | Acryl |
|---|---|---|---|---|---|---|---|---|---|---|---|
| Example 55 | F | A | A | A | 0 | 1 | 0 | 0 | 0 | 1 | 1 |
| Example 56 | F | A | A | A | 0 | 1 | 0 | 0 | 0 | 1 | 0 |
| Example 57 | HB | A | A | A | 0 | 0 | 0 | 0 | 1 | 1 | 1 |
| Example 58 | H | A | A | A | 0 | 1 | 0 | 0 | 0 | 1 | 0 |
| Example 59 | 2H | A | A | A | 0 | 1 | 0 | 0 | 0 | 1 | 0 |
| Example 60 | 2H | A | A | A | 0 | 1 | 0 | 0 | 0 | 1 | 0 |
| Example 61 | 2H | A | A | A | 0 | 1 | 0 | 0 | 0 | 1 | 1 |
| Example 62 | H | A | A | A | 0 | 0 | 0 | 0 | 1 | 1 | 1 |
| Example 63 | H | A | A | A | 0 | 0 | 0 | 0 | 1 | 0 | 1 |
| Example 64 | 3H | A | A | A | 0 | 1 | 0 | 0 | 0 | 1 | 0 |
| Example 65 | 2H | A | A | A | 0 | 0 | 0 | 0 | 1 | 1 | 1 |
| Example 66 | 2H | A | A | A | 0 | 0 | 0 | 1 | 1 | 0 | 1 |
| Example 67 | H | A | A | A | 0 | 1 | 0 | 0 | 0 | 1 | 1 |
| Example 68 | 2H | A | A | A | 0 | 1 | 0 | 0 | 0 | 1 | 0 |
| Example 69 | 2H | A | A | A | 0 | 1 | 0 | 0 | 0 | 1 | 0 |
| Example 70 | 2H | A | A | A | 0 | 1 | 0 | 0 | 0 | 1 | 0 |
| Example 71 | 2H | A | A | A | 0 | 1 | 0 | 0 | 0 | 1 | 1 |
| Example 72 | H | A | A | A | 0 | 0 | 0 | 0 | 1 | 1 | 1 |
| Comparative Example 1 | <3B | D | D | D | 3 | 4 | 5 | 4 | 5 | 5 | 5 |
| Comparative Example 2 | <3B | D | D | D | 4 | 5 | 5 | 5 | 5 | 5 | 5 |
| Comparative Example 3 | <3B | D | D | D | 5 | 5 | 5 | 5 | 5 | 5 | 5 |
| Comparative Example 4 | <3B | D | D | D | 5 | 5 | 5 | 5 | 5 | 5 | 5 |

—Descriptions of Tables 4 and 5—

In "Structure" Section, "(1)" indicates Polymer Structure (1), and "(2)" indicates Polymer Structure (2).

In "P$^1$ or P$^2$" Section, kinds of a polymer chain are provided in abbreviations. Meanings of the abbreviations are as provided in Table 1.

In "Group (2R)" Section, a case where R$^1$ of a polymer structure represented by Formula (2) was a group represented by Formula (2R) was set as "Y" and a case where R$^1$ was not a group represented by Formula (2R) was set as "N".

The polymerizable monomers were as follows.

399E . . . SR-399E (dipentaerythritol pentaacrylate; pentafunctional polymerizable monomer) manufactured by Sartomer DA1 . . . Diacrylate of neopentyl glycol propylene oxide adduct (NPGPODA; difunctional polymerizable monomer)

TMM3L ... A-TMM-3L (Pentaerythritol triacrylate; trifunctional polymerizable monomer) manufactured by Shin-Nakamura Chemical Co., Ltd.

DPH ... A-DPH (dipentaerythritol hexaacrylate; hexafunctional polymerizable monomer) manufactured by Shin-Nakamura Chemical Co., Ltd.

802 ... VISCOAT #802 (Polypentaerythritol polyacrylate; octafunctional polymerizable monomer) manufactured by Osaka Organic Chemical Industry Ltd.

The expression "initiator" means a photopolymerization initiator. Photopolymerization initiators are as follows.

819 ... IRGACURE (Registered trademark) 819 (bis(2,4,6-trimethylbenzoyl)-phenylphosphine oxide; manufactured by BASF SE)

907 ... IRGACURE (Registered trademark) 907 (2-methyl-1-(4-methylthiophenyl)-2-morpholinopropan-1-one; manufactured by BASF SE)

TPO ... LUCIRIN (Registered trademark) TPO (2,4,6-trimethylbenzoyl-diphenyl-phosphine oxide; manufactured by BASF SE)

Sensitizers are as follows.

1331 ... Cationic photosensitizer ANTHRACURE (Registered trademark) UVS-1331 (9,10-Dibutoxyanthracene) manufactured by Kawasaki Kasei Chemicals Ltd.

ITX ... 2-Isopropylthioxanthone

DETX ... 2,4-Diethylthioxanthone

A compound having a hydrophilic group is as follows.

SCS ... Sodium hexadecyl sulfate (compound having sodium salt of sulfate group as hydrophilic group)

SDS ... Sodium dodecyl sulfate (compound having sodium salt of sulfate group as hydrophilic group)

116N ... TAKANATE (Registered trademark) D-116N [50 mass % ethyl acetate solution of adduct of trimethylolpropane (TMP), xylene diisocyanate (XDI), and polyethylene glycol monomethyl ether (E090) (compound having ethyleneoxy group as hydrophilic group; the structure is provided below)] manufactured by Mitsui Chemicals, Inc.

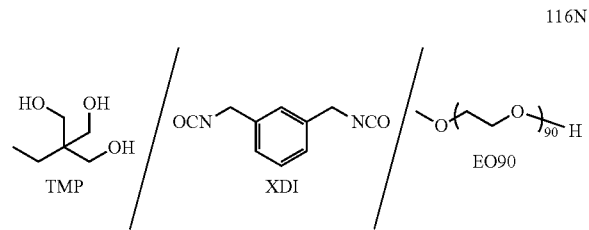

As presented in Tables 4 and 7, with the ink compositions (water dispersions of gel particles) of Example 1 to 72 in which gel particles having three-dimensional crosslinked structures including a polymer structure unit represented by Formula (1) and a polymer structure unit represented by Formula (2), having a hydrophilic group and a polymerizable group, and including a photopolymerization initiator were dispersed in water, it was possible to form images (that is, films) having excellent adhesiveness to various base materials and excellent pencil hardness. The ink compositions of Examples 1 to 72 were excellent in jettability, redispersibility, and preservation stability.

In contrast, in films formed by using ink compositions of Comparative Examples 1 to 4 not including gel particles (that is, particles were not gelled), adhesiveness to base materials and pencil hardness were decreased. In the ink compositions of Comparative Examples 1 to 4, jettability, redispersibility, and preservation stability were also deteriorated.

In Examples 1 to 72, inclusion ratios (mass %) of the photopolymerization initiators in water dispersions (that is, water dispersions used as raw materials of ink compositions. The same is applied in the followings.) before preparation of the ink compositions were measured by the above method. As a result, inclusion ratios (mass %) of the photopolymerization initiators were 99 mass % or greater.

In Examples 1 to 45 and 49 to 72, inclusion ratios (mass %) of the polymerizable monomers in the water dispersions before the preparation of the ink compositions were measured by the above method. As a result, inclusion ratios (mass %) of the polymerizable monomers were 99 mass % or greater.

In Examples 58 to 72, inclusion ratios (mass %) of the sensitizers in the water dispersions (the water dispersions used as raw materials of the ink composition) before preparation of the ink compositions were measured by the above method. As a result, inclusion ratios (%) of the sensitizers were 99 mass % or greater.

According to the results of the Fourier transform infrared spectroscopy (FT-IR) analysis, all of the gel particles in the water dispersions (specifically, the water dispersions before preparation of the ink compositions) in Example 1 to 72 were gel particles having a polymerizable group.

<Evaluation Using LED>

With respect to ink compositions in each of the examples resented in Table 8, evaluations using LED were performed.

Specifically, in the evaluation of pencil hardness and the adhesiveness (adhesiveness to PS, PC, PET, G-modified PET, PP, and Acryl) in the respective examples, the same operations were performed except for changing an exposure light source to a 385 nmUV-LED irradiator (manufactured by CCS Inc.) for a test and changing the exposure energies to 300 mJ/cm$^2$.

The results are provided in Table 8.

TABLE 8

| | Evaluation results (Ink composition, LED light: 385 nm) | | | | | | |
|---|---|---|---|---|---|---|---|
| | Pencil | Adhesiveness | | | | | |
| | hardness | PS | PC | PET | G-modified PET | PP | Acryl |
| Example 6 | H | 1 | 0 | 0 | 0 | 1 | 0 |
| Example 8 | H | 0 | 0 | 0 | 1 | 1 | 0 |
| Example 11 | F | 0 | 0 | 0 | 1 | 1 | 1 |
| Example 13 | B | 0 | 0 | 1 | 1 | 0 | 1 |
| Example 14 | B | 0 | 0 | 0 | 1 | 0 | 1 |
| Example 15 | B | 0 | 0 | 1 | 1 | 0 | 1 |
| Example 16 | B | 0 | 0 | 1 | 1 | 0 | 1 |
| Example 21 | H | 1 | 0 | 0 | 0 | 1 | 0 |
| Example 26 | H | 1 | 0 | 0 | 1 | 1 | 0 |
| Example 27 | F | 0 | 0 | 0 | 1 | 1 | 1 |
| Example 28 | F | 0 | 0 | 0 | 1 | 1 | 0 |
| Example 29 | F | 0 | 0 | 1 | 1 | 0 | 1 |
| Example 31 | F | 0 | 0 | 1 | 1 | 0 | 1 |
| Example 32 | F | 0 | 0 | 1 | 1 | 0 | 1 |
| Example 33 | H | 1 | 0 | 0 | 0 | 1 | 1 |
| Example 37 | H | 1 | 0 | 0 | 0 | 1 | 1 |
| Example 40 | H | 0 | 0 | 0 | 1 | 1 | 0 |
| Example 41 | H | 0 | 0 | 0 | 1 | 1 | 1 |
| Example 42 | H | 0 | 0 | 0 | 1 | 0 | 1 |
| Example 43 | H | 0 | 0 | 1 | 1 | 0 | 1 |
| Example 44 | H | 0 | 0 | 1 | 1 | 0 | 1 |
| Example 45 | 2H | 1 | 0 | 0 | 0 | 1 | 1 |
| Example 46 | 2H | 1 | 0 | 0 | 0 | 1 | 0 |
| Example 47 | 2H | 1 | 0 | 0 | 0 | 1 | 1 |
| Example 48 | 2H | 1 | 0 | 0 | 0 | 1 | 1 |

TABLE 8-continued

Evaluation results (Ink composition, LED light: 385 nm)

| | Pencil hardness | Adhesiveness | | | | | |
|---|---|---|---|---|---|---|---|
| | | PS | PC | PET | G-modified PET | PP | Acryl |
| Example 55 | F | 1 | 0 | 0 | 0 | 1 | 1 |
| Example 58 | H | 1 | 0 | 0 | 0 | 1 | 0 |
| Example 59 | 2H | 1 | 0 | 0 | 0 | 1 | 0 |
| Example 60 | 2H | 1 | 0 | 0 | 0 | 1 | 0 |
| Example 61 | 2H | 1 | 0 | 0 | 0 | 1 | 1 |
| Example 62 | H | 0 | 0 | 0 | 1 | 1 | 1 |
| Example 63 | H | 0 | 0 | 0 | 1 | 0 | 1 |
| Example 64 | 3H | 1 | 0 | 0 | 0 | 1 | 0 |
| Example 65 | 2H | 0 | 0 | 0 | 1 | 1 | 1 |
| Example 66 | 2H | 0 | 0 | 1 | 1 | 0 | 1 |
| Example 67 | H | 1 | 0 | 0 | 0 | 1 | 1 |
| Example 68 | 2H | 1 | 0 | 0 | 0 | 1 | 0 |
| Example 69 | 2H | 1 | 0 | 0 | 0 | 1 | 0 |
| Example 70 | 2H | 1 | 0 | 0 | 0 | 1 | 0 |
| Example 71 | 2H | 1 | 0 | 0 | 0 | 1 | 1 |
| Example 72 | H | 0 | 0 | 0 | 1 | 1 | 1 |

As presented in Table 8, in the ink compositions of these examples, even in the evaluation of the pencil hardness and the adhesiveness using LED light, excellent results were able to be obtained.

<Evaluation of Coating Solution>

Coating solutions having the following components were manufactured by using the water dispersions manufactured in Examples 1 to 72 and Comparative Examples 1 to 4, evaluations of pencil hardness and adhesiveness (PVC and Acryl) were performed by the above methods by using the manufactured coating solutions. The results are provided in Tables 9 and 10.

—Components of Coating Solution—

Above water dispersion . . . 82 parts
Fluorine-based surfactant (Zonyl FS300 manufactured by DuPont) . . . 0.7 parts
2-Methylpropanediol . . . 4.3 parts
Water . . . The rest portion that makes 100 parts as a whole

TABLE 9

| | Evaluation results (Coating solution) | | |
|---|---|---|---|
| | | Adhesiveness | |
| | Pencil hardness | PVC | Acryl |
| Example 1 | F | 0 | 1 |
| Example 2 | H | 0 | 1 |
| Example 3 | F | 0 | 0 |
| Example 4 | H | 0 | 0 |
| Example 5 | H | 0 | 0 |
| Example 6 | H | 0 | 0 |
| Example 7 | H | 0 | 0 |
| Example 8 | H | 0 | 0 |
| Example 9 | H | 0 | 0 |
| Example 10 | H | 0 | 0 |
| Example 11 | F | 0 | 1 |
| Example 12 | F | 0 | 0 |
| Example 13 | B | 0 | 1 |
| Example 14 | B | 0 | 1 |
| Example 15 | B | 0 | 1 |
| Example 16 | B | 0 | 1 |
| Example 17 | F | 0 | 1 |
| Example 18 | F | 0 | 1 |
| Example 19 | H | 0 | 0 |
| Example 20 | H | 0 | 0 |
| Example 21 | H | 0 | 0 |
| Example 22 | H | 0 | 0 |
| Example 23 | H | 0 | 0 |

TABLE 9-continued

| | Evaluation results (Coating solution) | | |
|---|---|---|---|
| | | Adhesiveness | |
| | Pencil hardness | PVC | Acryl |
| Example 24 | H | 0 | 0 |
| Example 25 | H | 0 | 0 |
| Example 26 | H | 0 | 0 |
| Example 27 | F | 0 | 1 |
| Example 28 | F | 0 | 0 |
| Example 29 | F | 0 | 1 |
| Example 30 | F | 0 | 1 |
| Example 31 | F | 0 | 1 |
| Example 32 | F | 0 | 1 |
| Example 33 | H | 0 | 1 |
| Example 34 | H | 0 | 1 |
| Example 35 | F | 0 | 1 |
| Example 36 | H | 0 | 1 |
| Example 37 | H | 0 | 1 |
| Example 38 | 2H | 0 | 0 |
| Example 39 | 2H | 0 | 0 |
| Example 40 | H | 0 | 0 |
| Example 41 | H | 0 | 1 |
| Example 42 | H | 0 | 1 |
| Example 43 | H | 0 | 1 |
| Example 44 | H | 0 | 1 |
| Example 45 | 2H | 0 | 1 |
| Example 46 | 2H | 0 | 0 |
| Example 47 | 2H | 0 | 1 |
| Example 48 | 2H | 0 | 1 |
| Example 49 | F | 0 | 1 |
| Example 50 | F | 0 | 1 |
| Example 51 | F | 0 | 1 |
| Example 52 | H | 0 | 0 |
| Example 53 | 2H | 0 | 1 |
| Example 54 | H | 0 | 1 |

TABLE 10

| | Evaluation results (Coating solution) | | |
|---|---|---|---|
| | | Adhesiveness | |
| | Pencil hardness | PVC | Acryl |
| Example 55 | F | 0 | 1 |
| Example 56 | F | 0 | 0 |
| Example 57 | HB | 0 | 1 |
| Example 58 | H | 0 | 0 |
| Example 59 | 2H | 0 | 0 |
| Example 60 | 2H | 0 | 0 |
| Example 61 | 2H | 0 | 1 |
| Example 62 | H | 0 | 1 |
| Example 63 | H | 0 | 1 |
| Example 64 | 3H | 0 | 0 |
| Example 65 | 2H | 0 | 1 |
| Example 66 | 2H | 0 | 1 |
| Example 67 | H | 0 | 1 |
| Example 68 | 2H | 0 | 0 |
| Example 69 | 2H | 0 | 0 |
| Example 70 | 2H | 0 | 0 |
| Example 71 | 2H | 0 | 1 |
| Example 72 | H | 0 | 1 |
| Comparative Example 1 | <3B | 3 | 5 |
| Comparative Example 2 | <3B | 4 | 5 |
| Comparative Example 3 | <3B | 5 | 5 |
| Comparative Example 4 | <3B | 5 | 5 |

As presented in Tables 9 and 10, it was possible to form images (that is, films) having excellent adhesiveness to various base materials and excellent pencil hardness with the water dispersions of gel particles of Examples 1 to 72.

In contrast, adhesiveness to base materials and pencil hardness were decreased films formed by coating solutions using ink compositions of Comparative Examples 1 to 4 not including gel particles (that is, particles were not gelled).

The whole of the disclosure of JP2015-061721 filed on Mar. 24, 2015 is incorporated into the present specification by reference.

All the documents, patent applications, and technical standards described in the present specification are incorporated into the present specification by reference to the same extent as that in the case where it is specifically and individually shown that each of the documents, patent applications, and technical standards is incorporated into the present specification by reference.

What is claimed is:

1. A water dispersion of gel particles,
wherein the gel particles having a three-dimensional crosslinked structure including at least one of a polymer structure represented by Formula (1) or a polymer structure represented by Formula (2), having a hydrophilic group and a polymerizable group, and including photopolymerization initiators are dispersed in water,

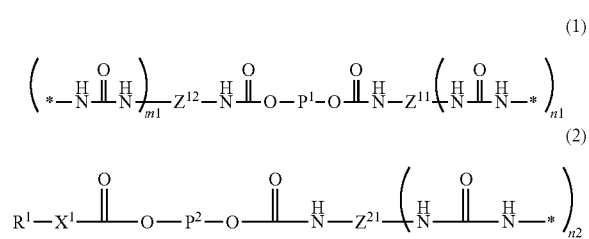

in Formula (1), $P^1$ represents a polymer chain consisting of polyester, polycarbonate, polycaprolactone, polybutadiene, polyisoprene, or polyolefin and having a number-average molecular weight of 500 or greater, in Formula (1), $Z^{11}$ represents a $(n_1+1)$-valent organic group, $Z^{12}$ represents a $(m_1+1)$-valent organic group, and $n_1$ and $m_1$ each independently represent an integer of 1 or greater, in Formula (2), $P^2$ represents a polymer chain consisting of polyurethane, polyester, polycarbonate, polycaprolactone, polybutadiene, polyisoprene, or polyolefin and having a number-average molecular weight of 500 or greater, in Formula (2), $X^1$ represents a single bond, a —$CH_2$— group, or a —NH— group, $R^1$ represents a hydrocarbon group that may include a hetero atom, $Z^{21}$ represents a $(n_2+1)$-valent organic group, and $n_2$ represents an integer of 1 or greater, and in Formulae (1) and (2), * represents a bonding position; and wherein a number-average molecular weight of the polymer chain represented by $P^1$ is 1,000 to 40,000, and a number-average molecular weight of the polymer chain represented by $P^2$ is 1,000 to 40,000.

2. The water dispersion of the gel particles according to claim 1,
wherein $R^1$ in Formula (2) is a group represented by Formula (2R),

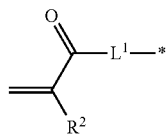

in Formula (2R), $L^1$ represents a divalent organic group, $R^2$ represents a hydrogen atom or an alkyl group, and * represents a bonding position.

3. The water dispersion of gel particles according to claim 1,
wherein the gel particles include a polymerizable monomer.

4. The water dispersion of gel particles according to claim 3,
wherein the polymerizable monomer is a (meth)acrylate monomer.

5. The water dispersion of gel particles according to claim 3,
wherein the polymerizable monomer is a trifunctional or higher functional acrylate monomer.

6. The water dispersion of gel particles according to claim 1,
wherein solubility of the photopolymerization initiator to water is 1.0 mass % or less at 25° C.

7. The water dispersion of gel particles according to claim 1,
wherein the photopolymerization initiator is an acylphosphine oxide compound.

8. The water dispersion of gel particles according to claim 1,
wherein the gel particles include a sensitizer.

9. The water dispersion of gel particles according to claim 1,
wherein the hydrophilic group is at least one selected from the group consisting of a carboxyl group, a salt of the carboxyl group, a sulfo group, a salt of the sulfo group, a sulfate group, a salt of the sulfate group, a phosphonic acid group, a salt of the phosphonic acid group, a phosphoric acid group, a salt of the phosphoric acid group, an ammonium salt group, a betaine group, and an alkyleneoxy group.

10. The water dispersion of gel particles according to claim 1, which is used in ink jet recording.

11. The water dispersion of gel particles according to claim 1,
wherein a total solid content of the gel particles is 50 mass % or greater with respect to a total solid content of the water dispersion.

12. The water dispersion of the gel particles according to claim 1,
wherein the polymer structure represented by Formula (1) is a structure derived from an isocyanate group-containing polymer represented by Formula (1P),
the polymer structure represented by Formula (2) is a structure derived from an isocyanate group-containing polymer represented by Formula (2P),

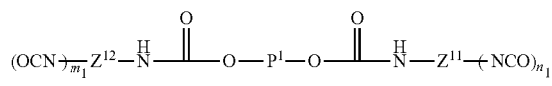

-continued

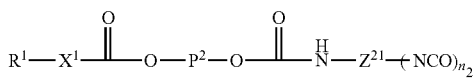
(2P)

in Formula (1P), $P^1$ represents a polymer chain consisting of polyester, polycarbonate, polycaprolactone, polybutadiene, polyisoprene, or polyolefin and having a number-average molecular weight of 500 or greater, in Formula (1P), $Z^{11}$ represents a $(n_1+1)$-valent organic group, $Z^{12}$ represents a $(m_1+1)$-valent organic group, and $n_1$ and $m_1$ each independently represent an integer of 1 or greater, in Formula (2P), $P^2$ represents a polymer chain consisting of polyurethane, polyester, polycarbonate, polycaprolactone, polybutadiene, polyisoprene, or polyolefin and having a number-average molecular weight of 500 or greater, and in Formula (2P), $X^1$ represents a single bond, a —$CH_2$— group, or a —NH— group, $R^1$ represents a hydrocarbon group that may include a hetero atom, $Z^{21}$ represents a $(n_2+1)$-valent organic group, and $n_2$ represents an integer of 1 or greater.

13. A method of producing the water dispersion of gel particles according to claim 12, comprising:
preparing at least one of the isocyanate group-containing polymer represented by Formula (1P) or the isocyanate group-containing polymer represented by Formula (2P);
obtaining an emulsion by mixing and emulsifying an oil phase component including at least one of the isocyanate group-containing polymer represented by Formula (1P) or the isocyanate group-containing polymer represented by Formula (2P), the photopolymerization initiator, and an organic solvent and a water phase component including water; and
obtaining the water dispersion of gel particles by heating the emulsion and at least causing at least one of the isocyanate group-containing polymer represented by Formula (1P) or the isocyanate group-containing polymer represented by Formula (2P) and water to react with each other.

14. The method of producing the water dispersion of gel particles according to claim 13,
wherein the preparing at least one of the isocyanate group-containing polymer represented by Formula (1P) or the isocyanate group-containing polymer represented by Formula (2P) includes at least one of:
obtaining the isocyanate group-containing polymer represented by Formula (1P) by causing polymer diol represented by Formula (1PD) and a polyfunctional isocyanate compound represented by Formula (ZC) to react with each other, or
obtaining the isocyanate group-containing polymer represented by Formula (2P) by causing polymer diol represented by Formula (2PD) and a terminal sealing agent represented by Formula (M1) or a terminal sealing agent represented by Formula (M2) or an anhydride thereof to react with each other, obtaining a one-terminal sealing polymer represented by Formula (2PO), and causing the one-terminal sealing polymer and a polyfunctional isocyanate compound represented by Formula (ZC) to react with each other, $$HO-P^1-OH \quad (1PD)$$

$$HO-P^2-OH \quad (2PD)$$

$$Z^c\text{---(NCO)}_{n_c} \quad (ZC)$$

$$R^1\text{---NCO} \quad (M1)$$

$$R^1-X^1-\overset{O}{\underset{\|}{C}}-OH \quad (M2)$$

$$R^1-X^1-\overset{O}{\underset{\|}{C}}-O-P^2-OH \quad (2PO)$$

in Formula (1PD), $P^1$ represents a polymer chain consisting of polyester, polycarbonate, polycaprolactone, polybutadiene, polyisoprene, or polyolefin and having a having a number-average molecular weight of 500 or greater, in Formulae (2PD) and (2PO), $P^2$ represents a polymer chain consisting of polyurethane, polyester, polycarbonate, polycaprolactone, polybutadiene, polyisoprene, or polyolefin and having a number-average molecular weight of 500 or greater, in Formula (ZC), $Z^C$ represents a $n_c$-valent organic group, and $n_c$ represents an integer of 2 or greater, in Formulae (M2) and (2PO), $X^1$ represents a single bond, a —$CH_2$— group, or a —NH— group, and in Formulae (M1), (M2), and (2PO), $R^1$ represents a hydrocarbon group that may include a hetero atom.

15. The water dispersion of the gel particles according to claim 12, wherein in Formula (1P), $P^1$ represents a polymer chain consisting of polycarbonate, polycaprolactone, polybutadiene, polyisoprene, or polyolefin and having a number-average molecular weight of from 1,000 to 40,000; and, in Formula (2P), $P^2$ represents a polymer chain consisting of polyurethane, polycarbonate, polycaprolactone, polybutadiene, polyisoprene, or polyolefin and having a number-average molecular weight of from 1,000 to 40,000.

16. An image forming method comprising:
applying the water dispersion of gel particles according to claim 1 on a recording medium; and
irradiating the water dispersion of gel particles applied to the recording medium with active energy rays.

17. The water dispersion of gel particles of claim 1, wherein in Formula (1), $P^1$ represents a polymer chain consisting of polycarbonate, polycaprolactone, polybutadiene, polyisoprene, or polyolefin and having a number-average molecular weight of from 1,000 to 40,000; and, in Formula (2), $P^2$ represents a polymer chain consisting of polyurethane, polycarbonate, polycaprolactone, polybutadiene, polyisoprene, or polyolefin and having a number-average molecular weight of from 1,000 to 40,000.

* * * * *